US008155599B2

(12) United States Patent
Kato et al.

(10) Patent No.: US 8,155,599 B2
(45) Date of Patent: Apr. 10, 2012

(54) WIRELESS COMMUNICATION APPARATUS FOR SIMULTANEOUSLY PERFORMING MULTIPLE WIRELESS COMMUNICATIONS

(75) Inventors: Akira Kato, Osaka (JP); Hiroshi Iwai, Osaka (JP); Atsushi Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 12/439,103

(22) PCT Filed: Sep. 11, 2007

(86) PCT No.: PCT/JP2007/067663

§ 371 (c)(1), (2), (4) Date: May 29, 2009

(87) PCT Pub. No.: WO2008/032710

PCT Pub. Date: Mar. 20, 2008

(65) Prior Publication Data

US 2010/0022197 A1 Jan. 28, 2010

(30) Foreign Application Priority Data

Sep. 11, 2006 (JP) ................................ 2006-245187

(51) Int. Cl.
*H04B 1/40* (2006.01)

(52) U.S. Cl. ............. 455/75; 455/11.1; 455/15; 455/20; 455/73; 455/101; 348/725; 725/81

(58) Field of Classification Search .................... 455/75, 455/11.1, 15, 17, 20–22, 73, 101, 150.1, 455/192.1, 193.1; 348/725, 726, 731, 732, 348/E5.108; 375/295, 316; 725/81, 64, 67, 725/68

See application file for complete search history.

(56) References Cited

U.S. PATENT DOCUMENTS 4,914,714 A * 4/1990 Tamura ........................... 455/78
6,560,443 B1 * 5/2003 Vaisanen et al. ................ 455/73
6,842,629 B1 * 1/2005 Granstam et al. ............. 455/561
7,155,178 B2 * 12/2006 Chang et al. ................. 455/101

(Continued)

FOREIGN PATENT DOCUMENTS

JP 63-60628 3/1988

(Continued)

OTHER PUBLICATIONS

International Search Report issued Dec. 25, 2007 in the International (PCT) Application No. PCT/JP2007/067663.

(Continued)

*Primary Examiner* — Shaima Q Aminzay

(74) *Attorney, Agent, or Firm* — Wenderoth, Lind & Ponack, L.L.P.

(57) ABSTRACT

A portable wireless communication apparatus is provided with antenna elements; a mobile phone signal processing circuit; a DTV tuner for receiving DTV low-band frequency signals and DTV high-band frequency signals; impedance matching circuits for the mobile phone signal processing circuit; and impedance matching circuits for the DTV tuner for receiving the DTV low-band frequency signals and DTV high-band frequency signals. A switch is changed to select either the DTV low-band frequency signals or the DTV high-band frequency signals, and output the selected signals to the DTV tuner. A tuner controller controls the switch to select the DTV high-band frequency signals by using the antenna element for transmission from the mobile phone signal processing circuit.

7 Claims, 24 Drawing Sheets

205
201
101
204
203
212
211
102
221
225
223
222
224
170
202
208
207
206
100

U.S. PATENT DOCUMENTS

| | | | | |
|---|---|---|---|---|
| 7,340,274 | B2 | 3/2008 | Harano | |
| 7,424,308 | B2 | 9/2008 | Suzuki | |
| 7,565,114 | B2 * | 7/2009 | Ito et al. | 455/69 |
| 7,796,952 | B1 * | 9/2010 | Jin et al. | 455/73 |
| 2002/0002037 | A1 | 1/2002 | Ito et al. | |
| 2003/0203743 | A1 * | 10/2003 | Sugar et al. | 455/550.1 |
| 2003/0236065 | A1 * | 12/2003 | Leinonen et al. | 455/3.05 |
| 2005/0064903 | A1 | 3/2005 | Uotsu et al. | |
| 2006/0052066 | A1 * | 3/2006 | Cleveland et al. | 455/101 |
| 2006/0089117 | A1 | 4/2006 | Suzuki | |

FOREIGN PATENT DOCUMENTS

| | | |
|---|---|---|
| JP | 7-254816 | 10/1995 |
| JP | 2001-257619 | 9/2001 |
| JP | 2001-284943 | 10/2001 |
| JP | 2004-207880 | 7/2004 |
| JP | 2005-94532 | 4/2005 |
| JP | 2005-159827 | 6/2005 |
| JP | 2005-277787 | 10/2005 |
| JP | 2006-121484 | 5/2006 |

OTHER PUBLICATIONS

International Preliminary Report on Patentability issued Mar. 26, 2009 in the International (PCT) Application No. PCT/JP2007/067663.

* cited by examiner

VSWR CHARACTERISTIC WHEN RECEIVING MOBILE PHONE RECEIVING SIGNAL
VSWR CHARACTERISTIC WHEN RECEIVING DTV HIGH-BAND FREQUENCY SIGNAL
450
550
650
750
FREQUENCY (MHz)
VSWR 101
102
146
a
b
110Aa
110Ba
311
MATCHING CIRCUIT (B1)
312
MATCHING CIRCUIT (B2L,B2H)
313
MATCHING CIRCUIT (B1)
321
FILTER (B1)
322
FILTER (B2L,B2H)
323
FILTER (B1)
131
144
a
b
134
132
COMBINER
151
TRANSMITTER CIRCUIT
RECEIVER CIRCUIT
151a
151b
MOBILE PHONE SIGNAL PROCESSING CIRCUIT
152
DTV TUNER
160E
TUNER CONTROLLER
170
CONTROLLER
180
100K 101
102
147
a
b
c
d
147b
147a
110Bb
110B
110A
110Ab
111
MATCHING CIRCUIT (B1)
314
MATCHING CIRCUIT (B2L)
315
MATCHING CIRCUIT (B2H)
113A
MATCHING CIRCUIT (B1)
121
FILTER (B1)
324
FILTER (B2L)
325
FILTER (B2H)
123A
FILTER (B1)
131
134
144
a
b
132
COMBINER
151
TRANSMITTER CIRCUIT
RECEIVER CIRCUIT
151a
151b
MOBILE PHONE SIGNAL PROCESSING CIRCUIT
152A
DTV LOW-BAND FREQUENCY TUNER
152B
DTV HIGH-BAND FREQUENCY TUNER
TUNER CONTROLLER
160G
170
CONTROLLER
180
100M

WIRELESS COMMUNICATION APPARATUS FOR SIMULTANEOUSLY PERFORMING MULTIPLE WIRELESS COMMUNICATIONS

TECHNICAL FIELD

The present invention mainly relates to a wireless communication apparatus capable of performing multiple wireless communications. More particularly, the present invention relates to a wireless communication apparatus, such as a mobile phone terminal apparatus, which is capable of transmitting and receiving radio signals containing a speech of a telephone call or the like, to and from a mobile phone base station apparatus, and at the same time, receiving radio signals for multiple wireless communication systems in different frequency bands, such as FM broadcast waves, analog television broadcast waves, and/or digital television (DTV) broadcast waves in VHF to UHF bands.

BACKGROUND ART

In recent years, rapid progress has been made in portable wireless communication apparatuses such as mobile phones. Such a portable wireless communication apparatus transmits and receives signals of a mobile phone call to and from a mobile phone base station apparatus (hereinafter, a signal to be transmitted to the mobile phone base station apparatus is referred to as a "mobile phone transmitting signal", and a signal to be received from the mobile phone base station apparatus is referred to as a "mobile phone receiving signal"). Currently, among commercially available portable wireless communication apparatuses, for example, it is possible to use a mobile phone capable of receiving a plurality of broadcast waves disclosed in Patent Document 1, for the purpose of transmitting and receiving mobile phone transmitting signals and mobile phone receiving signals, and at the same time, receiving radio signals of another wireless communication, such as FM or television broadcasts.

The mobile phone of Patent Document 1 is characterized in that it is provided with a mobile phone radio unit, and further provided with a TV and FM receiving unit operable to receive FM and television broadcasts, and a plurality of impedance adjuster circuits provided respectively for a plurality of receivable broadcast waves (i.e., UHF television broadcasts, VHF-Hch television broadcasts, VHF-Lch television broadcasts, and FM broadcasts). A receiving signal received by an antenna of the mobile phone is passed to the mobile phone radio unit and a band-changing switch through a frequency distributor, the band-changing switch operates to select one of the impedance adjuster circuits according to the frequency band of the receiving signal, and the receiving signal is passed to the TV and FM receiving unit through the selected impedance adjuster circuit.

Patent Document 1: Japanese Patent Laid-Open Publication No. 2005-159827.

DISCLOSURE OF INVENTION

Problems to be Solved by the Invention

In the case that an 800 MHz band is used as a frequency band for transmitting and receiving mobile phone transmitting signals and mobile phone receiving signals, frequencies in this band are very close to frequencies on the higher frequency side (high band) within the band of 470 MHz to 770 MHz used for digital television broadcasting (hereinafter, referred to as "DTV"). Hence, in the mobile phone disclosed in Patent Document 1, a mobile phone transmitting signal to be transmitted from the mobile phone becomes a disturbing wave for television broadcasts on the higher frequency side of the UHF band, and the mobile phone can not sufficiently suppress an influence of such disturbance. As such, according to Patent Document 1, when the mobile phone receives a radio signal of other wireless communications having a frequency close to the frequency of a mobile phone transmitting signal to be transmitted from the mobile phone, good reception characteristics can not be obtained for the radio signal.

An object of the present invention is therefore to solve the above-described problem, and to provide a wireless communication apparatus capable of performing simultaneously multiple wireless communications while obtaining good reception characteristics, by preventing different wireless communications from disturbing each other in the wireless communication apparatus. Particularly, an object of the present invention is to provide a portable wireless communication apparatus, such as a mobile phone, which is capable of transmitting and receiving the mobile phone transmitting signals and mobile phone receiving signals, and at the same time, receiving the digital television broadcasts.

Means for Solving the Problem

A wireless communication apparatus according to the first invention of the present application is provided with: a first antenna element for transmitting a first radio signal in a first frequency band used for a first communication system, and receiving a second radio signal in the first frequency band; a second antenna element for receiving the second radio signal; transmitting means for generating the first radio signal and transmitting the first radio signal from the first antenna element through first filter means and first matching means; first receiving means for performing at least one of receiving processes including a first receiving process of receiving the second radio signal received by the first antenna element, through the first matching means and the first filter means; and a second receiving process of receiving the second radio signal received by the second antenna element, through second matching means and second filter means; and second receiving means for receiving a third radio signal in a second frequency band used for a second communication system and close to the first frequency band, and receiving a fourth radio signal in a third frequency band used for the second communication system and far from the first frequency band and different from the second frequency band. The first matching means matches an impedance of the first antenna element to an impedance of the first filter means in the first frequency band, the first filter means passing a radio signal in the first frequency band. The second matching means matches an impedance of the second antenna element to an impedance of the second filter means in the first frequency band, the second filter means passing a radio signal in the first frequency band. The wireless communication apparatus is further provided with: third matching means for matching an impedance of the first antenna element to an impedance of third filter means in the third frequency band, the third filter means passing a radio signal in the third frequency band; fourth matching means for matching an impedance of the second antenna element to an impedance of fourth filter means in the second frequency band, the fourth filter means passes a radio signal in the second frequency band; and control means for controlling first switch means to connect the second receiving means receiving the third radio signal, to the second antenna element not transmitting the first radio signal, through the fourth filter means and the fourth matching means, when the transmitting means transmits the first radio signal.

In the wireless communication apparatus, when the transmitting means does not transmit the first radio signal, the control means controls the first switch means to connect the second receiving means to the first antenna element through the third filter means and the third matching means, or to connect the second receiving means to the second antenna element through the fourth filter means and the fourth matching means.

Moreover, in the wireless communication apparatus, the third matching means further matches an impedance of the first antenna element to an impedance of the third filter means in the second frequency band, the third filter means further passes a radio signal in the second frequency band. The fourth matching means further matches an impedance of the second antenna element to an impedance of the fourth filter means in the third frequency band, the fourth filter means further passing a radio signal in the third frequency band. In the case that the first switch means connects the second receiving means to the first antenna element through the third filter means and the third matching means; when a signal level of the third radio signal or the fourth radio signal received by the second receiving means becomes lower than a predetermined threshold value, the control means controls the first switch means to connect the second receiving means to the second antenna element through the fourth filter means and the fourth matching means.

Further, in the wireless communication apparatus, the third matching means further matches an impedance of the first antenna element to an impedance of the third filter means in the second frequency band, the third filter means further passes a radio signal in the second frequency band. The fourth matching means further matches an impedance of the second antenna element to an impedance of the fourth filter means in the third frequency band, the fourth filter means further passing a radio signal in the third frequency band. In the case that the first switch means connects the second receiving means to the second antenna element through the fourth filter means and the fourth matching means; when a signal level of the third radio signal or the fourth radio signal received by the second receiving means becomes lower than a predetermined threshold value, the control means controls the first switch means to connect the second receiving means to the first antenna element through the third filter means and the third matching means.

Moreover, the wireless communication apparatus is further provided with: second switch means inserted between the transmitting means and the first filter means and between the transmitting means and the second filter means, and for selectively changing between a first case in which the first radio signal from the transmitting means is outputted to the first antenna element through the first filter means and the first matching means, and a second case in which the first radio signal from the transmitting means is outputted to the second antenna element through the second filter means and the second matching means. The third matching means further matches an impedance of the first antenna element to an impedance of the third filter means in the second frequency band, the third filter means further passes a radio signal in the second frequency band. The fourth matching means further matches an impedance of the second antenna element to an impedance of the fourth filter means in the third frequency band, the fourth filter means further passing a radio signal in the third frequency band. The control means controls the first switch means in the first case to connect the second receiving means receiving the third radio signal to the second antenna element through the fourth filter means and the fourth matching means, and controls the first switch means in the second case to connect the second receiving means receiving the third radio signal to the first antenna element through the third filter means and the third matching means.

Further, the wireless communication apparatus is further provided with: second switch means inserted between the transmitting means and the first filter means and between the transmitting means and the second filter means, and for selectively changing between a first case in which the first radio signal from the transmitting means is outputted to the first antenna element through the first filter means and the first matching means, and a second case in which the first radio signal from the transmitting means is outputted to the second antenna element through the second filter means and the second matching means. The third matching means further matches an impedance of the first antenna element to an impedance of the third filter means in the second frequency band, the third filter means further passes a radio signal in the second frequency band. The fourth matching means further matches an impedance of the second antenna element to an impedance of the fourth filter means in the third frequency band, the fourth filter means further passing a radio signal in the third frequency band. The second receiving means includes a first receiving unit for receiving the third radio signal in the second frequency band, and a second receiving unit for receiving the fourth radio signal in the third frequency band. The control means controls the first switch means in the first case to connect the first receiving unit to the second antenna element through the fourth filter means and the fourth matching means, and controls the first switch means in the second case to connect the first receiving unit to the first antenna element through the third filter means and the third matching means.

A wireless communication apparatus according to the second invention of the present application is provided with: first and second antenna elements for transmitting a first radio signal in a first frequency band used for a first communication system and receiving a second radio signal in the first frequency band, receiving a third radio signal in a second frequency band used for a second communication system and close to the first frequency band, and receiving a fourth radio signal in a third frequency band used for the second communication system and far from the first frequency band and different from the second frequency band; first switch means for connecting one of the first antenna element and the second antenna element; second switch means; transmitting means for generating the first radio signal, and when the second switch means is in a first case, transmitting the first radio signal from the first antenna element through the second switch means, first filter means, and first matching means, and when the second switch means is in a second case, transmitting the first radio signal from the second antenna element through the second switch means, second filter means, and second matching means; first receiving means for performing at least one of receiving processes including a first receiving process of receiving the second radio signal received by the first antenna element, through the first matching means and the first filter means; and a second receiving process of receiving the second radio signal received by the second antenna element, through the second matching means and the second filter means; and second receiving means for receiving the third radio signal in the second frequency band, and the fourth radio signal in the third frequency band. The first matching means matches an impedance of the first antenna element to an impedance of the first filter means in the first frequency band, the first filter means passing a radio signal in the first frequency band. The second matching means matches an impedance of the second antenna element to an impedance of the second filter means in the first frequency band, the second filter means passing a radio signal in the first frequency band. The wireless communication apparatus is further provided with: third matching means for matching an impedance of the first antenna element to an impedance of third filter means in the second and third frequency bands, the third filter means passing radio signals in the second and third frequency bands; and control means for controlling the first switch means such that the third radio signal received by the second antenna element is received by the second receiving means through the first switch means, the third matching means, and the third filter means, when the second switch means connects the transmitting means to the first antenna element through the first filter means and the first matching means and the transmitting means transmits the first radio signal using the first antenna element; and controlling the first switch means such that the third radio signal received by the first antenna element is received by the second receiving means through the first switch means, the third matching means, and the third filter means, when the second switch means connects the transmitting means to the second antenna element through the second filter means and the second matching means and the transmitting means transmits the first radio signal using the second antenna element.

Effects of the Invention

According to the wireless communication apparatus according to the first aspect of the invention, when the transmitting means is transmitting the first radio signal, the first switch means is controlled to connect the second receiving means for receiving the third radio signal, through the fourth filter means and the fourth matching means, to the second antenna element that is not transmitting the first radio signal. Accordingly, the third radio signal in the second frequency band can be received using the second antenna element, without being disturbed by the first radio signal in the first frequency band that is transmitted using the first antenna element.

Moreover, when the first switch means connects the second receiving means to the first antenna element through the third filter means and the third matching means, if the signal level of the third radio signal or the fourth radio signal received by the second receiving means becomes lower than a predetermined threshold value, then the first switch means is controlled to connect the second receiving means to the second antenna element through the fourth filter means and the fourth matching means. Accordingly, if the signal level of the third radio signal or the fourth radio signal becomes lower than the predetermined threshold value, then instead of the first antenna element, the second antenna element is connected to the second receiving means. Thus, it is possible to use the second antenna element that receives at a higher signal level.

Further, when the first switch means connects the second receiving means to the second antenna element through the fourth filter means and the fourth matching means, if the signal level of the third radio signal or the fourth radio signal received by the second receiving means becomes lower than the predetermined threshold value, then the first switch means is controlled to connect the second receiving means to the first antenna element through the third filter means and the third matching means. Accordingly, when the third radio signal or the fourth radio signal is received using the second antenna element, if the signal level of the third radio signal or the fourth radio signal becomes lower than the predetermined threshold value, then instead of the second antenna element, the first antenna element is connected to the second receiving means. Thus, it is possible to use the first antenna element that receives at a higher signal level.

Moreover, in the first case, the first switch means is controlled to connect the second receiving means for receiving the third radio signal, to the second antenna element, through the fourth filter means and the fourth matching means. On the other hand, in the second case, the first switch means is controlled to connect the second receiving means for receiving the third radio signal, to the first antenna element, through the third filter means and the third matching means. Accordingly, in the former case (the first case), when the first radio signal is transmitted using the first antenna element, the third radio signal in the second frequency band can be received using the second antenna element, without being disturbed by the first radio signal to be transmitted. In the latter case (the second case), when the first radio signal is transmitted using the second antenna element, the third radio signal in the second frequency band can be received using the first antenna element, without being disturbed by the first radio signal to be transmitted.

Further, in the first case, the first switch means is controlled to connect the first receiving unit to the second antenna element through the fourth filter means and the fourth matching means. On the other hand, in the second case, the first switch means is controlled to connect the first receiving unit to the first antenna element through the third filter means and the third matching means. Accordingly, in the former case (the first case), when the first radio signal is transmitted using the first antenna element, the third radio signal in the second frequency band can be received by the first receiving unit of the second receiving means, using the second antenna element, without being disturbed by the first radio signal to be transmitted. In the latter case (the second case), when the first radio signal is transmitted using the second antenna element, the third radio signal in the second frequency band can be received by the first receiving unit of the second receiving means, using the first antenna element, without being disturbed by the first radio signal to be transmitted.

According to the wireless communication apparatus according to the second aspect of the invention, when the second switch means connects the transmitting means to the first antenna element through the first filter means and the first matching means, and the transmitting means is transmitting the first radio signal using the first antenna element, the first switch means is controlled such that the third radio signal received by the second antenna element is received by the second receiving means through the first switch means, the third matching means, and the third filter means. On the other hand, when the second switch means connects the transmitting means to the second antenna element through the second filter means and the second matching means, and the transmitting means is transmitting the first radio signal using the second antenna element, the first switch means is controlled such that the third radio signal received by the first antenna element is received by the second receiving means through the first switch means, the third matching means, and the third filter means. Accordingly, in the former case, the third radio signal can be received using the second antenna element, without being disturbed by the first radio signal in the first frequency band that is transmitted using the first antenna element. In the latter case, the third radio signal can be received using the first antenna element, without being disturbed by the first radio signal in the first frequency band that is transmitted using the second antenna element.

DESCRIPTION OF REFERENCE NUMERALS

Figure 1:
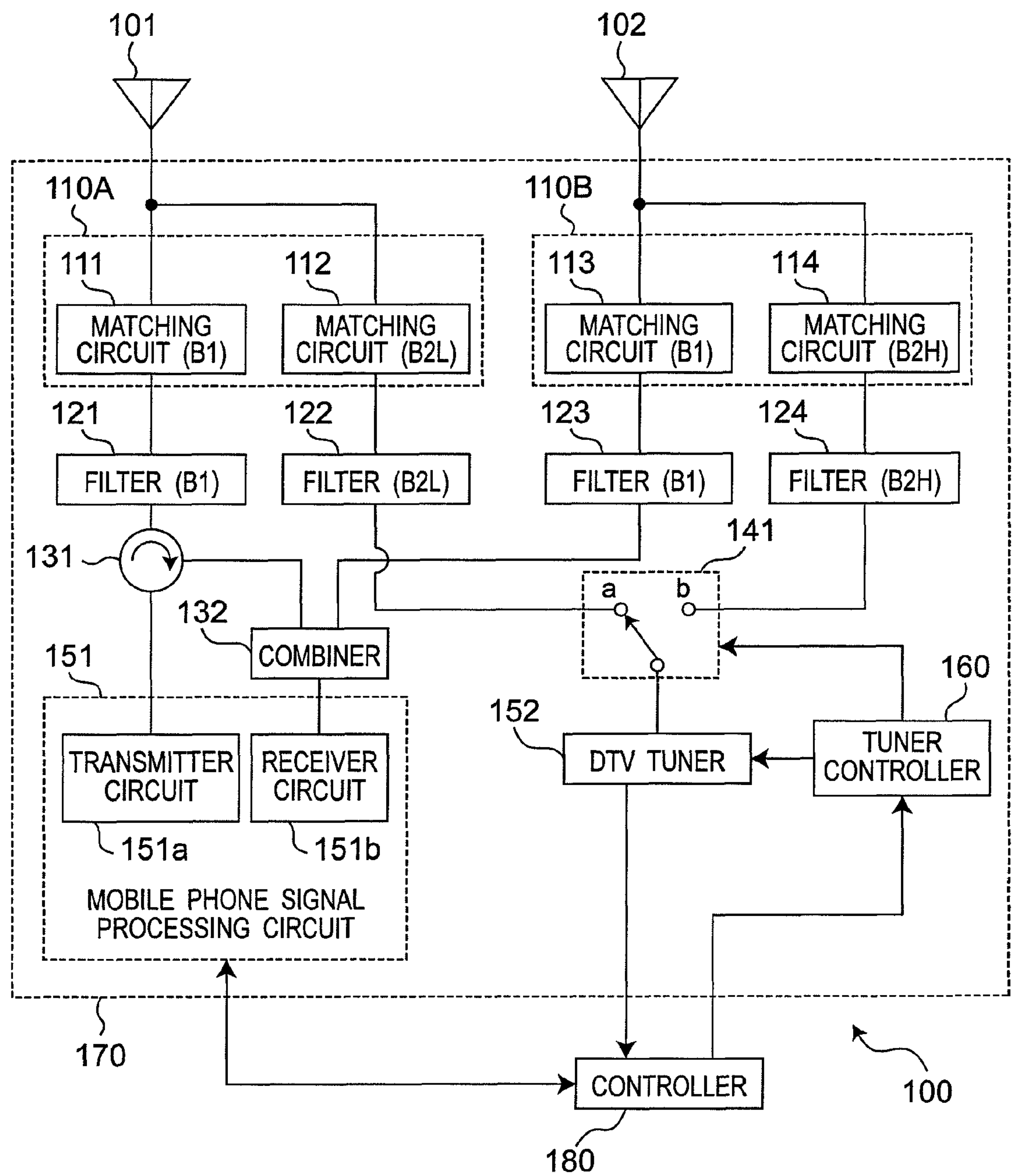
FIG. 1 is a block diagram showing a configuration of a wireless communication circuit 170 of a portable wireless communication apparatus 100 according to a first preferred embodiment of the present invention.

100, 100A to 100S: portable wireless communication apparatus,
101, 102, 103: antenna element,
110A, 110B, 110C, 110Aa, 110Ba, 110Ab, 110Bb: matching circuit unit,
111, 112, 112A, 112B, 113, 113A, 114, 114A, 114B, 115, 116, 311, 312, 313, 314, 315: impedance matching circuit,
121, 122, 122A, 123, 123A, 124, 124A, 125, 126, 127, 128, 129, 131Aa, 131Ab, 134Aa, 134Ab, 321, 322, 323, 324, 325: filter,
131, 134: circulator,
131A, 134A: duplexer,
132, 133: combiner,
141, 142, 143, 144, 145*a*, 145*b*, 147*a*, 147*b*: switch,
145, 147: switch circuit,

151: mobile phone signal processing circuit,
151*a*: transmitter circuit,
151*b*: receiver circuit,
152: DTV tuner,
152A: DTV low-band frequency tuner,
152B: DTV high-band frequency tuner,
160, 160A to 160H: tuner controller,
170: wireless communication circuit,
180: controller,
201: upper housing,
201*a*: outer upper housing,
202: lower housing,
203: hinge portion,
204: display,
205: speaker,
206: microphone,
207: keyboard,
208: circuit board,
209: rechargeable battery,
211, 212: screw,
213: screw receiving portion,
221, 222: feeder,
223, 224: terminal, and
225: feed point.

BEST MODE FOR CARRYING OUT THE INVENTION

Preferred embodiments of the present invention will be described below with reference to the drawings. Throughout the drawings illustrating the preferred embodiments of the present invention, components with similar functions are denoted by the same reference numerals, and thus, their explanations are not repeated. Note that the present invention is not limited to the following preferred embodiments.

First Preferred Embodiment

FIG. 1 is a block diagram showing a configuration of a wireless communication circuit 170 of a portable wireless communication apparatus 100 according to a first preferred embodiment of the present invention. The portable wireless communication apparatus 100 of the present preferred embodiment performs multiple wireless communications that respectively use frequency bands close to each other. Specifically, the portable wireless communication apparatus 100 has a function of transmitting and receiving mobile phone transmitting signals and mobile phone receiving signals as a first wireless communication; and a function of receiving DTV signals as a second wireless communication.

The wireless communication circuit 170 shown in FIG. 1 performs processes in a radio-frequency region of the portable wireless communication apparatus 100, and includes a mobile phone signal processing circuit 151 for transmitting and receiving mobile phone transmitting signals and mobile phone receiving signals, and includes a DTV tuner 152 for receiving DTV signals. The mobile phone signal processing circuit 151 includes a transmitter circuit 151*a* and a receiver circuit 151*b*. The transmitter circuit 151*a* performs processes in the radio-frequency region on the mobile phone transmitting signals to be transmitted, including, e.g., amplification, D/A conversion, and modulation. The receiver circuit 151*b* performs processes in the radio-frequency region on the mobile phone receiving signals to be received, including, e.g., amplification, A/D conversion, and demodulation. The DTV tuner 152 performs processes in the radio-frequency region on received DTV signals, such as amplification and demodulation. In FIG. 1, for ease of illustration, a controller 180 connected externally to the wireless communication circuit 170 is representative of components of the portable wireless communication apparatus 100 for performing processes other than the processes in the radio-frequency region.

A frequency band(s) to be used to transmit and receive the mobile phone transmitting signals and mobile phone receiving signals include(s) one or more of, e.g., an 800 MHz band, a 1.7 GHz band, a 2.0 GHz band, and a 2.5 GHz band. The present preferred embodiment uses the 800 MHz band, and this band is denoted as B1 in the following description. Note that the frequency band to be used to transmit and receive the mobile phone transmitting signals and mobile phone receiving signals is not limited thereto. Further, a DTV frequency band includes a range of 557 MHz to 770 MHz, i.e., a first frequency band portion close to the frequency band of the mobile phone transmitting signals and mobile phone receiving signals; and includes a range of 470 MHz to 557 MHz, i.e., a second frequency band portion farther from the frequency band of the mobile phone transmitting signals and mobile phone receiving signals than the first frequency band portion. In this specification, these frequency band portions are respectively referred to as the "high-frequency band" (or "high-band frequency" or B2H) and "low-frequency band" (or "low-band frequency" or B2L).

Referring to FIG. 1, the portable wireless communication apparatus 100 is provided with two antenna elements 101 and 102. The antenna element 101 is connected to impedance matching circuits 111 and 112 in the wireless communication circuit 170, and the antenna element 102 is connected to impedance matching circuits 113 and 114 in the wireless communication circuit 170 (these impedance matching circuits are denoted as "matching circuits" in the drawings). The impedance matching circuits 111, 112, 113, and 114 are provided for impedance matching between the antenna elements 101 and 102, and components at their subsequent stages. The impedance matching circuits 111 and 112 function as a matching circuit unit 110A for the antenna element 101, and the impedance matching circuits 113 and 114 function as a matching circuit unit 110B for the antenna element 102. A filter 121 is connected to a subsequent stage of the impedance matching circuit 111. The impedance matching circuit 111 matches impedances between the antenna element 101 and the filter 121 (or subsequent circuitry, including the filter 121) to transmit and receive the mobile phone transmitting signals and mobile phone receiving signals in the band B1. The filter 121 is a band-pass filter for the band B1, that passes the mobile phone transmitting signals and mobile phone receiving signals to be transmitted and received. A filter 122 is connected to a subsequent stage of the impedance matching circuit 112. The impedance matching circuit 112 matches impedances between the antenna element 101 and the filter 122 (or subsequent circuitry, including the filter 122) to receive DTV low-band frequency signals in the band B2L. The filter 122 is a band-pass filter for the band B2L, that passes the received DTV low-band frequency signals. A filter 123 is connected to a subsequent stage of the impedance matching circuit 113. The impedance matching circuit 113 matches impedances between the antenna element 102 and the filter 123 (or subsequent circuitry, including the filter 123) to receive the mobile phone receiving signals in the band B1. The filter 123 is a band-pass filter for the band B1, that passes the received mobile phone receiving signals. A filter 124 is connected to a subsequent stage of the impedance matching circuit 114. The impedance matching circuit 114 matches impedances between the antenna element 102 and the filter 124 (or subsequent circuitry, including the filter 124) to receive DTV high-band frequency signals in the band B2H. The filter 124 is a band-pass filter for the band B2H, that passes the received DTV high-band frequency signals.

The filter 121 is connected through a circulator 131 to the transmitter circuit 151*a* in the mobile phone signal processing circuit 151. A mobile phone transmitting signal generated by the transmitter circuit 151*a* for transmission is passed to the antenna element 101 through the circulator 131, the filter 121, and the impedance matching circuit 111, and then radiated from the antenna element 101 to a mobile phone base station apparatus (not shown). The filter 121 is further connected to one of input terminals of a combiner 132, through the circulator 131. The filter 123 is connected to the other input terminal of the combiner 132. The combiner 132 uses the combining diversity for a mobile phone receiving signal received by the antenna element 101 and inputted thereto through the impedance matching circuit 111, the filter 121, and the circulator 131, and a mobile phone receiving signal received by the antenna element 102 and inputted thereto through the impedance matching circuit 113 and the filter 123, and the combiner 132 outputs the combined mobile phone receiving signal to the receiver circuit 151*b* in the mobile phone signal processing circuit 151. The circulator 131 passes the mobile phone transmitting signal inputted from the transmitter circuit 151*a* for transmission, to the filter 121 only, and passes the mobile phone receiving signal inputted from the filter 121, to the combiner 132 only. The mobile phone signal processing circuit 151 is connected to the controller 180 and/or other circuitry such as an audio processing circuit (not shown) external to the wireless communication circuit 170, for further processes of the mobile phone transmitting signals and mobile phone receiving signals to be transmitted and received. For example, when the mobile phone transmitting signals and mobile phone receiving signals are telephone call signals, such external circuitry performs encoding, decoding, A/D and D/A conversions, etc. of audio signals, and when the mobile phone transmitting signals and mobile phone receiving signals are electronic mails, such external circuitry performs text data processing, etc.

On the other hand, the filters 122 and 124 are connected to a switch 141 for changing between frequency bands. The switch 141 passes one of output signals of the filters 122 and 124 to the DTV tuner 152, according to control of a tuner controller 160. The tuner controller 160 changes the connection of the switch 141 and controls demodulating operation of the DTV tuner 152, according to a control signal from the controller 180, e.g., including information on a channel selected by a user input through a keyboard 207 of FIG. 2, etc. When the selected channel has a frequency within the low-frequency band B2L, the tuner controller 160 controls the switch 141 so that the DTV low-band frequency signals received by the antenna element 101 and passed to the switch 141 through the impedance matching circuit 112 and the filter 122 are inputted to the DTV tuner 152, and controls the DTV tuner 152 to demodulate the inputted low-band frequency signals. On the other hand, when the selected channel has a frequency within the high-frequency band B2H, the tuner controller 160 controls the switch 141 so that the DTV high-band frequency signals received by the antenna element 102 and passed to the switch 141 through the impedance matching circuit 114 and the filter 124 are inputted to the DTV tuner 152, and controls the DTV tuner 152 to demodulate the inputted high-band frequency signals. The signals demodulated by the DTV tuner 152 is passed to the controller 180 and/or other circuitry such as a player circuit (not shown) external to the wireless communication circuit 170, for further processes including playback of videos and audios, etc.

Further, the tuner controller 160 can control the switch 141 as follows. When the transmitter circuit 151*a* is transmitting the mobile phone transmitting signals, the tuner controller 160 controls the switch 141 to connect the DTV tuner 152 receiving the DTV high-band frequency signals, through the filter 124 and the impedance matching circuit 114, to the antenna element 102 that is not transmitting the mobile phone transmitting signals. On the other hand, when the transmitter circuit 151*a* is not transmitting the mobile phone transmitting signals, the tuner controller 160 controls the switch 141 to connect the DTV tuner 152 to the antenna element 101 through the filter 122 and the impedance matching circuit 112, or to connect the DTV tuner 152 to the antenna element 102 through the filter 124 and the impedance matching circuit 114. Thus, it is possible to receive the DTV high-band frequency signals in the band B2H using the antenna element 102, without being disturbed by the mobile phone transmitting signals in the band B1 to be transmitted using the antenna element 101.

Figure 2:
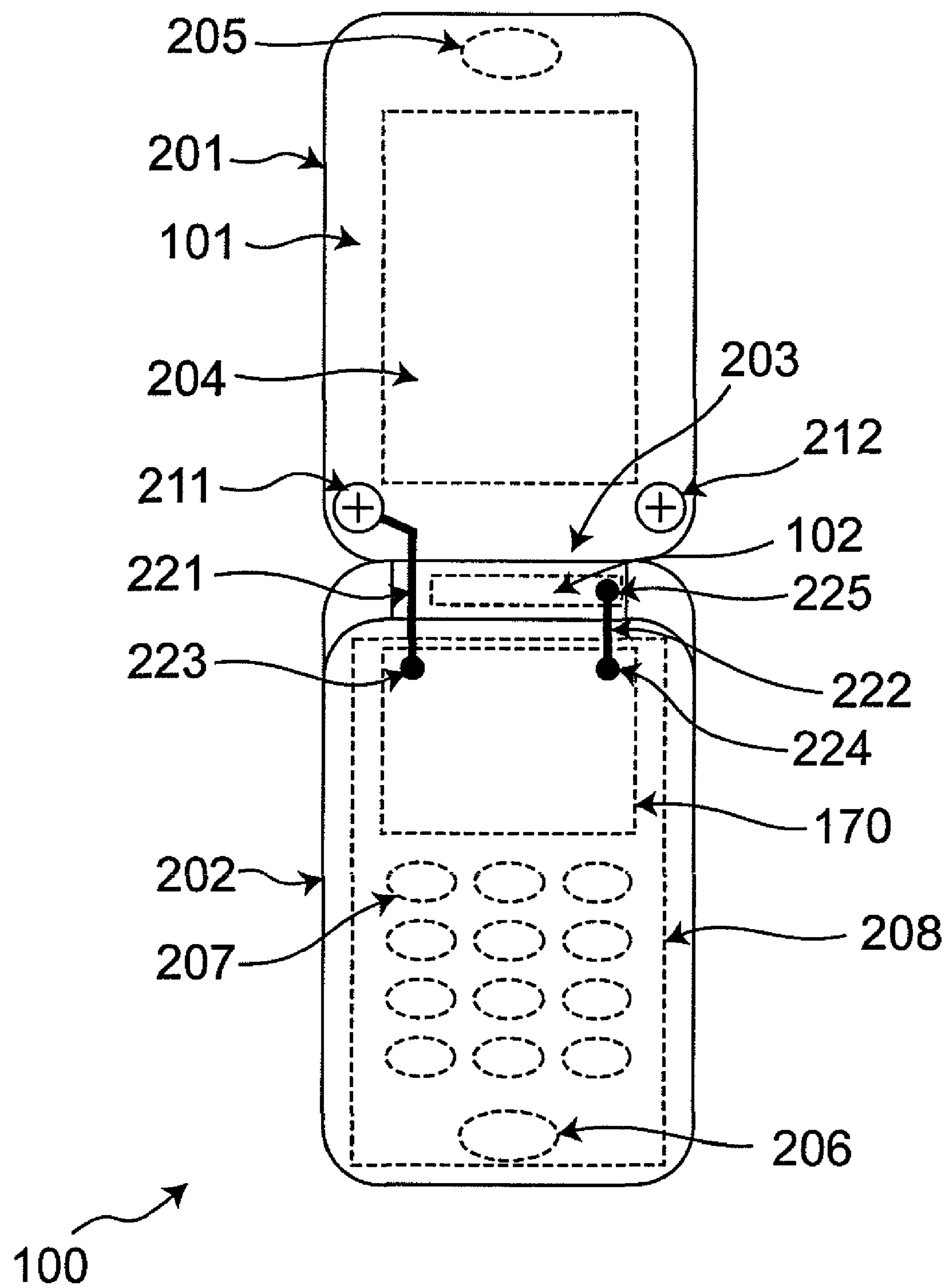
FIG. 2 is a transparent front view schematically showing the overall configuration of the portable wireless communication apparatus 100 of the first preferred embodiment of the present invention.
Figure 3:
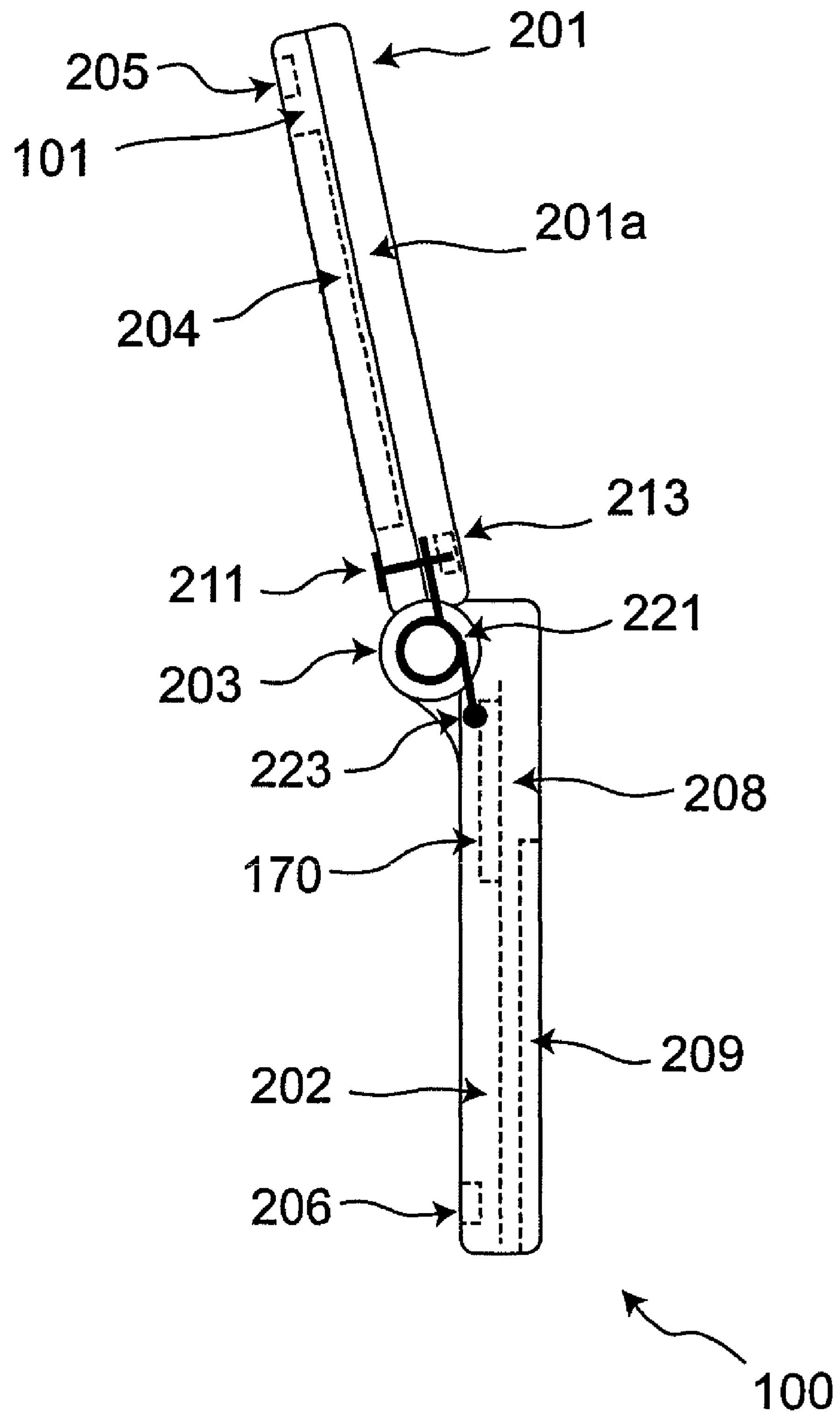
FIG. 3 is a transparent side view schematically showing the overall configuration of the portable wireless communication apparatus 100 of the first preferred embodiment of the present invention.

FIGS. 2 and 3 are transparent front and side views schematically showing the overall configuration of the portable wireless communication apparatus 100 of the present preferred embodiment. Referring to FIGS. 2 and 3, the portable wireless communication apparatus 100 of the present preferred embodiment is configured as a folding mobile phone which includes a substantially rectangular parallelepiped upper housing 201 and a substantially rectangular parallelepiped lower housing 202, in which the upper housing 201 and lower housing 202 are connected together by a hinge portion 203. FIGS. 2 and 3 show the portable wireless communication apparatus 100 in its opened state. The upper housing 201 is partly or wholly made of a conductive material, such as magnesium or zinc, and includes an antenna element 101 provided as an inner upper housing, and further includes an outer upper housing 201*a*. In this specification, a side of the portable wireless communication apparatus 100, that is located close to the user's head when using the portable wireless communication apparatus 100 for talking, is referred to as the "inner side" of the portable wireless communication apparatus 100, and a side remote from the user's head is referred to as the "outer side" of the portable wireless communication apparatus 100. The portable wireless communication apparatus 100 may be configured such that only part of the inner upper housing operates as the antenna element 101. The inner upper housing (i.e., the antenna element 101) and the outer upper housing 201*a* are fastened together by screws 211 and 212 provided at a bottom end portion of the inner upper housing (i.e., a side close to the hinge portion 203) so as to pass through from the inner upper housing to the outer upper housing 201*a*. For example, as shown in FIG. 3, the screw 211 is fixed by screwing into a screw receiving portion 213 of the outer upper housing 201*a*. Though not shown, the screw 212 is similarly fixed. The inner upper housing is provided with a display 204 for displaying video images of DTV and other information, and further provided with a speaker 205 for reproducing a remote party's speech, and for playing audios of DTV when watching DTV, above the display 204 (i.e., a side of the inner upper housing, remote from the hinge portion 203). Another speaker separate from the speaker 205 may be provided for playing the audios of DTV. The lower housing 202 is provided with the keyboard 207 for obtaining a user input including DTV channel selection, etc., on the inner side thereof, and provided with a microphone 206 for obtaining user's speech when talking, near a bottom end portion thereof (i.e., a side remote from the hinge portion 203). Furthermore, the lower housing 202 is provided with a circuit board 208 including the wireless communication circuit 170 and the controller 180 of FIG. 1 (not shown in FIGS. 2 and 3), and provided with a rechargeable battery 209 so as to be close to the outer side of the lower housing 202. Furthermore, an antenna element 102 made of a strip conductor is provided in the hinge portion 203. The antenna element 101 is connected to the wireless communication circuit 170 through a feeder 221. One end of the feeder 221 is configured as a circular through-hole, and is fixed by the screw 211 passing through the through-hole, and the screw receiving portion 213, so as to be electrically connected to the antenna element 101. The other end of the feeder 221 is electrically connected to a terminal 223 on the wireless communication circuit 170. The antenna element 102 is connected to the wireless communication circuit 170 through a feeder 222. One end of the feeder 222 is electrically connected to a feed point 225 provided at one end of the antenna element 102. The other end of the feeder 222 is electrically connected to a terminal 224 on the wireless communication circuit 170. According to the above-described configuration, the portable wireless communication apparatus 100 of FIG. 1 can be implemented as a mobile phone.

Figure 4:
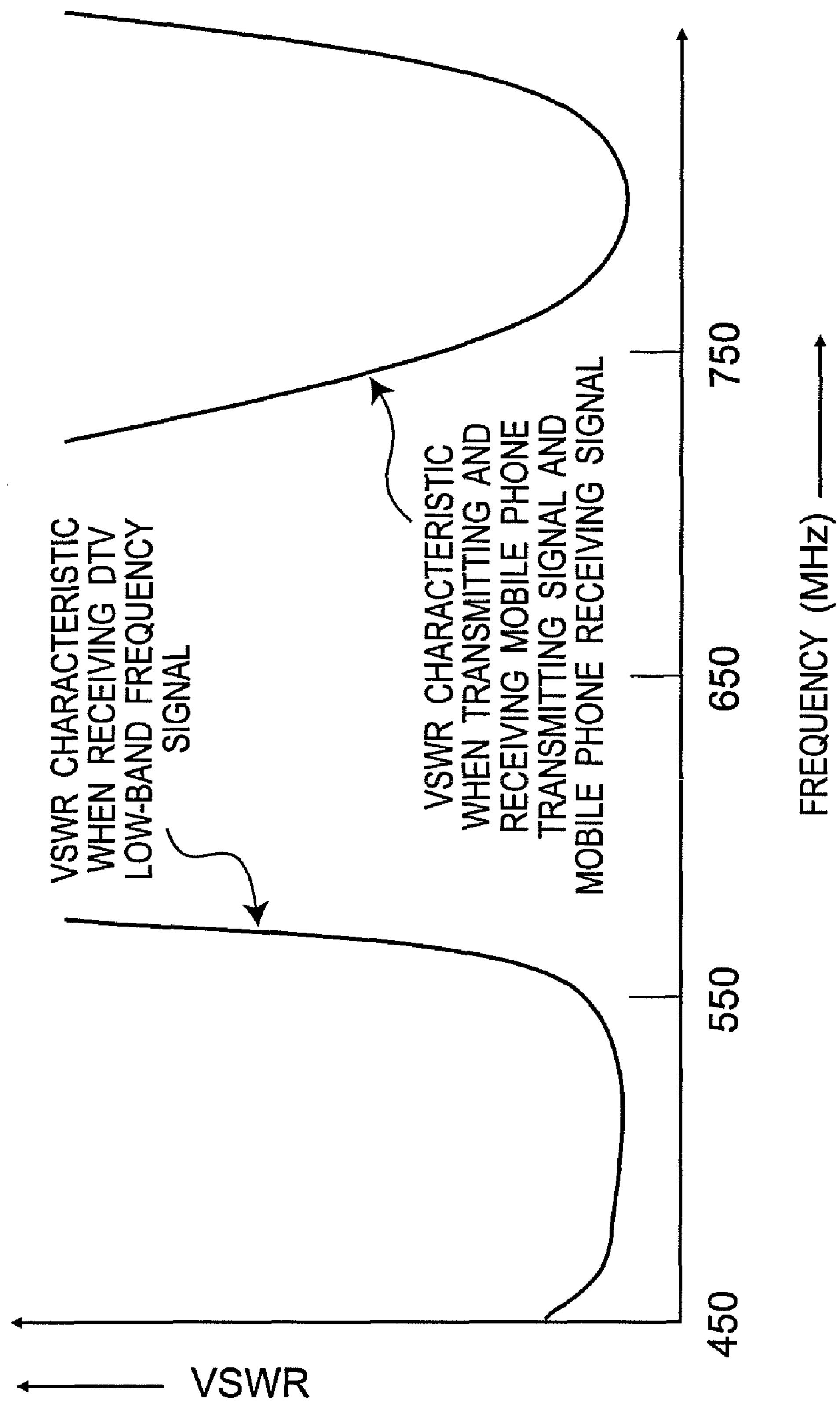
FIG. 4 is a graph showing VSWR characteristics of an antenna element 101 and a matching circuit unit 110A of FIG. 1.
Figure 5:
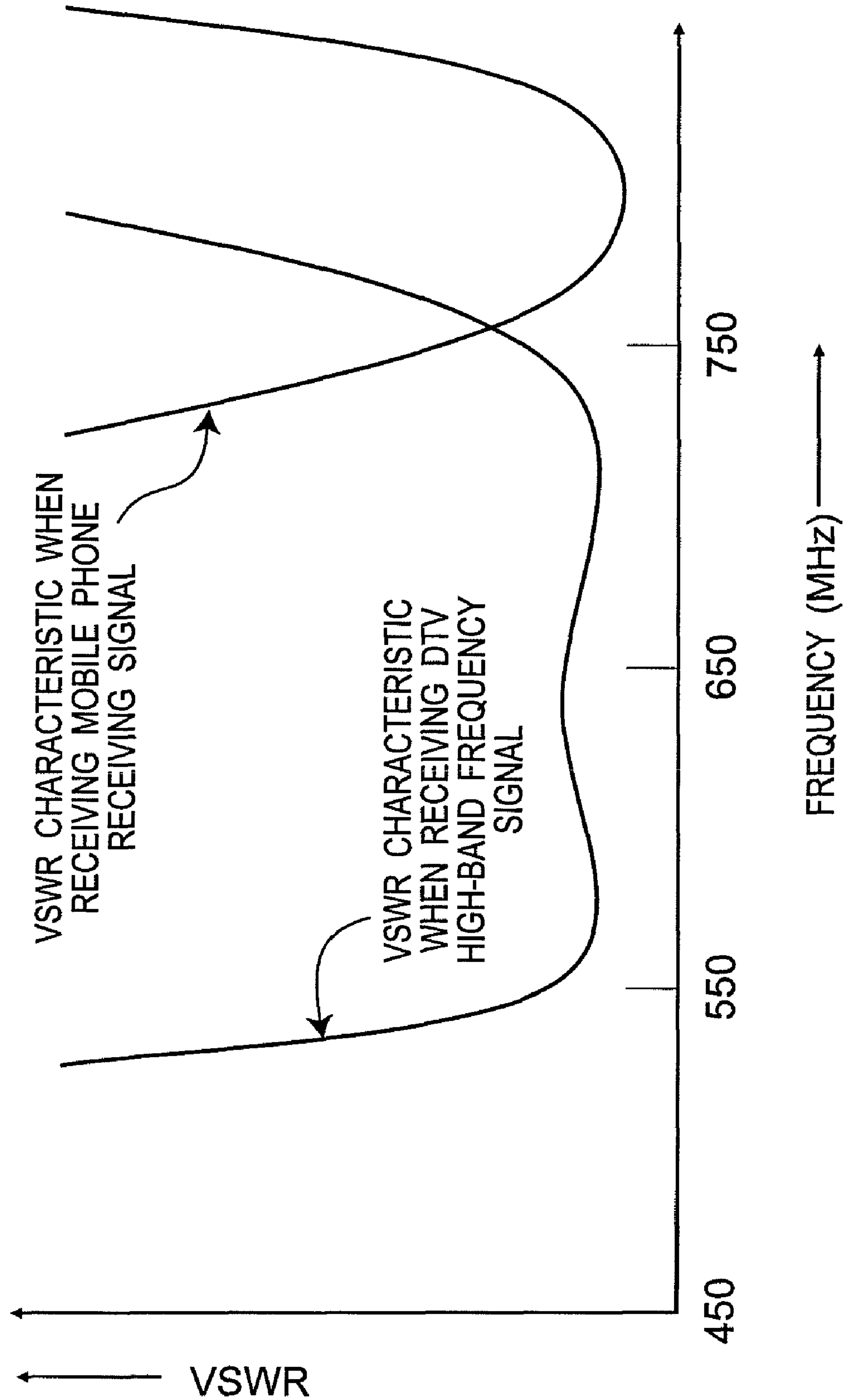
FIG. 5 is a graph showing VSWR characteristics of an antenna element 102 and a matching circuit unit 110B of FIG. 1.

FIG. 4 is a graph showing VSWR (Voltage Standing Wave Ratio) characteristics of the antenna element 101 and the matching circuit unit 110A of FIG. 1. FIG. 5 is a graph showing VSWR characteristics of the antenna element 102 and the matching circuit unit 110B of FIG. 1. Referring to FIG. 4, one can see a VSWR characteristic when transmitting and receiving the mobile phone transmitting signals and mobile phone receiving signals in the band B1 through the antenna element 101, and a VSWR characteristic when receiving the DTV low-band frequency signals in the band B2L through the antenna element 101. According to FIG. 4, one can see that the frequency of the mobile phone transmitting signals and mobile phone receiving signals is far from the frequency of the DTV low-band frequency signal, enough to avoid disturbance. Further, in this case, the matching circuit unit 110A connected to the antenna element 101 achieves an appropriate impedance match for transmitting and receiving the mobile phone transmitting signals and mobile phone receiving signals, and an appropriate impedance match for receiving the DTV low-band frequency signals. Referring to FIG. 5, one can see a VSWR characteristic when receiving the mobile phone receiving signals in the band B1 through the antenna element 102, and a VSWR characteristic when receiving the DTV high-band frequency signals in the band B2H through the antenna element 102. According to FIG. 5, although the frequency of the mobile phone receiving signals is close to the frequency of the DTV high-band frequency signals, no disturbance occurs between these signals because both of them are in receiving operation. Further, in this case, the matching circuit unit 110B connected to the antenna element 102 achieves an appropriate impedance match for receiving the mobile phone receiving signals, and an appropriate impedance match for receiving the DTV high-band frequency signals. According to FIGS. 4 and 5, one can see that it is possible to suppress the influence on the reception characteristics of the DTV high-band frequency signals caused from the mobile phone transmitting signals to be transmitted, by using separate antenna elements, i.e., the antenna element 101 for transmitting the mobile phone transmitting signals and the antenna element 102 for receiving the DTV high-band frequency signals.

Figure 6:
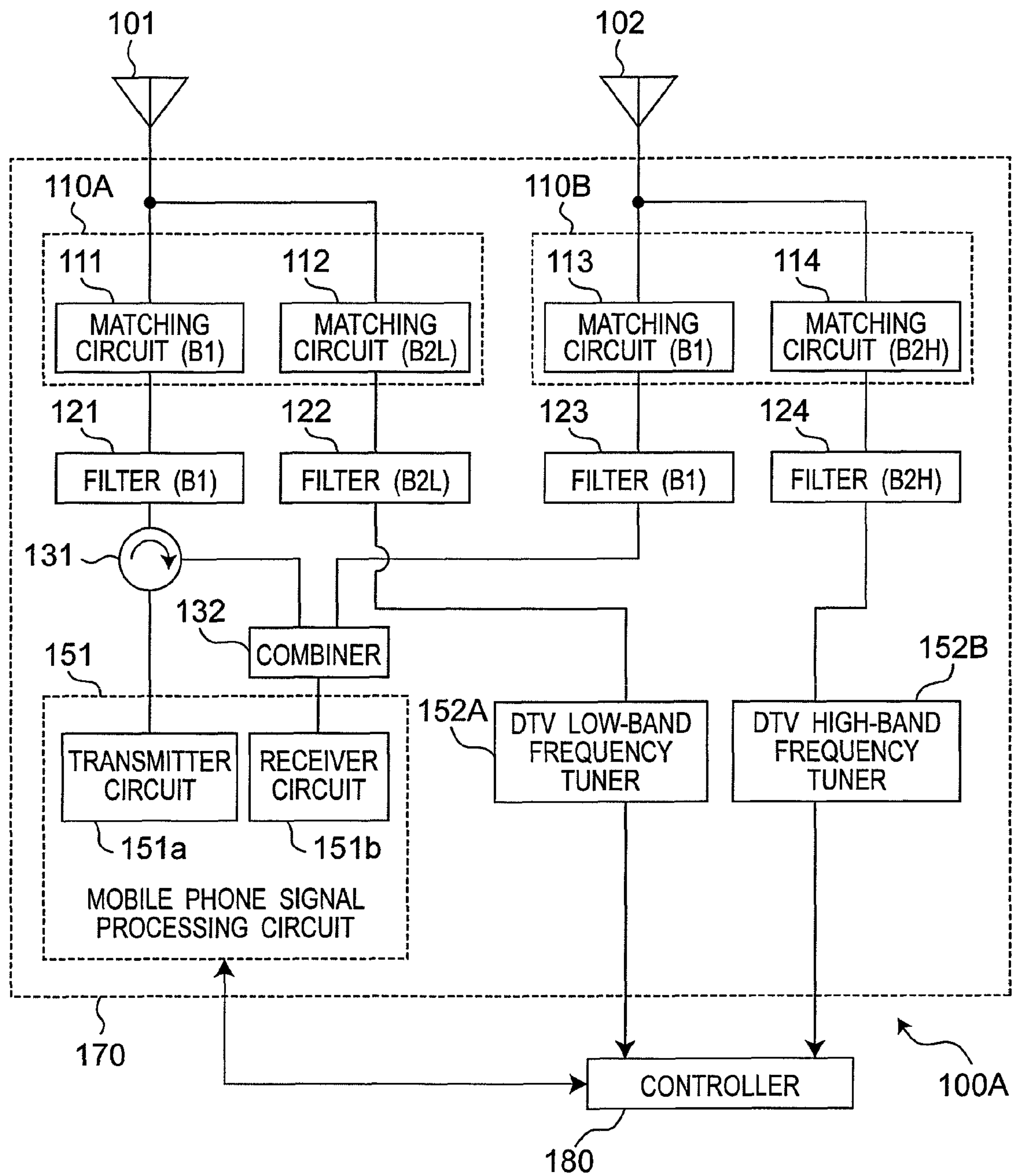
FIG. 6 is a block diagram showing a configuration of a wireless communication circuit 170 of a portable wireless communication apparatus 100A according to a first modified preferred embodiment of the first preferred embodiment of the present invention.

FIG. 6 is a block diagram showing a configuration of a wireless communication circuit 170 of a portable wireless communication apparatus 100A according to a first modified preferred embodiment of the present preferred embodiment. The portable wireless communication apparatus 100A is characterized in that it is provided with a DTV low-band frequency tuner 152A and a DTV high-band frequency tuner 152B for demodulating low-band frequency signals and high-band frequency signals, respectively, in place of the switch 141, the DTV tuner 152, and the tuner controller 160 of FIG. 1. In this case, the low-band frequency signals outputted from a filter 122 are inputted to the DTV low-band frequency tuner 152A, and the high-band frequency signals outputted from a filter 124 are inputted to the DTV high-band frequency tuner 152B. The signals demodulated by the DTV low-band frequency tuner 152A and the DTV high-band frequency tuner 152B are passed to a controller 180 external to the wireless communication circuit 170, for further processes including playback of videos and audios, etc. The portable wireless communication apparatus 100A may be further provided with a controller for controlling the demodulating processes of the DTV low-band frequency tuner 152A and the DTV high-band frequency tuner 152B. Thus, by providing separate tuners for the DTV low-band frequency signals and for the DTV high-band frequency signals, it is possible to record in a channel of the high-frequency band while watching in a channel of the low-frequency band, or alternatively, it is possible to simultaneously operate a mobile phone signal processing circuit 151, the DTV low-band frequency tuner 152A, and the DTV high-band frequency tuner 152B, so as to record in one channel from the DTV low-frequency band and record in one channel from the DTV high-frequency band while using the portable wireless communication apparatus 100A for talking.

Figure 7:
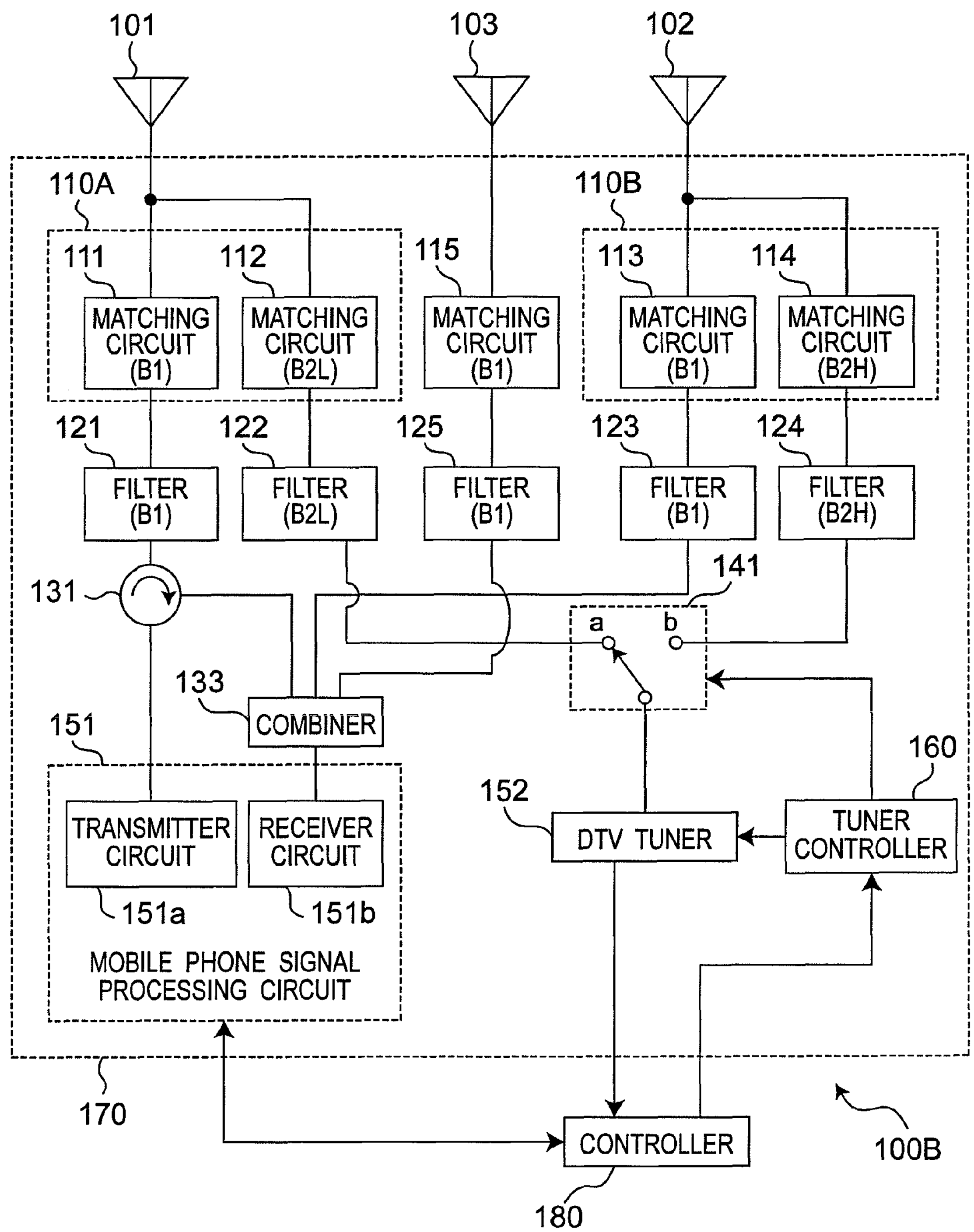
FIG. 7 is a block diagram showing a configuration of a wireless communication circuit 170 of a portable wireless communication apparatus 100B according to a second modified preferred embodiment of the first preferred embodiment of the present invention.

FIG. 7 is a block diagram showing a configuration of a wireless communication circuit 170 of a portable wireless communication apparatus 100B according to a second modified preferred embodiment of the present preferred embodiment. In the preferred embodiment shown in FIG. 1, the portable wireless communication apparatus 100 is provided with two antenna elements 101 and 102, but the preferred embodiment is not limited thereto and three or more antenna elements may be provided. The portable wireless communication apparatus 100B of FIG. 7 shows a modified preferred embodiment provided with three antenna elements 101, 102, and 103.

The additional antenna element 103 is connected to an impedance matching circuit 115, that is provided for impedance matching between the antenna element 103 and components at its subsequent stage. The impedance matching circuit 115 is connected to a combiner 133 through a filter 125. The impedance matching circuit 115 matches impedances between the antenna element 103 and the filter 125 (or subsequent circuitry, including the filter 125) to receive mobile phone receiving signals in the band B1. The filter 125 is a band-pass filter for the band B1, that passes the mobile phone receiving signals to be received. The combiner 133 uses the combining diversity for a mobile phone receiving signal received by the antenna element 101 and inputted thereto through an impedance matching circuit 111, a filter 121, and a circulator 131, a mobile phone receiving signal received by the antenna element 102 and inputted thereto through an impedance matching circuit 113 and a filter 123, and a mobile phone receiving signal received by the antenna element 103 and inputted thereto through the impedance matching circuit 115 and the filter 125, and the combiner 133 outputs the combined mobile phone receiving signal to a receiver circuit 151*b* in a mobile phone signal processing circuit 151. The receiving performance of the mobile phone receiving signals is improved by using the combining diversity for the mobile phone receiving signals received by the three antenna elements 101, 102, and 103. In the case of the modified preferred embodiment shown in FIG. 7, only any two of the three antenna elements 101, 102, and 103 (i.e., the antenna elements 101 and 102) are respectively used to receive DTV high-band frequency signals and DTV low-band frequency signals. A tuner controller 160 controls a switch 141 in the same manner as that in the case of FIG. 1.

Figure 8:
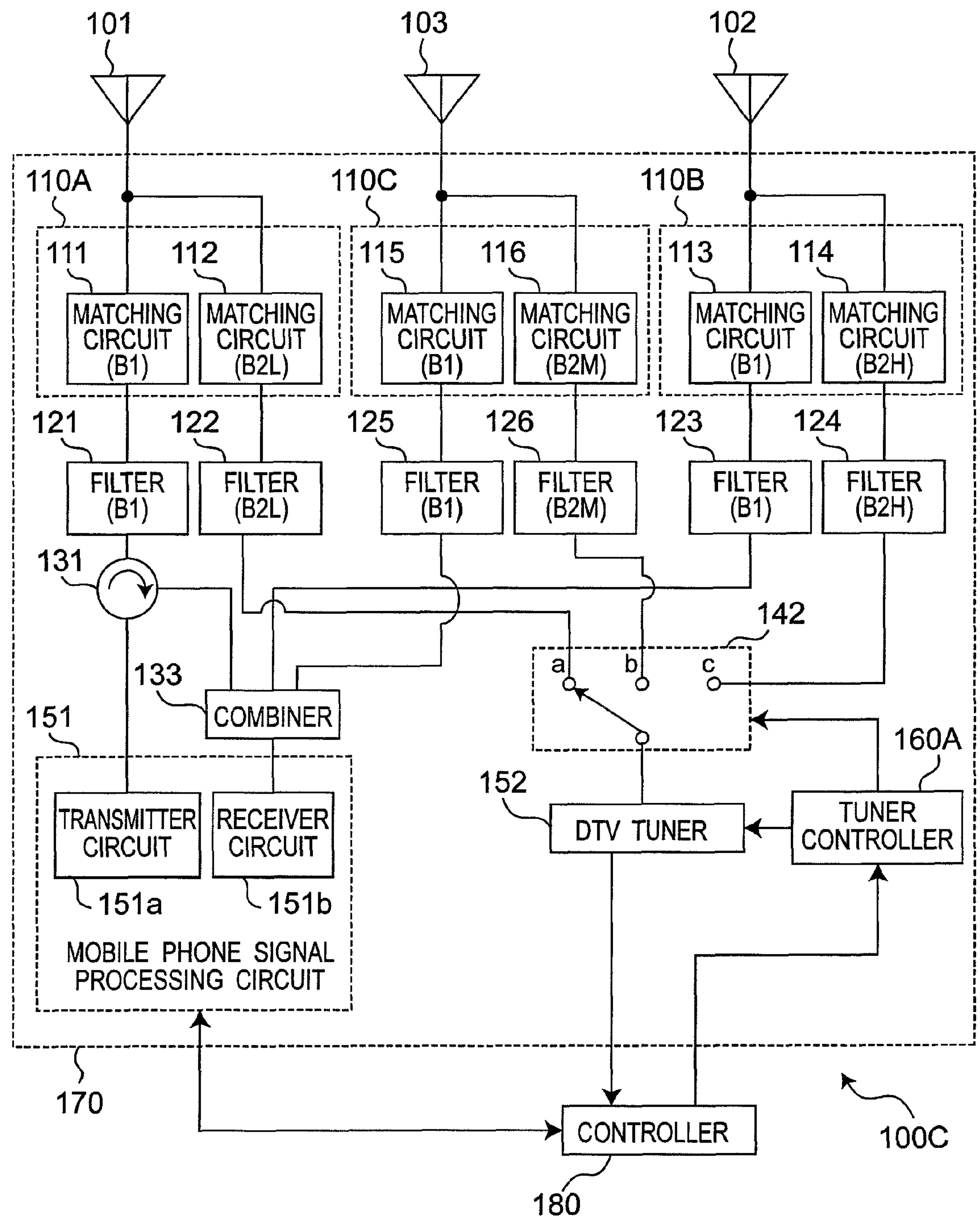
FIG. 8 is a block diagram showing a configuration of a wireless communication circuit 170 of a portable wireless communication apparatus 100C according to a third modified preferred embodiment of the first preferred embodiment of the present invention.

FIG. 8 is a block diagram showing a configuration of a wireless communication circuit 170 of a portable wireless communication apparatus 100C according to a third modified preferred embodiment of the present preferred embodiment. The portable wireless communication apparatus 100C of this modified preferred embodiment is characterized in that it is provided with three antenna elements 101, 102, and 103 as in the modified preferred embodiment of FIG. 7, and further characterized in that the DTV frequency band is divided into three frequency bands, i.e., a low-frequency band, a mid-band frequency band (denoted as "B2M" in FIG. 8), and a high-frequency band, and all of the three antenna elements 101, 102, and 103 are used for mobile phone transmitting signals and mobile phone receiving signals, and for DTV signals, that is, the antenna element 101 is used to transmit and receive the mobile phone transmitting signals and mobile phone receiving signals and to receive DTV low-band frequency signals, the antenna element 103 is used to receive the mobile phone receiving signals and to receive DTV mid-band frequency signals, and the antenna element 102 is used to receive the mobile phone receiving signals and to receive DTV high-band frequency signals.

Referring to FIG. 8, the antenna element 103 is connected to a combiner 133 through an impedance matching circuit 115 and a filter 125, as in the modified preferred embodiment of FIG. 7, and is also connected to an impedance matching circuit 116 provided for impedance matching between the antenna element 103 and components at their subsequent stage. The impedance matching circuits 115 and 116 function as a matching circuit unit 110C for the antenna element 103. A filter 126 is connected to a subsequent stage of the impedance matching circuit 116. The impedance matching circuit 116 matches impedances between the antenna element 103 and the filter 126 (or subsequent circuitry, including the filter 126) to receive the DTV mid-band frequency signals in the band B2M. The filter 126 is a band-pass filter for the band B2M, that passes the DTV mid-band frequency signals to be received. The portable wireless communication apparatus 100C of FIG. 8 is provided with a switch 142, in place of the switch 141 of FIG. 7, and filters 122, 124, and 126 are respectively connected to the switch 142. The switch 142 passes to a DTV tuner 152, any one of a low-band frequency signal outputted from the filter 122, a mid-band frequency signal outputted from the filter 126, and a high-band frequency signal outputted from the filter 124, according to control of a tuner controller 160A.

The portable wireless communication apparatus 100C may be further provided with more than three antenna elements. Further, the DTV frequency band may be divided into more than three bands, and the portable wireless communication apparatus 100C may receive each signal having a frequency within each divided band by a different antenna element, and input any one of the received signals to the DTV tuner 152. Furthermore, the portable wireless communication apparatus 100C may be provided with more than three DTV tuners each receiving DTV signals in a different frequency band, and demodulate DTV signals received by different antenna elements, by using the different DTV tuners, respectively.

According to the configuration of FIG. 8, it is possible to perform communications without degradation in the reception characteristics of the DTV mid-band frequency signals and the DTV high-band frequency signals, caused by the mobile phone transmitting signals to be transmitted from the portable wireless communication apparatus 100C, etc. Furthermore, according to a frequency band of the DTV signals, it is possible to select an appropriate antenna element for receiving the DTV signals in that frequency band, from among the antenna elements 101, 102, and 103.

Figure 9:
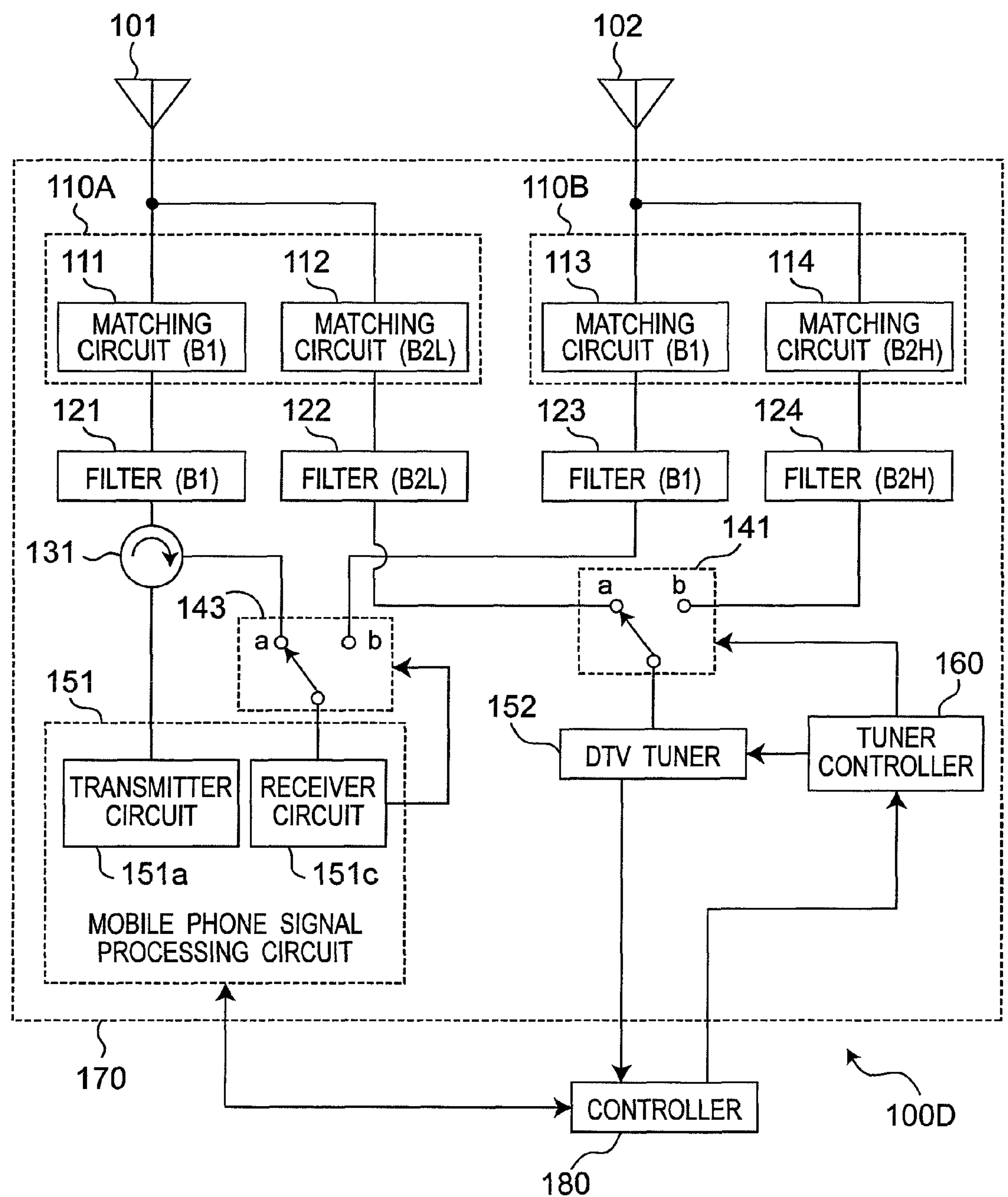
FIG. 9 is a block diagram showing a configuration of a wireless communication circuit 170 of a portable wireless communication apparatus 100D according to a fourth modified preferred embodiment of the first preferred embodiment of the present invention.

FIG. 9 is a block diagram showing a configuration of a wireless communication circuit 170 of a portable wireless communication apparatus 100D according to a fourth modified preferred embodiment of the first preferred embodiment of the present invention. The portable wireless communication apparatus 100D of this modified preferred embodiment is characterized in that it is provided with a switch 143 for using the selection diversity for mobile phone receiving signals respectively received by antenna elements 101 and 102, in place of the combiner 132 of FIG. 1.

The switch 143 is operated such that one of a mobile phone receiving signal received by the antenna element 101 and inputted thereto through an impedance matching circuit 111, a filter 121, and a circulator 131, and a mobile phone receiving signal received by the antenna element 102 and inputted thereto through an impedance matching circuit 113 and a filter 123, is passed to a mobile phone signal processing circuit 151. The mobile phone signal processing circuit 151 includes a receiver circuit 151*c*, in place of the receiver circuit 151*b* of FIG. 1. The receiver circuit 151*c* performs demodulating process of mobile phone receiving signals, and further, obtains RSSI (Received Signal Strength Indicator) of the mobile phone receiving signals passed from the switch 143, and changes the switch 143 so as to increase the RSSI. Specifically, when a mobile phone receiving signal received by the antenna element 101 is inputted to the receiver circuit 151*c*, if RSSI becomes smaller than a predetermined threshold value RSSI0, then the receiver circuit 151*c* changes the switch 143 to input a mobile phone receiving signal received by the antenna element 102 to the receiver circuit 151*c*. Conversely, when a mobile phone receiving signal received by the antenna element 102 is inputted to the receiver circuit 151*c*, if RSSI becomes smaller than the threshold value RSSI0, then the receiver circuit 151*c* changes the switch 143 to input a mobile phone receiving signal received by the antenna element 101 to the receiver circuit 151*c*. Although in the above description the received signal strength indicator (RSSI) is used as a reference for changing the switch 143, the reference is not limited thereto, and any indicator, e.g., C/N (Carrier-to-Noise Power Ratio), BER (Bit Error Rate), or PER (Packet Error Rate), can be used as long as the indicator can detect the degradation in received-signal level or reception characteristics. Thus, when detecting degradation in the radio environment for reception, the portable wireless communication apparatus 100D can use the selection diversity to change among the antenna elements for receiving the mobile phone receiving signals, i.e., can control the switch 143 so as to increase a received-signal level such as RSSI, and input one of the mobile phone receiving signals respectively received by the antenna elements 101 and 102, to the mobile phone signal processing circuit 151. Further, in a portable wireless communication apparatus provided with three or more antenna elements, such as those shown in FIGS. 4 and 5, the selection diversity may be used for mobile phone receiving signals respectively received by the three or more antenna elements.

Figure 22:
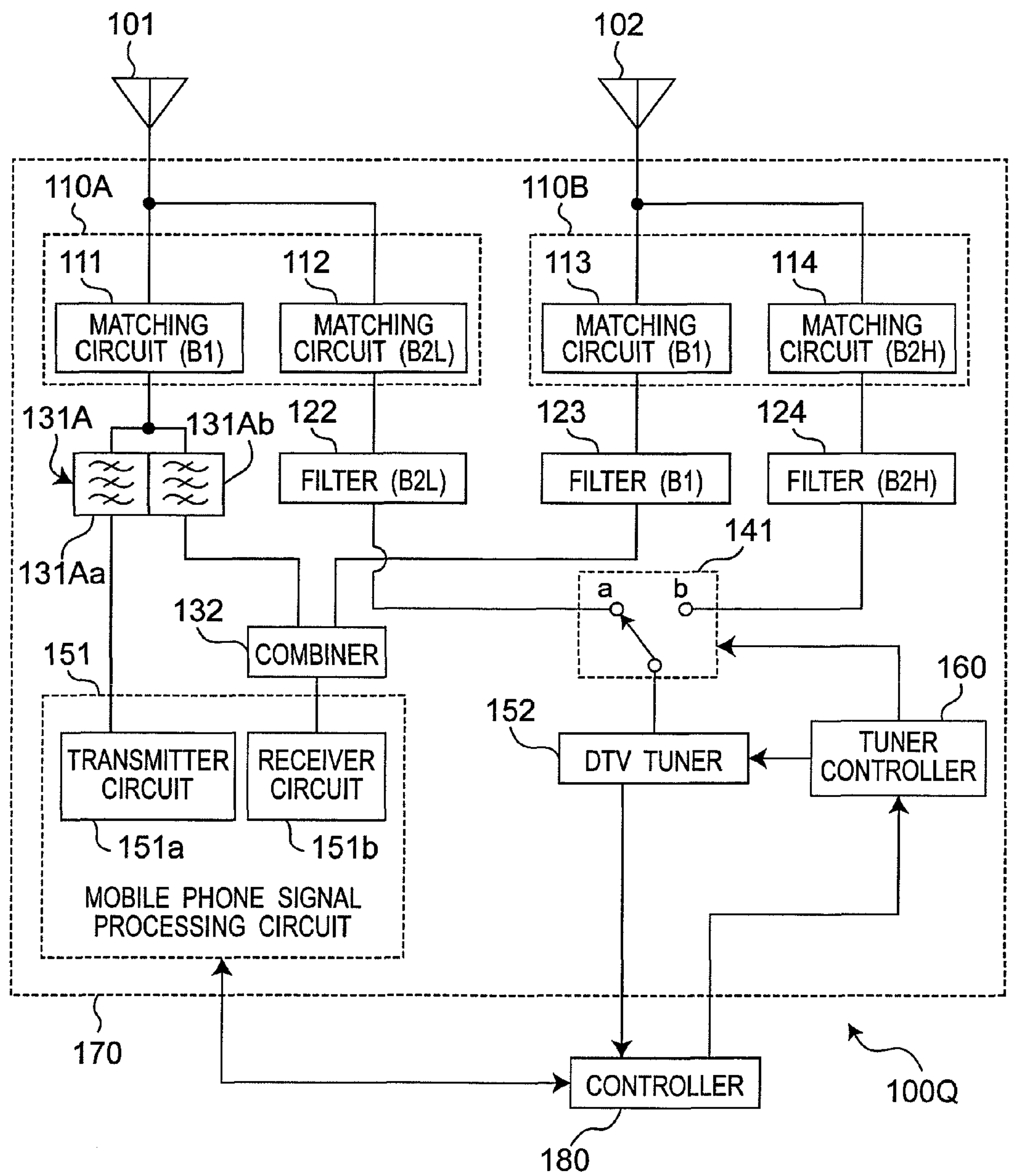
FIG. 22 is a block diagram showing a configuration of a wireless communication circuit 170 of a portable wireless communication apparatus 100Q according to a fifth modified preferred embodiment of the first preferred embodiment of the present invention.

FIG. 22 is a block diagram showing a configuration of a wireless communication circuit 170 of a portable wireless communication apparatus 100Q according to a fifth modified preferred embodiment of the first preferred embodiment of the present invention. To enable both transmission of mobile phone transmitting signals and reception of mobile phone receiving signals through an antenna element 101, other circuit elements may be used instead of the circulator 131. The wireless communication circuit 170 of FIG. 22 is provided with a duplexer (antenna duplexer) 131A, in place of the filter 121 and the circulator 131 of FIG. 1. The duplexer 131A includes filters 131Aa and 131Ab as its internal components. The filter 131Aa is a band-pass filter for the band B1, that passes mobile phone transmitting signals to be transmitted. The filter 131Ab is a band-pass filter for the band B1, that passes mobile phone receiving signals to be received. An impedance matching circuit 111 matches impedances between the antenna element 101 and the filters 131Aa and 131Ab of the duplexer 131A (or subsequent circuitry, including the duplexer 131A) to transmit and receive the mobile phone transmitting signals and mobile phone receiving signals in the band B1. According to this configuration, it is possible also in the present modified preferred embodiment to transmit and receive the mobile phone transmitting signals and mobile phone receiving signals through the antenna element 101, as in the case of FIG. 1. The configuration of the modified preferred embodiment of FIG. 22 may be applied to the configurations of the first to fourth modified preferred embodiments of the present preferred embodiment, or to the configuration of a fourth preferred embodiment to be described later.

As described above, according to the portable wireless communication apparatus 100 of the present preferred embodiment and the portable wireless communication apparatuses 100A to 100D and 100Q of the modified preferred embodiments of the present preferred embodiment, it is possible to perform communications without degradation in the reception characteristics of the DTV high-band frequency signals caused by the mobile phone transmitting signals to be transmitted from the portable wireless communication apparatus 100, etc., by using separate antenna elements, i.e., the antenna element 102 for receiving the DTV high-band frequency signals and the antenna element 101 for transmitting the mobile phone transmitting signals. Thus, it is possible to provide the portable wireless communication apparatus 100 capable of performing multiple wireless communications that respectively use frequency bands close to each other.

Furthermore, by using a common antenna element as an antenna element for receiving the DTV signals, and an antenna element for transmitting and receiving the mobile phone transmitting signals and mobile phone receiving signals and/or for receiving the mobile phone receiving signals, it is possible to watch DTV without increasing the number of antenna elements of a portable wireless communication apparatus. Further, the matching circuit unit 110A connected to the antenna element 101 achieves an appropriate impedance match for transmitting and receiving the mobile phone transmitting signals and mobile phone receiving signals and an appropriate impedance match for receiving the DTV low-band frequency signals, and the matching circuit unit 110B connected to the antenna element 102 achieves an appropriate impedance match for receiving the mobile phone receiving signals and an appropriate impedance match for receiving the DTV high-band frequency signals.

Moreover, since the antenna elements 101 and 102 are always connected to the mobile phone signal processing circuit 151, and one of the antenna elements 101 and 102 is always connected to the DTV tuner 152, it is possible to operate the portable wireless communication apparatus 100, etc. as a DTV tuner and at the same time to operate as a phone, that is, e.g., to record a DTV program when using as a phone for talking.

Furthermore, by using separate antenna elements for receiving DTV low-band frequency signals and for receiving DTV high-band frequency signals, it is possible to improve DTV reception characteristics over a wide band, as compared with the case of using only one antenna element.

Moreover, not the antenna element 102, but the antenna element 101 with a larger size than that of the antenna element 102 is selected as an antenna element for receiving the DTV low-band frequency signals (i.e., DTV signals using a lower frequency) as shown in FIGS. 2 and 3, and accordingly, it is possible to obtain better reception characteristics.

In the present preferred embodiment, although the portable wireless communication apparatus 100 is configured as shown in FIGS. 2 and 3, the configuration is not limited thereto.

Second Preferred Embodiment

Figure 10:
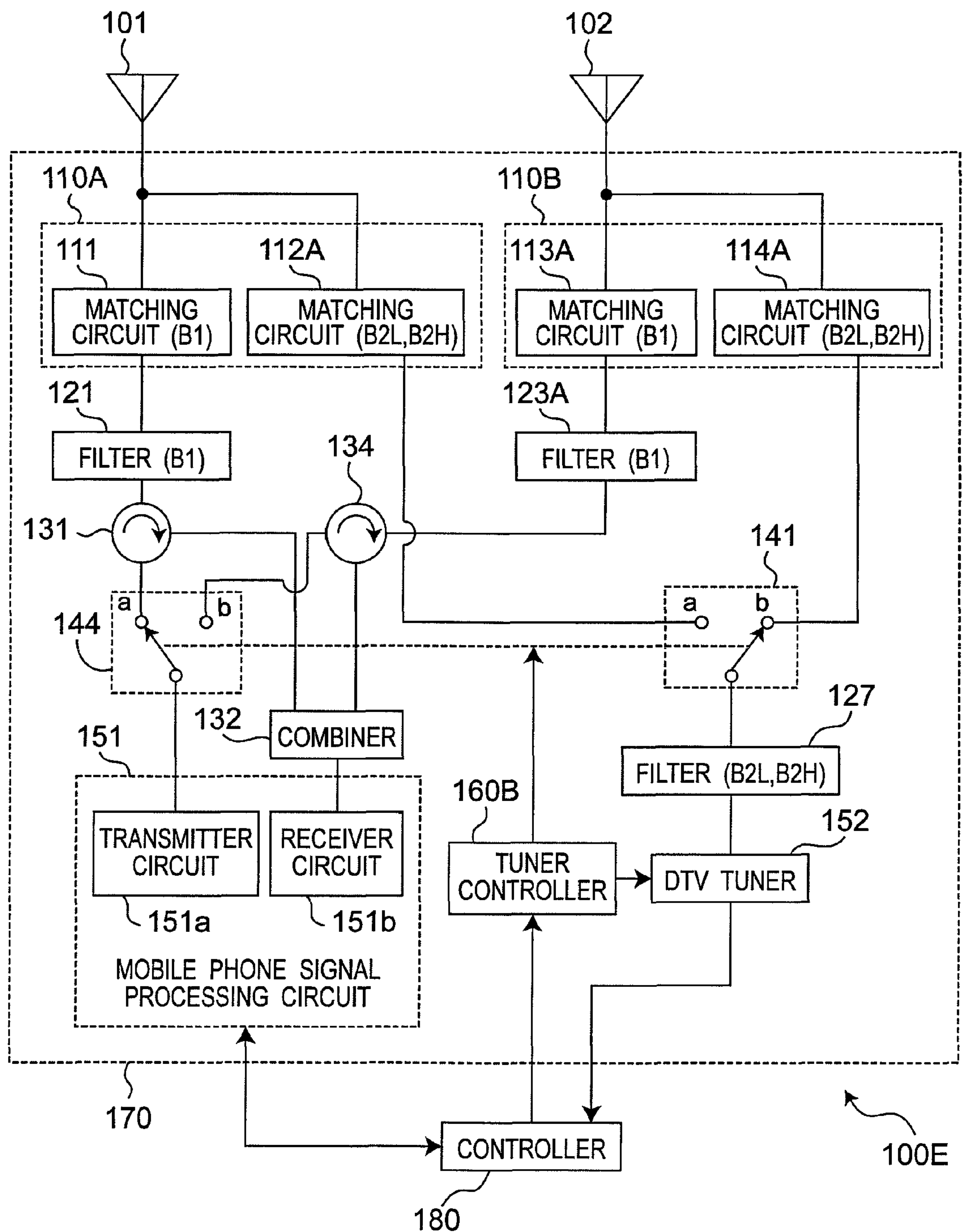
FIG. 10 is a block diagram showing a configuration of a wireless communication circuit 170 of a portable wireless communication apparatus 100E according to a second preferred embodiment of the present invention.

FIG. 10 is a block diagram showing a configuration of a wireless communication circuit 170 of a portable wireless communication apparatus 100E according to a second preferred embodiment of the present invention. The portable wireless communication apparatus 100E of the present preferred embodiment has a function of transmitting and receiving mobile phone transmitting signals and mobile phone receiving signals and a function of receiving DTV. The portable wireless communication apparatus 100E of the present preferred embodiment is characterized by preventing that DTV high-band frequency signals are disturbed by the mobile phone transmitting signals to be transmitted from the portable wireless communication apparatus 100E, as with the first preferred embodiment, and further characterized by using the selection diversity to select and use one of antenna elements 101 and 102 for transmitting the mobile phone transmitting signals.

Referring to FIG. 10, the antenna element 101 is connected to impedance matching circuits 111 and 112A of the wireless communication circuit 170, and the antenna element 102 is connected to impedance matching circuits 113A and 114A of the wireless communication circuit 170. The impedance matching circuits 111, 112A, 113A, and 114A are provided for impedance matching between the antenna elements 101 and 102, and components at their subsequent stages. The impedance matching circuits 111 and 112A function as a matching circuit unit 110A for the antenna element 101, and the impedance matching circuits 113A and 114A function as a matching circuit unit 110B for the antenna element 102. A filter 121 is connected to a subsequent stage of the impedance matching circuit 111, as with the portable wireless communication apparatus 100 of FIG. 1. The impedance matching circuit 111 matches impedances between the antenna element 101 and the filter 121 (or subsequent circuitry, including the filter 121) to transmit and receive mobile phone transmitting signals and mobile phone receiving signals in the band B1. A filter 127 is connected to a subsequent stage of the impedance matching circuit 112A, through a switch 141. The impedance matching circuit 112A matches impedances between the antenna element 101, and the switch 141 and the filter 127 (or subsequent circuitry, including the switch 141 and the filter 127) to receive DTV signals in the bands B2L and B2H. For ease of explanation, in the portable wireless communication apparatus 100E of FIG. 10, the DTV frequency band is not divided into a high-frequency band B2H and a low-frequency band B2L, and the impedance matching circuits 112A and 114A and the filter 127 of the portable wireless communication apparatus 100E process DTV signals over one single frequency band of 470 MHz to 770 MHz. A filter 123A is connected to a subsequent stage of the impedance matching circuit 113A. The impedance matching circuit 113A matches impedances between the antenna element 102 and the filter 123A (or subsequent circuitry, including the filter 123A) to transmit and receive the mobile phone transmitting signals and mobile phone receiving signals in the band B1. The filter 123A is a band-pass filter for the band B1, that passes the mobile phone transmitting signals and mobile phone receiving signals to be transmitted and received. The filter 127 is connected to a subsequent stage of the impedance matching circuit 114A, through the switch 141. The impedance matching circuit 114A matches impedances between the antenna element 102, and the switch 141 and the filter 127 (or subsequent circuitry, including the switch 141 and the filter 127) to receive the DTV signals in the bands B2L and B2H.

The filter 121 is connected to a switch 144 through a circulator 131, and the filter 123A is connected to the switch 144 through a circulator 134. The switch 144 is operated to connect one of the circulators 131 and 134 to a transmitter circuit 151*a* in a mobile phone signal processing circuit 151, according to control of a tuner controller 160B. Thus, a mobile phone transmitting signal generated by the transmitter circuit 151*a* for transmission is passed either to the antenna element 101 through the circulator 131, the filter 121, and the impedance matching circuit 111, or to the antenna element 102 through the circulator 134, the filter 123A, and the impedance matching circuit 113A, according to the connection of the switch 144. By changing of the switch 144, it is possible to use the selection diversity to radiate the mobile phone transmitting signals to be transmitted to a mobile phone base station apparatus (not shown), from one of the antenna elements 101 and 102. The filter 121 is further connected to one of input terminals of a combiner 132 through the circulator 131, and the filter 123A is further connected to the other input terminal of the combiner 132 through the circulator 134. The combiner 132 uses the combining diversity for a mobile phone receiving signal received by the antenna element 101 and inputted thereto through the impedance matching circuit 111, the filter 121, and the circulator 131, and a mobile phone receiving signal received by the antenna element 102 and inputted thereto through the impedance matching circuit 113A, the filter 123A, and the circulator 134, and the combiner 132 outputs the combined mobile phone receiving signal to a receiver circuit 151*b* in the mobile phone signal processing circuit 151. The circulator 131 passes the mobile phone transmitting signal to be transmitted, which is inputted from the transmitter circuit 151*a* through the switch 144, to the filter 121 only, and passes the mobile phone receiving signal inputted from the filter 121, to the combiner 132 only. Similarly, the circulator 134 passes the mobile phone transmitting signal to be transmitted, which is inputted from the transmitter circuit 151*a* through the switch 144, to the filter 123A only, and passes the mobile phone receiving signal inputted from the filter 123A, to the combiner 132 only.

On the other hand, the switch 141 passes one of output signals from the impedance matching circuits 112A and 114A to a DTV tuner 152 through the filter 127, according to control of the tuner controller 160B. The filter 127 is a band-pass filter for the bands B2L and B2H, that passes DTV receiving signals.

A controller 180 sends a control signal to the tuner controller 160B for instructing to use the selection diversity for transmission, when detecting degradation in the radio environment for transmission, e.g., when no response signal to a mobile phone transmitting signal is received from a mobile phone base station apparatus (not shown) even after a predetermined period of time has elapsed since transmitting the mobile phone transmitting signal to the base station apparatus. The controller 180 may send a control signal to the tuner controller 160B for instructing to use the selection diversity for transmission, when, for example, the received-signal level of DTV signals decreases. According to the control signal, the tuner controller 160B operates the switches 141 and 144 in conjunction with each other, so as to go into one of the following two cases. In a first case, as shown in FIG. 10, the switch 144 connects the transmitter circuit 151*a* to the circulator 131 (i.e., one of the circulators that is connected to the antenna element 101), while the switch 141 connects the filter 127 to the impedance matching circuit 114A (i.e., one of the impedance matching circuits that is connected to the antenna element 102). On the other hand, in a second case, the switch 144 connects the transmitter circuit 151*a* to the circulator 134 (i.e., one of the circulators that is connected to the antenna element 102), while the switch 141 connects the filter 127 to the impedance matching circuit 112A (i.e., one of the impedance matching circuits that is connected to the antenna element 101). Accordingly, in the first case, a mobile phone transmitting signal generated by the transmitter circuit 151*a* for transmission is passed to the antenna element 101 through the switch 144, the circulator 131, the filter 121, and the impedance matching circuit 111, and then radiated from the antenna element 101 to the mobile phone base station apparatus; on the other hand, a DTV signal received by the antenna element 102 is passed to the DTV tuner 152 through the impedance matching circuit 114A, the switch 141, and the filter 127, and is then subjected to signal processing such as demodulation. In the second case, a mobile phone transmitting signal generated by the transmitter circuit 151*a* for transmission is passed to the antenna element 102 through the switch 144, the circulator 134, the filter 123A, and the impedance matching circuit 113A, and then radiated from the antenna element 102 to the mobile phone base station apparatus; on the other hand, a DTV signal received by the antenna element 101 is passed to the DTV tuner 152 through the impedance matching circuit 112A, the switch 141, and the filter 127, and is then subjected to signal processing such as demodulation. The control signal to be sent to the tuner controller 160B by the controller 180 further includes, e.g., information on a channel selected by a user input through the keyboard 207, etc., and the tuner controller 160B controls demodulating operation of the DTV tuner 152 based on this channel information, etc.

According to the portable wireless communication apparatus 100E of the present preferred embodiment, since the antenna elements 101 and 102 are always connected to the mobile phone signal processing circuit 151, and one of the antenna elements 101 and 102 is always connected to the DTV tuner 152, it is possible to operate the portable wireless communication apparatus 100E, etc. as a DTV tuner and at the same time to operate as a phone, that is, e.g., to record a DTV program when using as a phone for talking.

Figure 11:
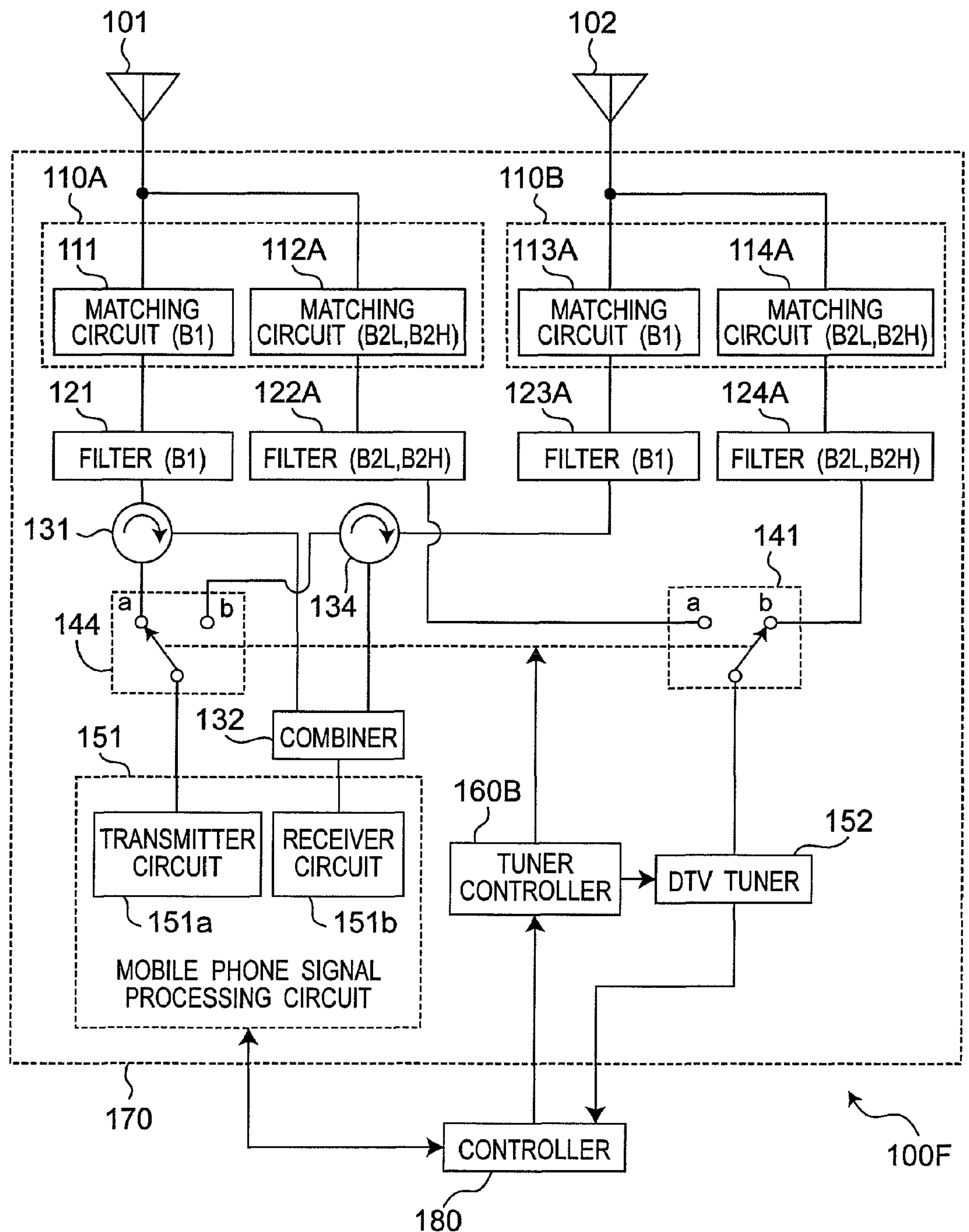
FIG. 11 is a block diagram showing a configuration of a wireless communication circuit 170 of a portable wireless communication apparatus 100F according to a first modified preferred embodiment of the second preferred embodiment of the present invention.

FIG. 11 is a block diagram showing a configuration of a wireless communication circuit 170 of a portable wireless communication apparatus 100F according to a first modified preferred embodiment of the second preferred embodiment of the present invention. This modified preferred embodiment is characterized in that the filter 127 provided to a subsequent stage of the switch 141 in the portable wireless communication apparatus 100E of FIG. 10 is moved to a previous stage of the switch 141. This modified preferred embodiment is provided with a filter 122A between an impedance matching circuit 112A and a switch 141, and a filter 124A between an impedance matching circuit 114A and the switch 141, in place of the filter 127 between the switch 141 and the DTV tuner 152 of FIG. 10. The impedance matching circuit 112A matches impedances between an antenna element 101, and the switch 141 and the filter 122A (or subsequent circuitry, including the switch 141 and the filter 122A) to receive DTV signals. The impedance matching circuit 114A matches impedances between an antenna element 102, and the switch 141 and the filter 124A (or subsequent circuitry, including the switch 141 and the filter 124A) to receive the DTV signals. As with the filter 127, the filters 122A and 124A are band-pass filters for the bands B2L and B2H, that pass DTV receiving signals.

Further, a tuner controller 160B can control the switch 141 as follows. Specifically, when a transmitter circuit 151*a* is connected to a circulator 131 (i.e., one of circulators that is connected to the antenna element 101), the tuner controller 160B controls the switch 141 to connect a DTV tuner 152 receiving DTV high-band frequency signals, to the antenna element 102, through the filter 124A and the impedance matching circuit 114A. On the other hand, when the transmitter circuit 151*a* is connected to a circulator 134 (i.e., one of the circulators that is connected to the antenna element 102), the tuner controller 160B controls the switch 141 to connect the DTV tuner 152 receiving the DTV high-band frequency signals, to the antenna element 101, through the filter 122A and the impedance matching circuit 112A. Accordingly, in the former case, when transmitting the mobile phone transmitting signals in the band B1 using the antenna element 101, it is possible to receive DTV high-band frequency signals in the band B2H using the antenna element 102, without being disturbed by the mobile phone transmitting signals. In the latter case, when transmitting the mobile phone transmitting signals in the band B1 using the antenna element 102, it is possible to receive the DTV high-band frequency signals in the band B2H using the antenna element 101, without being disturbed by the mobile phone transmitting signals.

Figure 12:
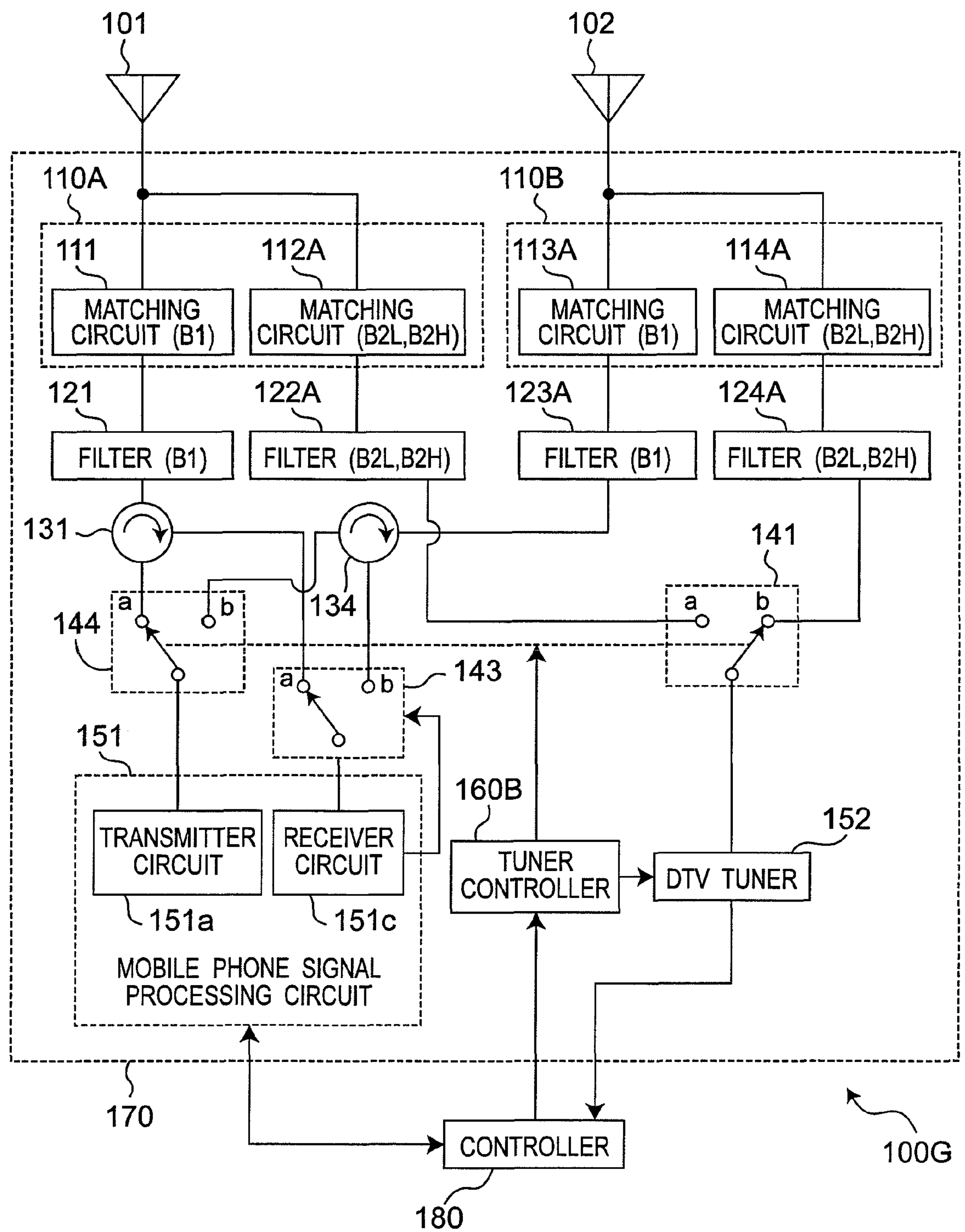
FIG. 12 is a block diagram showing a configuration of a wireless communication circuit 170 of a portable wireless communication apparatus 100G according to a second modified preferred embodiment of the second preferred embodiment of the present invention.

FIG. 12 is a block diagram showing a configuration of a wireless communication circuit 170 of a portable wireless communication apparatus 100G according to a second modified preferred embodiment of the present preferred embodiment. This modified preferred embodiment is characterized in that it has the configuration of the portable wireless communication apparatus 100F of FIG. 11, and further characterized in that it is provided with a switch 143 and a receiver circuit 151*c* for using the selection diversity for mobile phone receiving signals respectively received by antenna elements 101 and 102, as with the portable wireless communication apparatus 100D shown in FIG. 9. Thus, when detecting degradation in the radio environment for reception, the portable wireless communication apparatus 100G uses the selection diversity to change between antenna elements for receiving mobile phone receiving signals, i.e., can control the switch 143 so as to increase a received-signal level such as RSSI, and input one of the mobile phone receiving signals respectively received by the antenna elements 101 and 102, to a mobile phone signal processing circuit 151.

Figure 13:
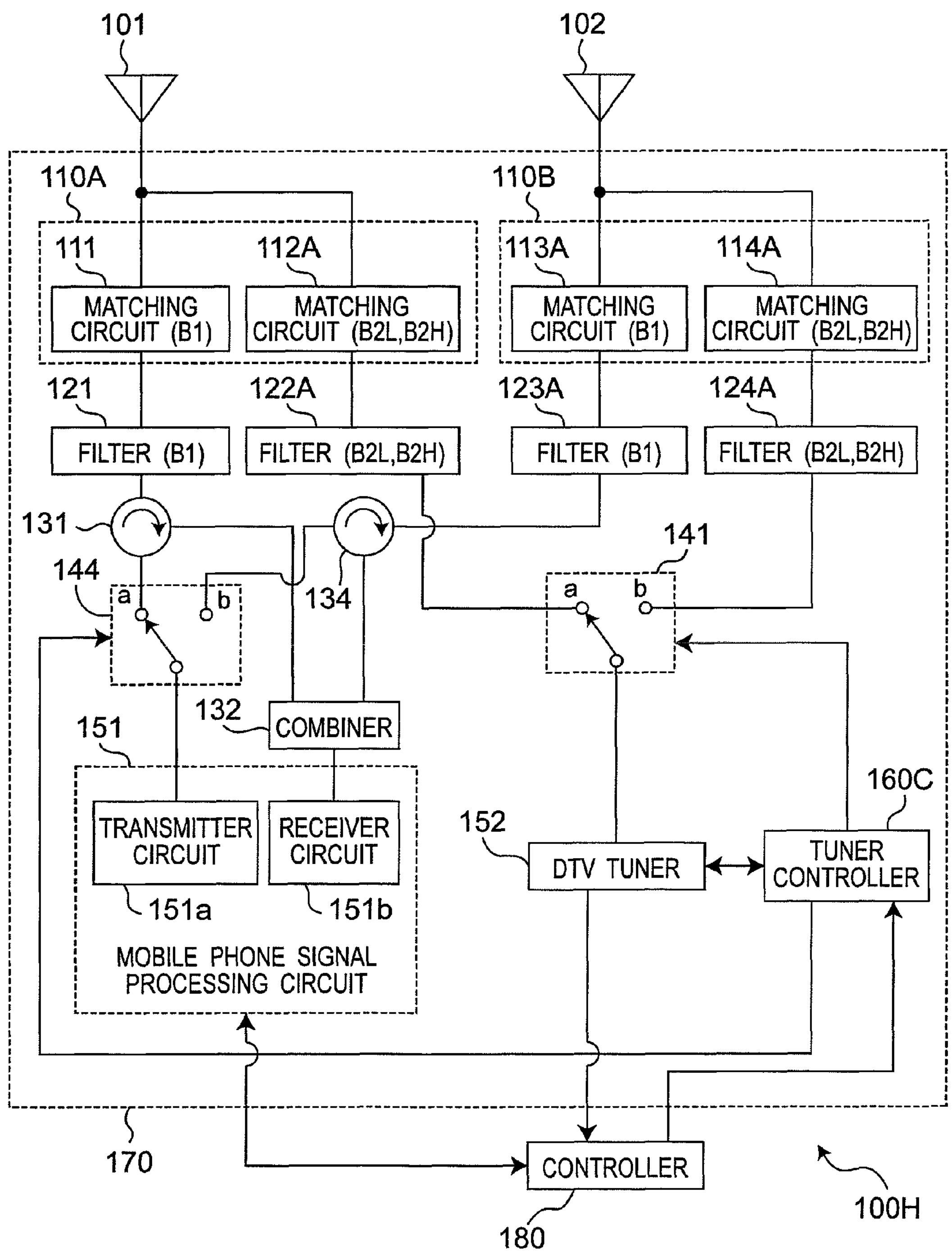
FIG. 13 is a block diagram showing a configuration of a wireless communication circuit 170 of a portable wireless communication apparatus 100H according to a third modified preferred embodiment of the second preferred embodiment of the present invention.

FIG. 13 is a block diagram showing a configuration of a wireless communication circuit 170 of a portable wireless communication apparatus 100H according to a third modified preferred embodiment of the present preferred embodiment. This modified preferred embodiment is characterized in that it has the configuration of the portable wireless communication apparatus 100F of FIG. 11, and further characterized by operating a switch 141 to use the selection diversity for DTV signals respectively received by antenna elements 101 and 102, only when receiving DTV low-band frequency signals (i.e., signals within a frequency range of 470 MHz to 557 MHz).

Referring to FIG. 13, when receiving DTV high-band frequency signals (i.e., signal within a frequency range of 557 MHz to 770 MHz), a tuner controller 160C of the portable wireless communication apparatus 100H controls switches 141 and 144 in conjunction with each other, as with the cases of FIGS. 10 and 11. However, when receiving the DTV low-band frequency signals, the tuner controller 160C obtains received signal strength indicator (RSSI) of DTV by a DTV tuner 152. When the RSSI obtained while receiving the DTV low-band frequency signals becomes smaller than a predetermined threshold value RSSI0 corresponding to a limit for distorting DTV video images, the tuner controller 160C changes the connection of the switch 141 so as to increase the RSSI of the DTV receiving signals, without changing the connection of the switch 144. Specifically, when the DTV low-band frequency signals received by the antenna element 101 are inputted to the DTV tuner 152, if RSSI becomes smaller than the threshold value RSSI0, then the tuner controller 160C changes the switch 141 to input the DTV low-band frequency signals received by the antenna element 102 to the DTV tuner 152. Conversely, when the DTV low-band frequency signals received by the antenna element 102 are inputted to the DTV tuner 152, if RSSI becomes smaller than the threshold value RSSI0, then the tuner controller 160C changes the switch 141 to input the DTV low-band frequency signals received by the antenna element 101 to the DTV tuner 152. Although the present preferred embodiment uses RSSI as a reference for changing the switch 141, the reference is not limited thereto, and any indicator, e.g., C/N, BER, or PER, can be used as long as the indicator can detect the degradation in received-signal level or reception characteristics.

Thus, when detecting degradation in the radio environment for reception, the portable wireless communication apparatus 100H uses the selection diversity to change between antenna elements for receiving DTV low-band frequency signals, i.e., can control the switch 141 so as to increase a received-signal level such as RSSI, and input one of the DTV low-band frequency signals respectively received by the antenna elements 101 and 102, to the DTV tuner 152.

Further, the tuner controller 160C can control the switch 141 as follows. Specifically, when the switch 141 connects the DTV tuner 152 to the antenna element 101 through a filter 122A and an impedance matching circuit 112A, if RSSI of the DTV high-band frequency signals and DTV low-band frequency signals received by the DTV tuner 152 becomes smaller than the threshold value RSSI0, then the tuner controller 160C controls the switch 141 to connect the DTV tuner 152 to the antenna element 102 through a filter 124A and an impedance matching circuit 114A. On the other hand, when the switch 141 connects the DTV tuner 152 to the antenna element 102 through the filter 124A and the impedance matching circuit 114A, if RSSI of the DTV high-band frequency signals and DTV low-band frequency signals received by the DTV tuner 152 becomes smaller than the threshold value RSSI0, then the tuner controller 160C controls the switch 141 to connect the DTV tuner 152 to the antenna element 101 through the filter 122A and the impedance matching circuit 112A. Accordingly, when RSSI of the DTV high-band frequency signals or DTV low-band frequency signals becomes smaller than the threshold value RSSI0, the antenna element 102 is connected to the DTV tuner 152 instead of the antenna element 101, or the antenna element 101 is connected to the DTV tuner 152 instead of the antenna element 102. Thus, it is possible to use the antenna element 101 or 102 that receives at a higher signal level.

Figure 14:
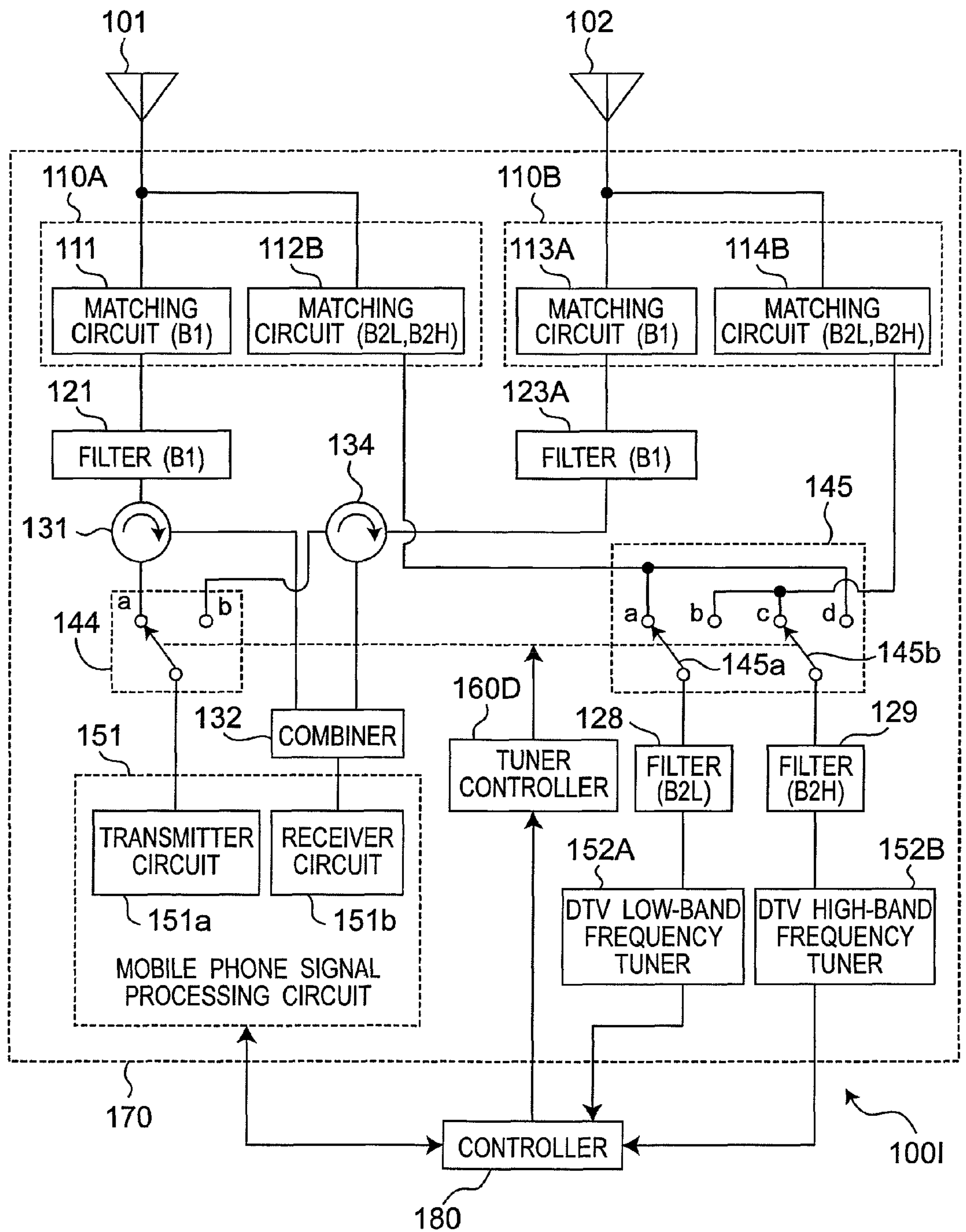
FIG. 14 is a block diagram showing a configuration of a wireless communication circuit 170 of a portable wireless communication apparatus 100I according to a fourth modified preferred embodiment of the second preferred embodiment of the present invention.

FIG. 14 is a block diagram showing a configuration of a wireless communication circuit 170 of a portable wireless communication apparatus 100I according to a fourth modified preferred embodiment of the present preferred embodiment. The portable wireless communication apparatus 100I of this modified preferred embodiment is characterized by using the selection diversity for the mobile phone transmitting signals to be transmitted, as with the portable wireless communication apparatus 100E of FIG. 10, and further characterized in that it is provided with a DTV low-band frequency tuner 152A and a DTV high-band frequency tuner 152B for respectively demodulating low-band frequency signals and high-band frequency signals, and the DTV low-band frequency signals are received by an antenna element used to transmit and receive mobile phone transmitting signals and mobile phone receiving signals, and the DTV high-band frequency signals are received by an antenna element used to receive only the mobile phone receiving signals. The DTV frequency band is divided into a low-frequency band of 470 MHz to 557 MHz, and a high-frequency band of 557 MHz to 770 MHz, as with the first preferred embodiment.

Referring to FIG. 14, an antenna element 101 is connected to impedance matching circuits 111 and 112B of the wireless communication circuit 170, and an antenna element 102 is connected to impedance matching circuits 113A and 114B of the wireless communication circuit 170. The impedance matching circuits 111, 112B, 113A, and 114B are provided for impedance matching between the antenna elements 101 and 102, and components at their subsequent stages. The impedance matching circuits 111 and 112B function as a matching circuit unit 110A for the antenna element 101, and the impedance matching circuits 113A and 114B function as a matching circuit unit 110B for the antenna element 102. The impedance matching circuit 111 is connected at its subsequent stage to a filter 121, a circulator 131, a switch 144, a combiner 132, and a mobile phone signal processing circuit 151, as with the portable wireless communication apparatus 100E of FIG. 10. The impedance matching circuit 112B is connected at its subsequent stage to one of filters 128 and 129 through a switch circuit 145. When the impedance matching circuit 112B is connected to the filter 128 through the switch circuit 145, the impedance matching circuit 112B matches impedances between the antenna element 101, and the switch circuit 145 and the filter 128 (or subsequent circuitry, including the switch circuit 145 and the filter 128) to receive DTV low-band frequency signals. When the impedance matching circuit 112B is connected to the filter 129 through the switch circuit 145, the impedance matching circuit 112B matches impedances between the antenna element 101, and the switch circuit 145 and the filter 129 (or subsequent circuitry, including the switch circuit 145 and the filter 129) to receive DTV high-band frequency signals. The filter 128 is a band-pass filter for the band B2L, that passes received DTV low-band frequency signals, and the filter 129 is a band-pass filter for the band B2H, that passes received DTV high-band frequency signals. The impedance matching circuit 113A is connected at its subsequent stage to a filter 123A, a circulator 134, the switch 144, the combiner 132, and the mobile phone signal processing circuit 151, as with the portable wireless communication apparatus 100E of FIG. 10. The impedance matching circuit 114B is connected at its subsequent stage to one of the filters 128 and 129 through the switch circuit 145. When the impedance matching circuit 114B is connected to the filter 128 through the switch circuit 145, the impedance matching circuit 114B matches impedances between the antenna element 102, and the switch circuit 145 and the filter 128 (or subsequent circuitry, including the switch circuit 145 and the filter 128) to receive the DTV low-band frequency signals. When the impedance matching circuit 114B is connected to the filter 129 through the switch circuit 145, the impedance matching circuit 114B matches impedances between the antenna element 102, and the switch circuit 145 and the filter 129 (or subsequent circuitry, including the switch circuit 145 and the filter 129) to receive the DTV high-band frequency signals.

As shown in FIG. 14, the switch circuit 145 includes a switch 145*a* connected to the filter 128, and a switch 145*b* connected to the filter 129. The switch circuit 145 operates, according to control of a tuner controller 160D, to pass one of output signals from the impedance matching circuits 112B and 114B to the DTV low-band frequency tuner 152A through the filter 128, and pass the other output signal to the DTV high-band frequency tuner 152B through the filter 129.

As in the case of the portable wireless communication apparatus 100E shown in FIG. 10, the tuner controller 160D operates the switch 144 and the switch circuit 145 in conjunction with each other, according to a control signal from a controller 180 instructing to use the selection diversity for transmission, so as to go into one of the following two cases. In a first case, as shown in FIG. 14, the switch 144 connects a transmitter circuit 151*a* to the circulator 131 (i.e., one of the circulators that is connected to the antenna element 101), while the switch circuit 145 connects the filter 128 to the impedance matching circuit 112B (i.e., one of the impedance matching circuits that is connected to the antenna element 101) and connects the filter 129 to the impedance matching circuit 114B (i.e., one of the impedance matching circuits that is connected to the antenna element 102). On the other hand, in a second case, the switch 144 connects the transmitter circuit 151*a* to the circulator 134 (i.e., one of the circulators that is connected to the antenna element 102), while the switch circuit 145 connects the filter 128 to the impedance matching circuit 114B (i.e., one of the impedance matching circuits that is connected to the antenna element 102) and connects the filter 129 to the impedance matching circuit 112B (i.e., one of the impedance matching circuits that is connected to the antenna element 101). Accordingly, in the first case, a mobile phone transmitting signal generated by the transmitter circuit 151*a* for transmission is passed to the antenna element 101 through the switch 144, the circulator 131, the filter 121, and the impedance matching circuit 111, and then radiated from the antenna element 101 to a mobile phone base station apparatus; on the other hand, a DTV low-band frequency signal received by the antenna element 101 is passed to the DTV low-band frequency tuner 152A through the impedance matching circuit 112B, the switch circuit 145, and the filter 128, and is then subjected to signal processing such as demodulation, and a DTV high-band frequency signal received by the antenna element 102 is passed to the DTV high-band frequency tuner 152B through the impedance matching circuit 114B, the switch circuit 145, and the filter 129, and is then subjected to signal processing such as demodulation. In the second case, a mobile phone transmitting signal generated by the transmitter circuit 151*a* for transmission is passed to the antenna element 102 through the switch 144, the circulator 134, the filter 123A, and the impedance matching circuit 113A, and then radiated from the antenna element 102 to the mobile phone base station apparatus; on the other hand, a DTV high-band frequency signal received by the antenna element 101 is passed to the DTV high-band frequency tuner 152B through the impedance matching circuit 112B, the switch circuit 145, and the filter 129, and is then subjected to signal processing such as demodulation; and a DTV low-band frequency signal received by the antenna element 102 is passed to the DTV low-band frequency tuner 152A through the impedance matching circuit 114B, the switch circuit 145, and the filter 128, and is then subjected to signal processing such as demodulation.

The signals demodulated by the DTV low-band frequency tuner 152A and the DTV high-band frequency tuner 152B are passed to the controller 180 and/or other circuitry such as a player circuit (not shown) external to the wireless communication circuit 170, for further processes including playback of videos and audios, etc. The tuner controller 160D may further control demodulating processes of by the DTV low-band frequency tuner 152A and the DTV high-band frequency tuner 152B.

According to the portable wireless communication apparatus 100I of FIG. 14, since the antenna elements 101 and 102 are always connected to the mobile phone signal processing circuit 151, and always connected to the DTV low-band frequency tuner 152A and the DTV high-band frequency tuner 152B, it is possible to operate the portable wireless communication apparatus 100I, etc. as a DTV tuner and at the same time operate as a phone, that is, e.g., to record a DTV program when using as a phone for talking.

Further, by providing separate tuners for the DTV low-band frequency signals and for DTV high-band frequency signals, as in the case of the portable wireless communication apparatus 100A of FIG. 6, it is possible to record in a channel of the high-frequency band while watching in a channel of the low-frequency band, or alternatively, it is possible to simultaneously operate the mobile phone signal processing circuit 151, the DTV low-band frequency tuner 152A, and the DTV high-band frequency tuner 152B, so as to record in one channel from the DTV low-frequency band and record in one channel from the DTV high-frequency band while using the portable wireless communication apparatus 100I for talking.

Accordingly, when transmitting the mobile phone transmitting signals in the band B1 using the antenna element 101, it is possible to receive the DTV high-band frequency signals in the band B2H by the DTV high-band frequency tuner 152B using the antenna element 102, without being disturbed by the mobile phone transmitting signals. Similarly, when transmitting the mobile phone transmitting signals in the band B1 using the antenna element 102, it is possible to receive the DTV high-band frequency signals in the band B2H by the DTV high-band frequency tuner 152B using the antenna element 101, without being disturbed by the mobile phone transmitting signals.

Figure 15:
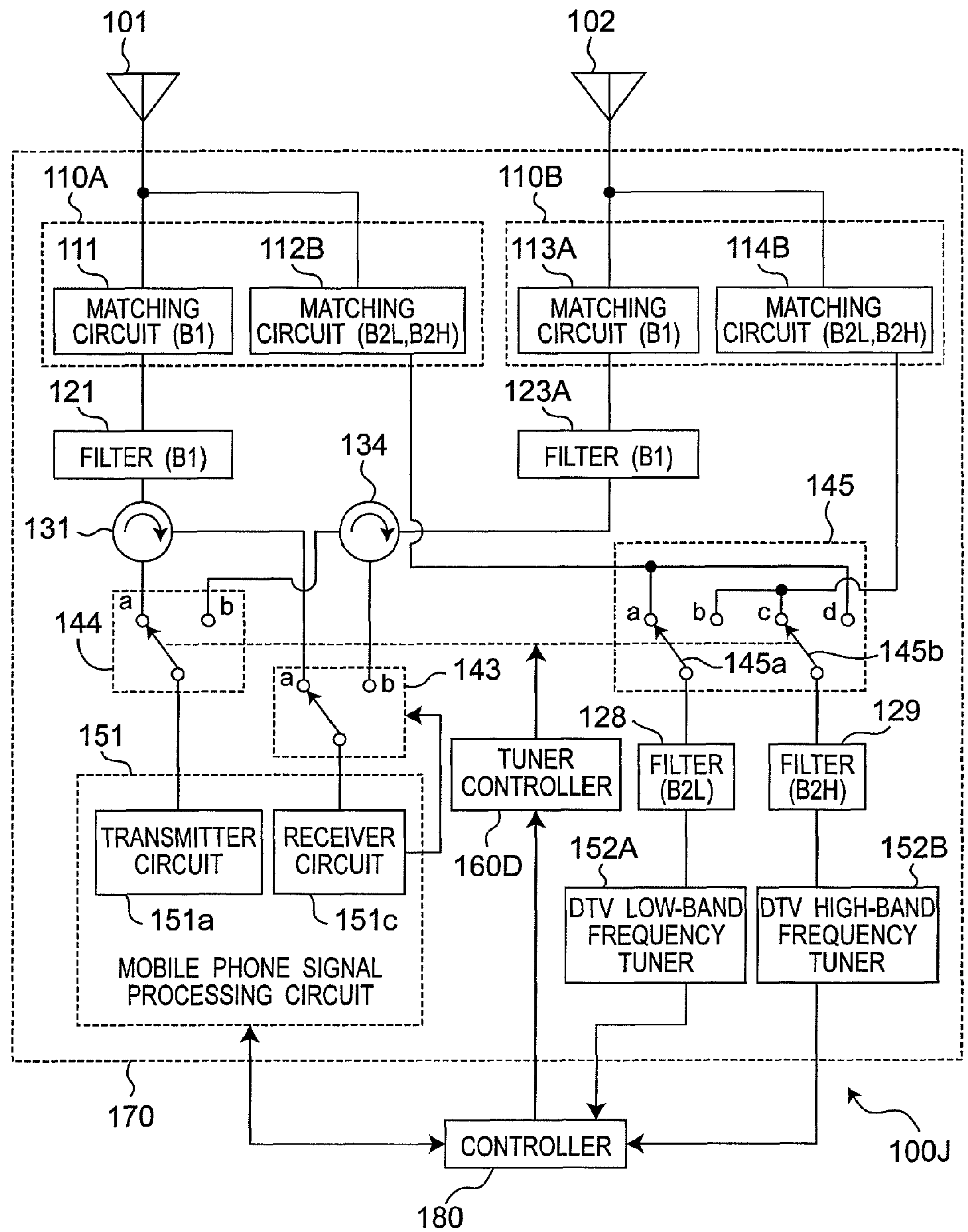
FIG. 15 is a block diagram showing a configuration of a wireless communication circuit 170 of a portable wireless communication apparatus 100J according to a fifth modified preferred embodiment of the second preferred embodiment of the present invention.

FIG. 15 is a block diagram showing a configuration of a wireless communication circuit 170 of a portable wireless communication apparatus 100J according to a fifth modified preferred embodiment of the present preferred embodiment. This modified preferred embodiment is characterized in that it has the configuration of the portable wireless communication apparatus 100I of FIG. 14, and further characterized in that it is provided with a switch 143 and a receiver circuit 151*c* for using the selection diversity for mobile phone receiving signals respectively received by antenna elements 101 and 102, as with the portable wireless communication apparatus 100D shown in FIG. 9. Thus, when detecting degradation in the radio environment for reception, the portable wireless communication apparatus 100J uses the selection diversity to change between antenna elements for receiving the mobile phone receiving signals, i.e., can control the switch 143 so as to increase a received-signal level such as RSSI, and input one of the mobile phone receiving signals respectively received by the antenna elements 101 and 102, to a mobile phone signal processing circuit 151.

Figure 23:
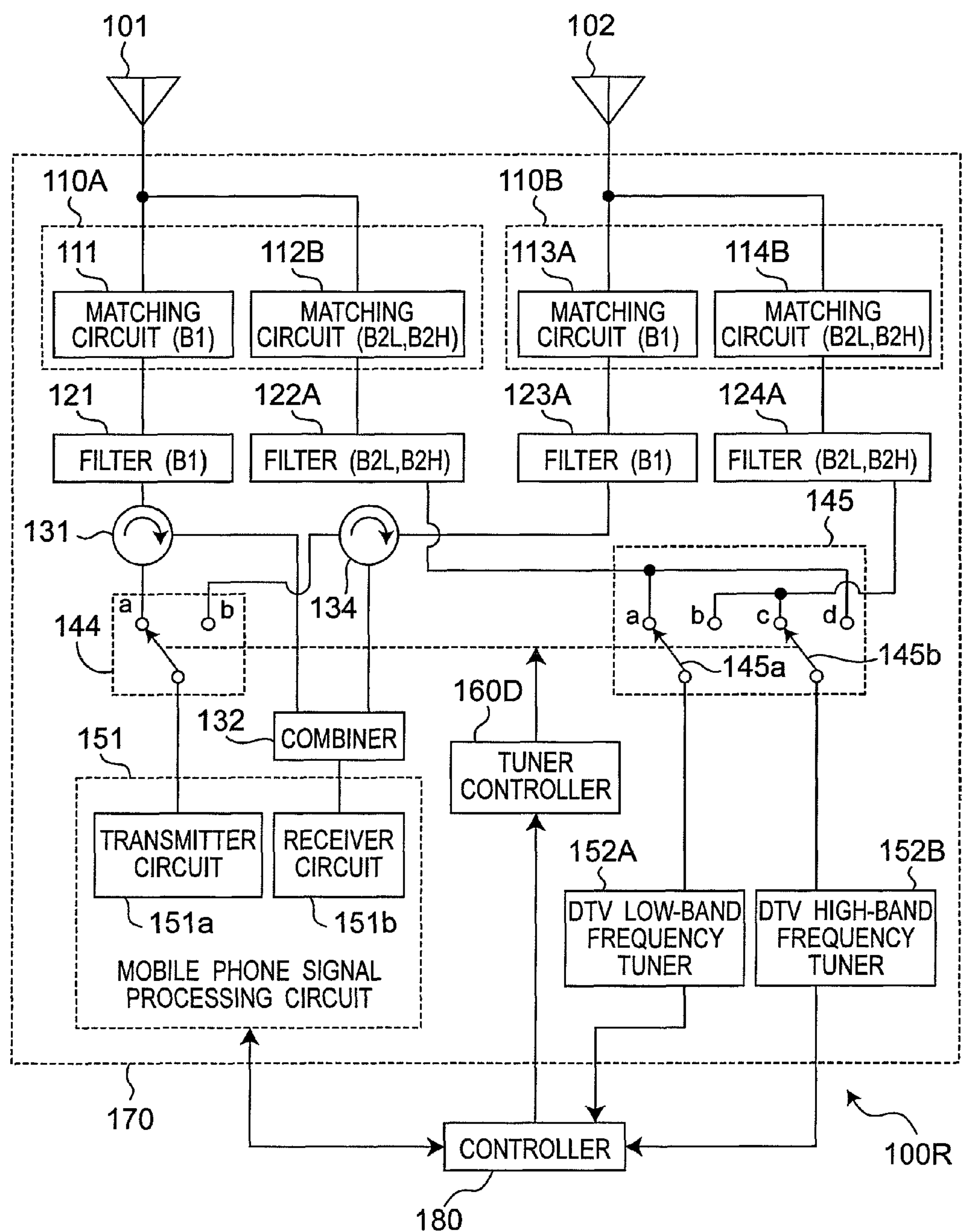
FIG. 23 is a block diagram showing a configuration of a wireless communication circuit 170 of a portable wireless communication apparatus 100R according to a sixth modified preferred embodiment of the second preferred embodiment of the present invention.

FIG. 23 is a block diagram showing a configuration of a wireless communication circuit 170 of a portable wireless communication apparatus 100R according to a sixth modified preferred embodiment of the second preferred embodiment of the present invention. This modified preferred embodiment is characterized in that it is provided with filters 122A and 124A respectively provided immediately after impedance matching circuits 112B and 114B, as with the configuration of FIG. 11, in place of the filters 128 and 129 provided to a subsequent stage of the switch circuit 145 in the wireless communication circuit 170 of FIG. 14. When a transmitter circuit 151*a* is connected to a circulator 131 (i.e., one of circulators that is connected to an antenna element 101), a tuner controller 160D controls a switch circuit 145 to connect a DTV high-band frequency tuner 152B to an antenna element 102 through the filter 124A and the impedance matching circuit 114B. On the other hand, when the transmitter circuit 151*a* is connected to a circulator 134 (i.e., one of the circulators that is connected to the antenna element 102), the tuner controller 160D controls the switch circuit 145 to connect the DTV high-band frequency tuner 152B to the antenna element 101 through the filter 122A and the impedance matching circuit 112B.

Figure 24:
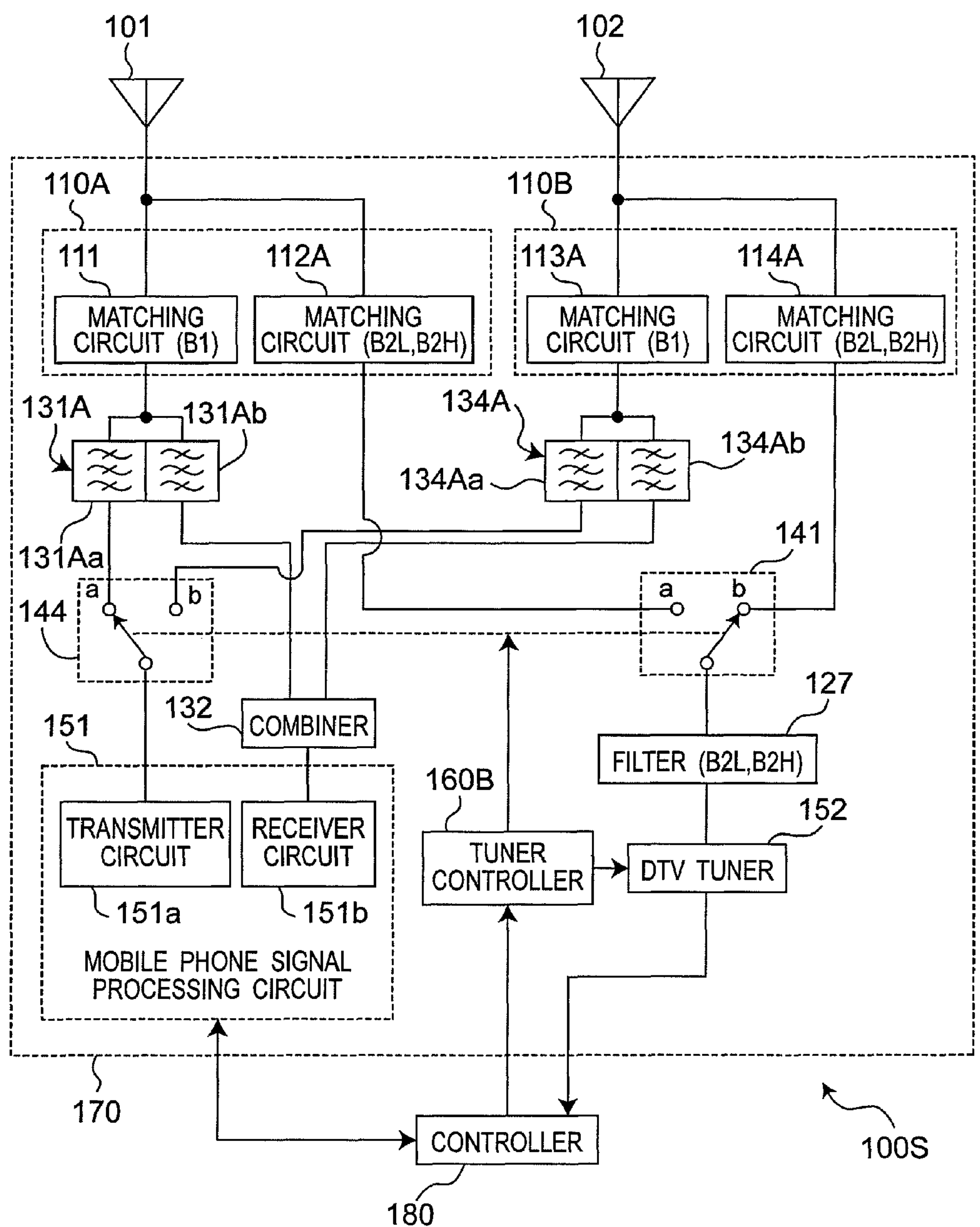
FIG. 24 is a block diagram showing a configuration of a wireless communication circuit 170 of a portable wireless communication apparatus 100S according to a seventh modified preferred embodiment of the second preferred embodiment of the present invention.

FIG. 24 is a block diagram showing a configuration of a wireless communication circuit 170 of a portable wireless communication apparatus 100S according to a seventh modified preferred embodiment of the second preferred embodiment of the present invention. As with the fifth modified preferred embodiment of the first preferred embodiment (see FIG. 22), to enable both transmission of mobile phone transmitting signals and reception of mobile phone receiving signals through an antenna element 102, other circuit elements may be used instead of circulators 131 and 134. The wireless communication circuit 170 of FIG. 24 is provided with a duplexer 131A in place of the filter 121 and the circulator 131 of FIG. 11, and provided with a duplexer 134A in place of the filter 123A and the circulator 134. The duplexer 131A is configured in the same manner as in the case of FIG. 22. The duplexer 134A includes filters 134Aa and 134Ab as its internal components. The filter 134Aa is a band-pass filter for the band B1, that passes the mobile phone transmitting signals to be transmitted. The filter 134Ab is a band-pass filter for the band B1, that passes the mobile phone receiving signals to be received. An impedance matching circuit 113A matches impedances between the antenna element 102, and the filters 134Aa and 134Ab of the duplexer 134A (or subsequent circuitry, including the duplexer 134A) to transmit and receive the mobile phone transmitting signals and mobile phone receiving signals in the band B1. According to this configuration, it is possible also in the present modified preferred embodiment to transmit and receive the mobile phone transmitting signals and mobile phone receiving signals through the antenna elements 101 and 102, as in the case of FIG. 11. The configuration of the modified preferred embodiment of FIG. 24 may be applied to the configurations of the first to fifth modified preferred embodiments of the present preferred embodiment, or to the configuration of a third preferred embodiment to be described later.

As described above, according to the portable wireless communication apparatuses 100E to 100J and 100S of the second preferred embodiment, it is possible to perform communications without degrading the reception characteristics of DTV high-band frequency signals caused by the mobile phone transmitting signals to be transmitted, by using separate antenna elements for receiving the DTV signals and for transmitting the mobile phone transmitting signals.

Furthermore, it is possible to watch DTV without increasing the number of antenna elements, by using a common antenna element as an antenna element for receiving the DTV signals, and an antenna element for transmitting and receiving the mobile phone transmitting signals and mobile phone receiving signals.

Third Preferred Embodiment

Figure 16:
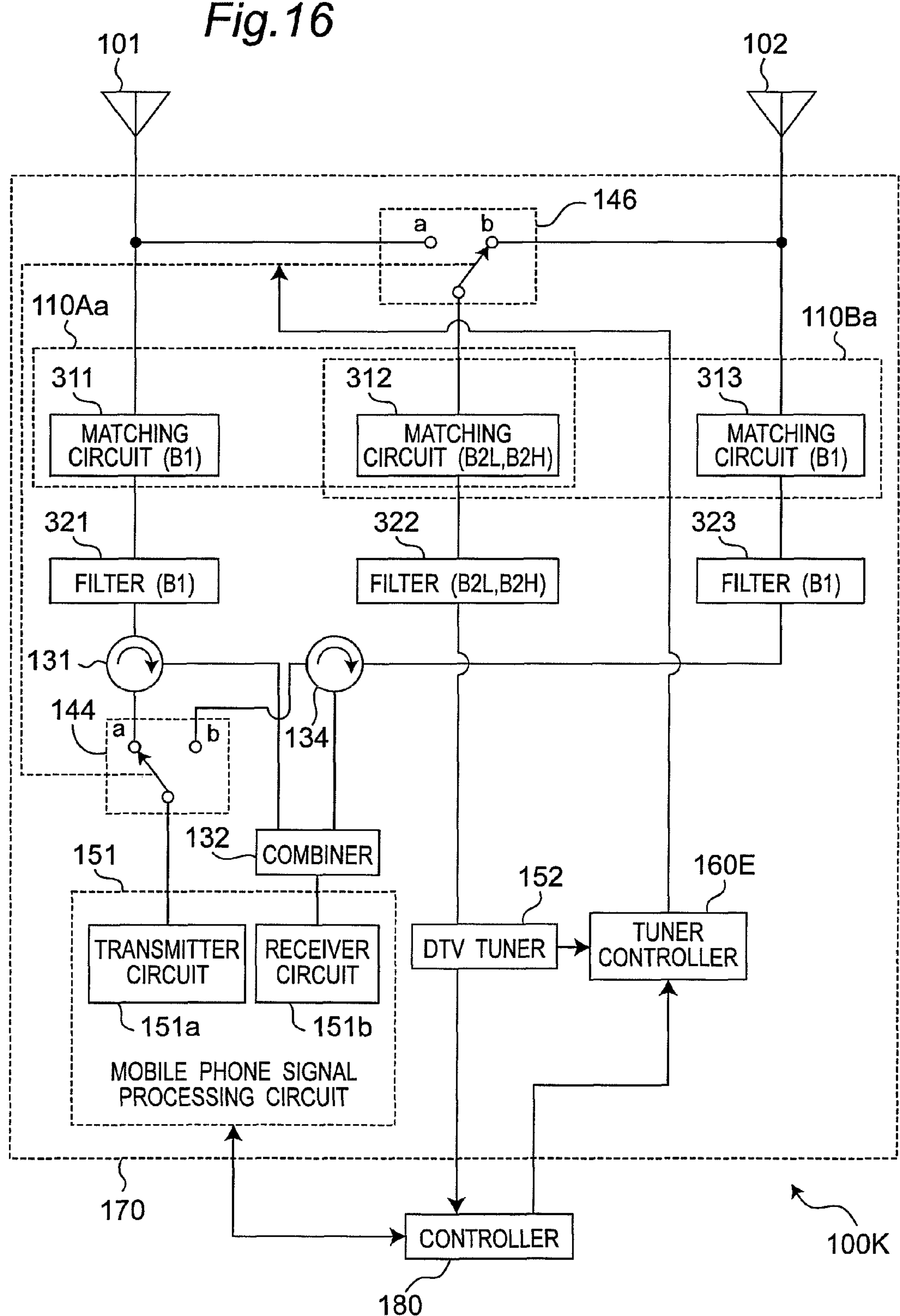
FIG. 16 is a block diagram showing a configuration of a wireless communication circuit 170 of a portable wireless communication apparatus 100K according to a third preferred embodiment of the present invention.

FIG. 16 is a block diagram showing a configuration of a wireless communication circuit 170 of a portable wireless communication apparatus 100K according to a third preferred embodiment of the present invention. The portable wireless communication apparatus 100K of the present preferred embodiment has a function of transmitting and receiving mobile phone transmitting signals and mobile phone receiving signals, and a function of receiving DTV. The portable wireless communication apparatus 100K of the present preferred embodiment is characterized by using the selection diversity to select an antenna element for transmitting the mobile phone transmitting signals, as with the portable wireless communication apparatus 100E shown in FIG. 10, and further characterized in that it is provided with a switch 146 at a previous stage of the impedance matching circuit for selecting one of DTV signals respectively received by antenna elements 101 and 102, in place of the switch 141 provided to a subsequent stage of an impedance matching circuit.

Referring to FIG. 16, the antenna element 101 is connected to an impedance matching circuit 311 of the wireless communication circuit 170, and connected to an impedance matching circuit 312 through the switch 146 of the wireless communication circuit 170. The antenna element 102 is connected to an impedance matching circuit 313 of the wireless communication circuit 170, and connected to the impedance matching circuit 312 through the switch 146 of the wireless communication circuit 170. As will be described in detail later, the switch 146 connects one of the antenna elements 101 and 102 to the impedance matching circuit 312, according to control of a tuner controller 160E. The impedance matching circuits 311, 312, and 313 are provided for impedance matching between the antenna elements 101 and 102, and components at their subsequent stages. When the switch 146 connects the antenna element 101 to the impedance matching circuit 312, the impedance matching circuits 311 and 312 function as a matching circuit unit 110Aa for the antenna element 101, and only the impedance matching circuit 313 functions as an impedance matching circuit for the antenna element 102. On the other hand, when the switch 146 connects the antenna element 102 to the impedance matching circuit 312, only the impedance matching circuit 311 functions as an impedance matching circuit for the antenna element 101, and the impedance matching circuits 312 and 313 function as a matching circuit unit 110Ba for the antenna element 102. A filter 321 is connected to a subsequent stage of the impedance matching circuit 311. The impedance matching circuit 311 and the filter 321 are configured in the same manner as the impedance matching circuit 111 and the filter 121 of the portable wireless communication apparatus 100E of FIG. 10, and the filter 321 is connected to at its subsequent stage to a circulator 131, a switch 144, a combiner 132, and a mobile phone signal processing circuit 151, as with the portable wireless communication apparatus 100E of FIG. 10. A filter 322 is connected to a subsequent stage of the impedance matching circuit 312. When the switch 146 connects the antenna element 101 to the impedance matching circuit 312, the impedance matching circuit 312 matches impedances between the antenna element 101 connected through the switch 146, and the filter 322 (or subsequent circuitry, including the filter 322) to receive DTV signals. When the switch 146 connects the antenna element 102 to the impedance matching circuit 312, the impedance matching circuit 312 matches impedances between the antenna element 102 connected through the switch 146, and the filter 322 (or subsequent circuitry, including the filter 322) to receive the DTV signals in the bands B2L and B2H. The filter 322 is a bandpass filter for the bands B2L and B2H, that pass DTV receiving signals. For ease of explanation, in the portable wireless communication apparatus 100K of FIG. 16, the DTV frequency band is not divided into a high-frequency band B2H and a low-frequency band B2L, and the impedance matching circuit 312 and the filter 322 of the portable wireless communication apparatus 100K receive DTV signals over one single frequency band of 470 MHz to 770 MHz. A filter 323 is connected to a subsequent stage of the impedance matching circuit 313. The impedance matching circuit 313 and the filter 323 are configured in the same manner as the impedance matching circuit 113A and the filter 123A of the portable wireless communication apparatus 100E of FIG. 10, and the filter 323 is connected to at its subsequent stage to a circulator 134, the switch 144, the combiner 132, and the mobile phone signal processing circuit 151, as with the portable wireless communication apparatus 100E of FIG. 10.

As in the case of the portable wireless communication apparatus 100E shown in FIG. 10, the tuner controller 160E operates the switches 144 and 146 in conjunction with each other, according to a control signal from a controller 180 for instructing to use the selection diversity for transmission, so as to go into one of the following two cases. In a first case, as shown in FIG. 16, the switch 144 connects a transmitter circuit 151*a* to the circulator 131 (i.e., one of the circulators that is connected to the antenna element 101), while the switch 146 connects the antenna element 102 to the impedance matching circuit 312. On the other hand, in a second case, the switch 144 connects the transmitter circuit 151*a* to the circulator 134 (i.e., one of the circulators that is connected to the antenna element 102), while the switch 146 connects the antenna element 101 to the impedance matching circuit 312. Accordingly, in the first case, a mobile phone transmitting signal generated by the transmitter circuit 151*a* for transmission is passed to the antenna element 101 through the switch 144, the circulator 131, the filter 321, and the impedance matching circuit 311, and then radiated from the antenna element 101 to a mobile phone base station apparatus; on the other hand, a DTV signal received by the antenna element 102 is passed to a DTV tuner 152 through the switch 146, the impedance matching circuit 312, and the filter 322, and is then subjected to signal processing such as demodulation. In the second case, a mobile phone transmitting signal generated by the transmitter circuit 151*a* for transmission is passed to the antenna element 102 through the switch 144, the circulator 134, the filter 323, and the impedance matching circuit 313, and then radiated from the antenna element 102 to the mobile phone base station apparatus; on the other hand, a DTV signal received by the antenna element 101 is passed to the DTV tuner 152 through the switch 146, the impedance matching circuit 312, and the filter 322, and is then subjected to signal processing such as demodulation.

Further, the tuner controller 160E can control the switch 146 as follows. Specifically, when the switch 144 connects the transmitter circuit 151*a* to the antenna element 101 through the filter 321 and the impedance matching circuit 311, and the transmitter circuit 151*a* transmits mobile phone transmitting signals using the antenna element 101, the tuner controller 160E controls the switch 146 such that DTV high-band frequency signals received by the antenna element 102 are received by the DTV tuner 152 through the switch 146, the impedance matching circuit 312, and the filter 322. On the other hand, when the switch 144 connects the transmitter circuit 151*a* to the antenna element 102 through the filter 323 and the impedance matching circuit 313, and the transmitter circuit 151*a* transmits the mobile phone transmitting signals using the antenna element 102, the tuner controller 160E controls the switch 146 such that DTV high-band frequency signals received by the antenna element 101 are received by the DTV tuner 152 through the switch 146, the impedance matching circuit 312, and the filter 322. Thus, in the former case, it is possible to receive the DTV high-band frequency signals in the band B2H using the antenna element 102, without being disturbed by the mobile phone transmitting signals in the band B1 to be transmitted using the antenna element 101. Further, in the latter case, it is possible to receive the DTV high-band frequency signals in the band B2H using the antenna element 101, without being disturbed by the mobile phone transmitting signals in the band B1 to be transmitted using the antenna element 102.

According to the portable wireless communication apparatus 100K of the present preferred embodiment, since the antenna elements 101 and 102 are always connected to the mobile phone signal processing circuit 151, and one of the antenna elements 101 and 102 is always connected to the DTV tuner 152, it is possible to operate the portable wireless communication apparatus 100K as a DTV tuner and at the same time to operate as a phone, that is, e.g., to record a DTV program when using as a phone for talking.

Figure 17:
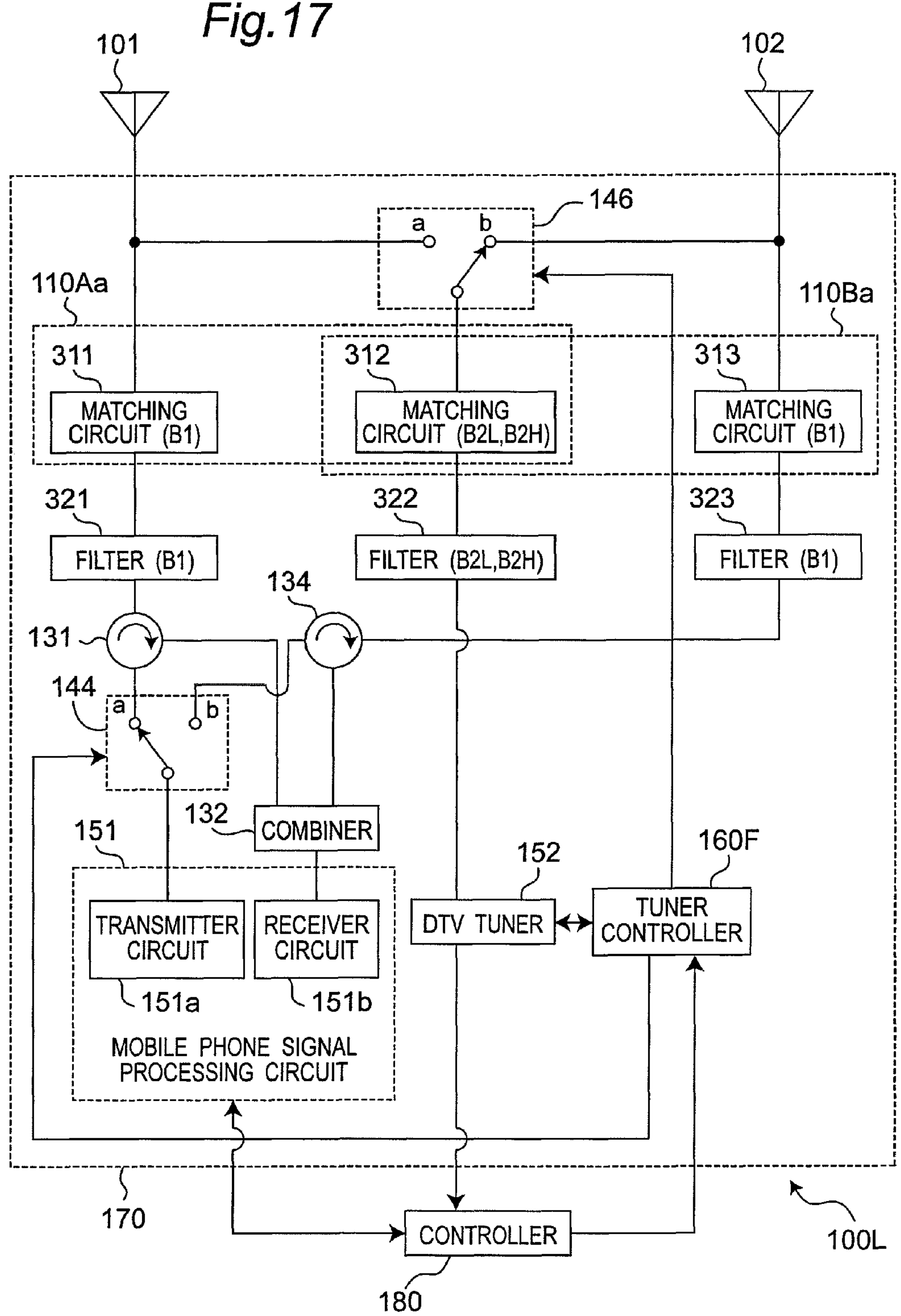
FIG. 17 is a block diagram showing a configuration of a wireless communication circuit 170 of a portable wireless communication apparatus 100L according to a first modified preferred embodiment of the third preferred embodiment of the present invention.

FIG. 17 is a block diagram showing a configuration of a wireless communication circuit 170 of a portable wireless communication apparatus 100L according to a first modified preferred embodiment of the third preferred embodiment of the present invention. The modified preferred embodiment is characterized in that it has the configuration of the portable wireless communication apparatus 100K of FIG. 16, and further characterized by operating a switch 146 to use the selection diversity for DTV signals respectively received by antenna elements 101 and 102, only when receiving DTV low-band frequency signals (i.e., signals within a frequency range of 470 MHz to 557 MHz), as with the portable wireless communication apparatus 100H of FIG. 13.

Referring to FIG. 17, when receiving DTV high-band frequency signals (i.e., signals within a frequency range of 557 MHz to 770 MHz), a tuner controller 160F of the portable wireless communication apparatus 100L controls switches 144 and 146 in conjunction with each other, as with the portable wireless communication apparatus 100K of FIG. 16. However, when receiving the DTV low-band frequency signals, the tuner controller 160F obtains received signal strength indicator (RSSI) of DTV by a DTV tuner 152. When the RSSI obtained while receiving the DTV low-band frequency signals becomes smaller than a predetermined threshold value RSSI0 corresponding to a limit for distorting DTV video images, the tuner controller 160F changes the connection of the switch 146 so as to increase the RSSI of the DTV receiving signals, without changing the connection of the switch 144. Specifically, when the DTV low-band frequency signals received by the antenna element 101 are inputted to the DTV tuner 152, if RSSI becomes smaller than the threshold value RSSI0, then the tuner controller 160F changes the switch 146 to input the DTV low-band frequency signals received by the antenna element 102 to the DTV tuner 152. Conversely, when the DTV low-band frequency signals received by the antenna element 102 are inputted to the DTV tuner 152, if RSSI becomes smaller than the threshold value RSSI0, then the tuner controller 160F changes the switch 146 to input the DTV low-band frequency signals received by the antenna element 101 to the DTV tuner 152. Although the present preferred embodiment uses RSSI as a reference for changing the switch 146, the reference is not limited thereto, and any indicator, e.g., C/N, BER, or PER, can be used as long as the indicator can detect the degradation in received-signal level or reception characteristics.

Thus, when detecting degradation in the radio environment for reception, the portable wireless communication apparatus 100L uses the selection diversity to change between antenna elements for receiving the DTV low-band frequency signals, i.e., can control the switch 146 so as to increase a received-signal level such as RSSI, and input one of the DTV low-band frequency signals respectively received by the antenna elements 101 and 102, to the DTV tuner 152.

Figure 18:
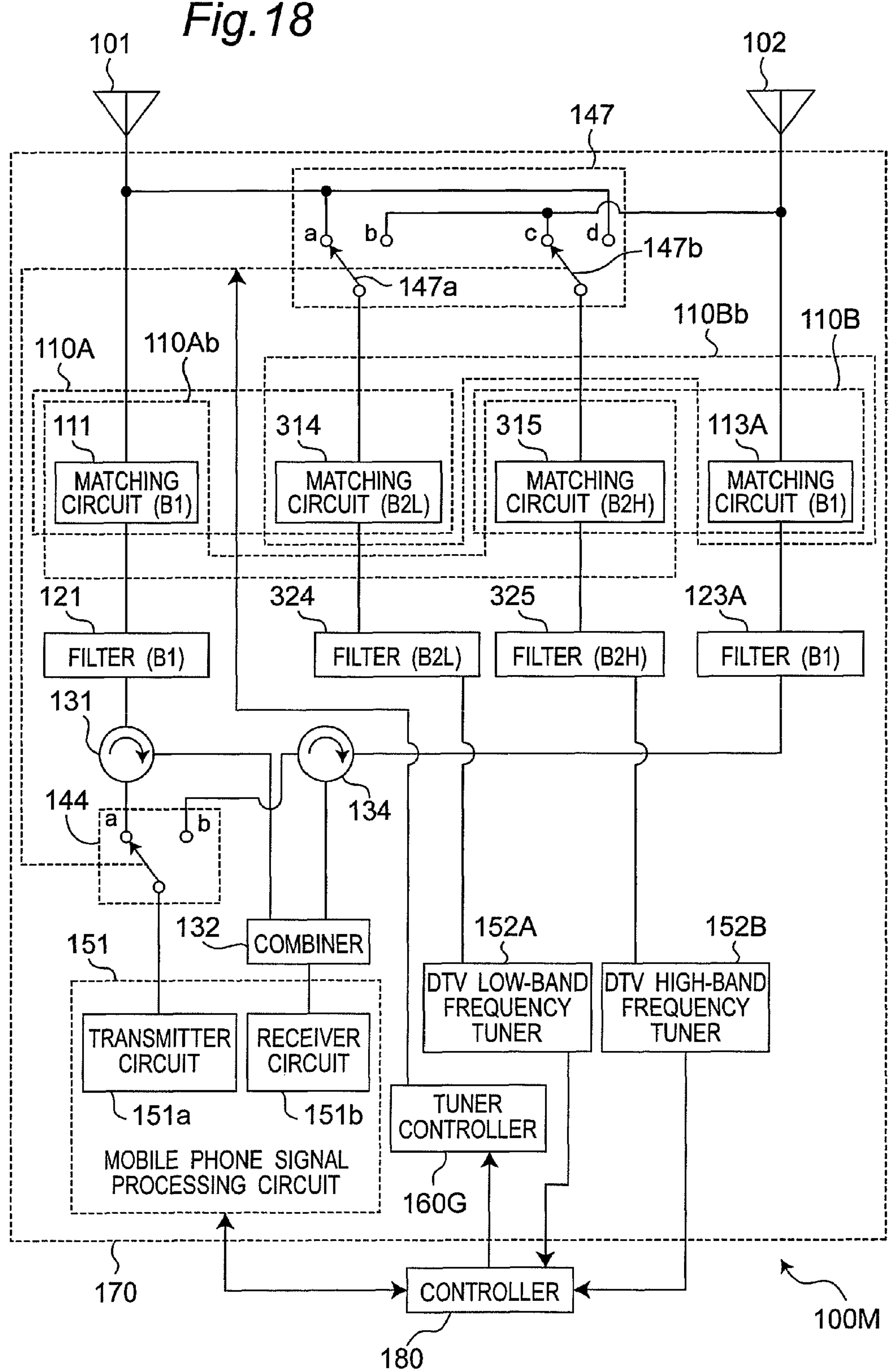
FIG. 18 is a block diagram showing a configuration of a wireless communication circuit 170 of a portable wireless communication apparatus 100M according to a second modified preferred embodiment of the third preferred embodiment of the present invention.

FIG. 18 is a block diagram showing a configuration of a wireless communication circuit 170 of a portable wireless communication apparatus 100M according to a second modified preferred embodiment of the third preferred embodiment of the present invention. The portable wireless communication apparatus 100M of the modified preferred embodiment is characterized by using the selection diversity for mobile phone transmitting signals to be transmitted, as with the portable wireless communication apparatus 100K of FIG. 16, and further characterized in that it is provided a DTV low-band frequency tuner 152A and a DTV high-band frequency tuner 152B for respectively demodulating low-band frequency signals and high-band frequency signals, and the DTV low-band frequency signals are received by an antenna element used to transmit and receive mobile phone transmitting signals and mobile phone receiving signals, and the DTV high-band frequency signals are received by an antenna element used to receive only the mobile phone receiving signals. The DTV frequency band is divided into a low-frequency band of 470 MHz to 557 MHz, and a high-frequency band of 557 MHz to 770 MHz, as with the first preferred embodiment.

Referring to FIG. 18, an antenna element 101 is connected to an impedance matching circuit 111 of the wireless communication circuit 170, and connected to one of impedance matching circuits 314 and 315 through a switch circuit 147 of the wireless communication circuit 170. An antenna element 102 is connected to an impedance matching circuit 113A of the wireless communication circuit 170, and connected to one of the impedance matching circuits 314 and 315 through the switch circuit 147 of the wireless communication circuit 170. As shown in FIG. 18, the switch circuit 147 includes a switch 147*a* connected to the impedance matching circuit 314, and a switch 147*b* connected to the impedance matching circuit 315. As will be described in detail later, the switch circuit 147 operates to connect one of the antenna elements 101 and 102 to the impedance matching circuit 314, and connect the other one of the antenna elements 101 and 102 to the impedance matching circuit 315, according to control of a tuner controller 160G. The impedance matching circuits 111, 314, 315, and 113A are provided for impedance matching between the antenna elements 101 and 102, and components at their subsequent stages. When the switch circuit 147 connects the antenna element 101 to the impedance matching circuit 314, and connects the antenna element 102 to the impedance matching circuit 315, the impedance matching circuits 111 and 314 function as a matching circuit unit 110A for the antenna element 101, and the impedance matching circuits 315 and 113A function as a matching circuit unit 110B for the antenna element 102. On the other hand, when the switch circuit 147 connects the antenna element 101 to the impedance matching circuit 315, and connects the antenna element 102 to the impedance matching circuit 314, the impedance matching circuits 111 and 315 function as a matching circuit unit 110Ab for the antenna element 101, and the impedance matching circuits 314 and 113A function as a matching circuit unit 110Bb for the antenna element 102. The impedance matching circuit 111 is connected to at its subsequent stage to a filter 121, a circulator 131, a switch 144, a combiner 132, and a mobile phone signal processing circuit 151, as with the portable wireless communication apparatus 100E of FIG. 10. A DTV low-band frequency tuner 152A is connected to a subsequent stage of the impedance matching circuit 314 through a filter 324. When the impedance matching circuit 314 is connected to the antenna element 101 through the switch circuit 147, the impedance matching circuit 314 matches impedances between the antenna element 101 connected through the switch circuit 147, and the filter 324 (or subsequent circuitry, including the filter 324) to receive the DTV low-band frequency signals. When the impedance matching circuit 314 is connected to the antenna element 102 through the switch circuit 147, the impedance matching circuit 314 matches impedances between the antenna element 102 connected through the switch circuit 147, and the filter 324 (or subsequent circuitry, including the filter 324) to receive the DTV low-band frequency signals. The filter 324 is a band-pass filter for the band B2L, that passes the received DTV low-band frequency signals. Further, a DTV high-band frequency tuner 152B is connected to a subsequent stage of the impedance matching circuit 315 through a filter 325. When the impedance matching circuit 315 is connected to the antenna element 101 through the switch circuit 147, the impedance matching circuit 315 matches impedances between the antenna element 101 and the switch circuit 147, and the filter 325 (or subsequent circuitry, including the filter 325) to receive the DTV high-band frequency signals. When the impedance matching circuit 315 is connected to the antenna element 102 through the switch circuit 147, the impedance matching circuit 315 matches impedances between the antenna element 102 and the switch circuit 147, and the filter 325 (or subsequent circuitry, including the filter 325) to receive the DTV high-band frequency signals. The filter 325 is a band-pass filter for the band B2H, that passes the received DTV high-band frequency signals. The impedance matching circuit 113A is connected to at its subsequent stage to a filter 123A, a circulator 134, the switch 144, the combiner 132, and the mobile phone signal processing circuit 151, as with the portable wireless communication apparatus 100E of FIG. 10.

As in the case of the portable wireless communication apparatus 100E shown in FIG. 10, the tuner controller 160G operates the switch 144 and the switch circuit 147 in conjunction with each other, according to a control signal from a controller 180 for instructing to use the selection diversity for transmission, so as to go into one of the following two cases. In a first case, as shown in FIG. 18, the switch 144 connects a transmitter circuit 151*a* to the circulator 131 (i.e., one of the circulators that is connected to the antenna element 101), while the switch circuit 147 connects the antenna element 101 to the impedance matching circuit 314 and connects the antenna element 102 to the impedance matching circuit 315. On the other hand, in a second case, the switch 144 connects the transmitter circuit 151*a* to the circulator 134 (i.e., one of the circulators that is connected to the antenna element 102), while the switch circuit 147 connects the antenna element 101 to the impedance matching circuit 315 and connects the antenna element 102 to the impedance matching circuit 314. Accordingly, in the first case, a mobile phone transmitting signal generated by the transmitter circuit 151*a* for transmission is passed to the antenna element 101 through the switch 144, the circulator 131, the filter 121, and the impedance matching circuit 111, and then radiated from the antenna element 101 to a mobile phone base station apparatus; on the other hand, a DTV low-band frequency signal received by the antenna element 101 is passed to the DTV low-band frequency tuner 152A through the switch circuit 147, the impedance matching circuit 314, and the filter 324, and is then subjected to signal processing such as demodulation, and a DTV high-band frequency signal received by the antenna element 102 is passed to the DTV high-band frequency tuner 152B through the switch circuit 147, the impedance matching circuit 315, and the filter 325, and is then subjected to signal processing such as demodulation. In the second case, a mobile phone transmitting signal generated by the transmitter circuit 151*a* for transmission is passed to the antenna element 102 through the switch 144, the circulator 134, the filter 123A, and the impedance matching circuit 113A, and then radiated from the antenna element 102 to the mobile phone base station apparatus; on the other hand, a DTV high-band frequency signal received by the antenna element 101 is passed to the DTV high-band frequency tuner 152B through the switch circuit 147, the impedance matching circuit 315, and the filter 325, and is then subjected to signal processing such as demodulation, and a DTV low-band frequency signal received by the antenna element 102 is passed to the DTV low-band frequency tuner 152A through the switch circuit 147, the impedance matching circuit 314, and the filter 324, and is then subjected to signal processing such as demodulation. The signals demodulated by the DTV low-band frequency tuner 152A and the DTV high-band frequency tuner 152B are passed to the controller 180 and/or other circuitry such as a player circuit (not shown) external to the wireless communication circuit 170, for further processes including playback of videos and audios, etc.

According to the portable wireless communication apparatus 100M of FIG. 18, since the antenna elements 101 and 102 are always connected to the mobile phone signal processing circuit 151, and always connected to the DTV low-band frequency tuner 152A and the DTV high-band frequency tuner 152B, it is possible to operate the portable wireless communication apparatus 100M as a DTV tuner and at the same time to operate as a phone, that is, e.g., to record a DTV program when using as a phone for talking.

Furthermore, by using separate antenna elements for receiving DTV low-band frequency signals and for receiving DTV high-band frequency signals, it is possible to improve DTV reception characteristics over a wide band, as compared with the case of using only one antenna element.

Furthermore, by providing separate tuners for DTV low-band frequency signals and for DTV high-band frequency signals, as in the case of the portable wireless communication apparatus 100A of FIG. 6, it is possible to record in a channel of the high-frequency band while watching in a channel of the low-frequency band, or alternatively, it is possible to simultaneously operate the mobile phone signal processing circuit 151, the DTV low-band frequency tuner 152A, and the DTV high-band frequency tuner 152B, so as to record in one channel from the DTV low-frequency band and record in one channel from the DTV high-frequency band while using the portable wireless communication apparatus 100M for talking.

Furthermore, it is possible to simultaneously perform three different wireless communications, for example, by using a common antenna element for transmitting and receiving mobile phone transmitting signals and mobile phone receiving signals and for receiving GPS signals, and using another common antenna element for receiving (or transmitting and receiving) mobile phone receiving signals and for receiving DTV signals.

As described above, according to the portable wireless communication apparatuses 100K to 100M of the third preferred embodiment, it is possible to perform communications without degrading the reception characteristics of DTV high-band frequency signals caused by mobile phone transmitting signals to be transmitted, by using separate antenna elements for receiving DTV signals and for transmitting the mobile phone transmitting signals.

Furthermore, it is possible to watch DTV without increasing the number of antenna elements of a portable wireless communication apparatus, by using common antenna elements as antenna elements for receiving the DTV signals, and an antenna element for transmitting and receiving the mobile phone transmitting signals and mobile phone receiving signals and an antenna element for receiving the mobile phone receiving signals.

Fourth Preferred Embodiment

Figure 19:
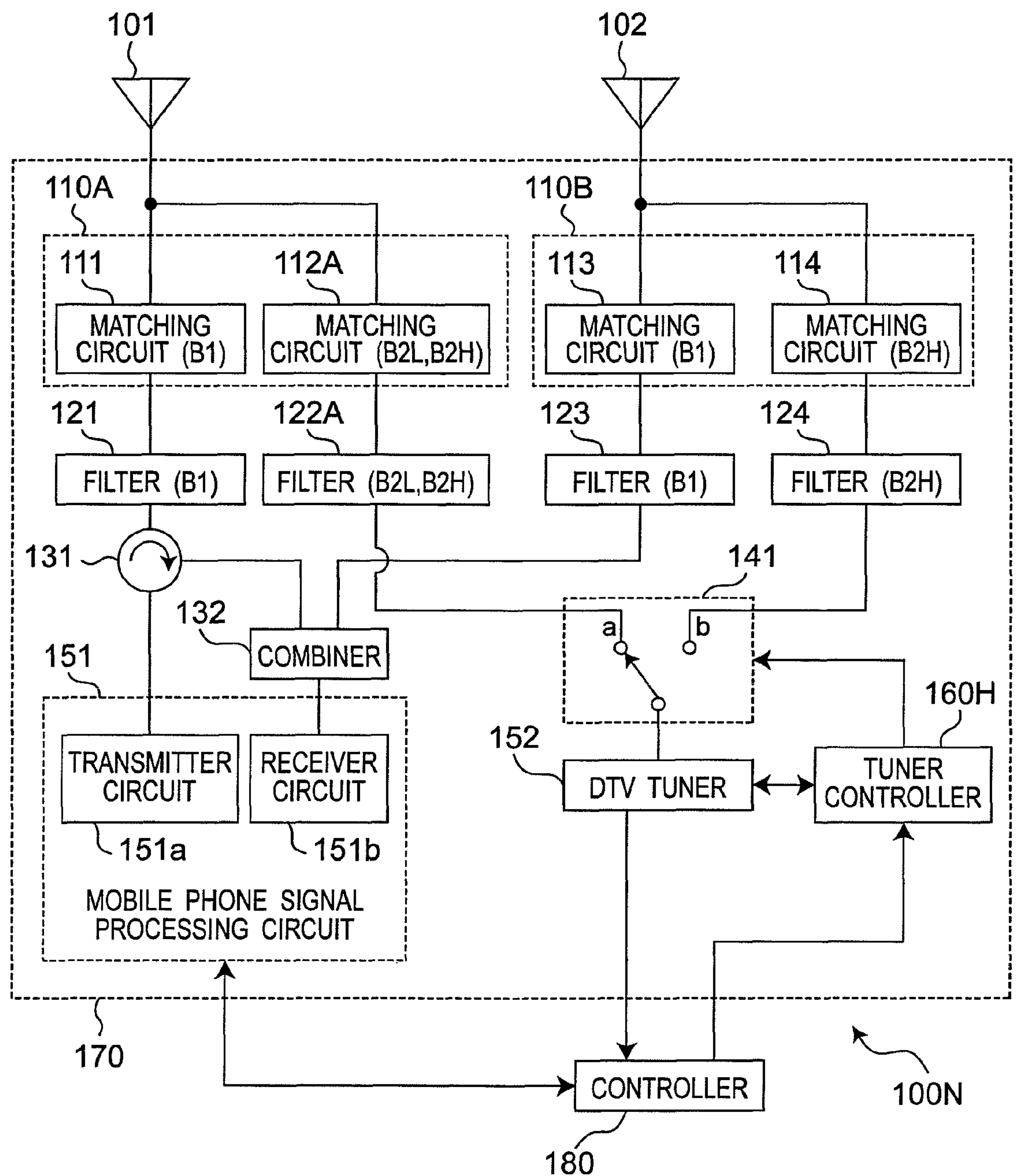
FIG. 19 is a block diagram showing a configuration of a wireless communication circuit 170 of a portable wireless communication apparatus 100N according to a fourth preferred embodiment of the present invention.

FIG. 19 is a block diagram showing a configuration of a wireless communication circuit 170 of a portable wireless communication apparatus 100N according to a fourth preferred embodiment of the present invention. The portable wireless communication apparatus 100N of the present preferred embodiment has a function of transmitting and receiving mobile phone transmitting signals and mobile phone receiving signals and a function of receiving DTV. The fourth preferred embodiment is characterized by predetermining one of antenna elements 101 and 102 as a main antenna element to be used for receiving DTV signals, and changing to the other antenna element for receiving the DTV signals when the received-signal level of DTV decreases. This fourth preferred embodiment is provided with the antenna element 101 for transmitting and receiving mobile phone transmitting signals and mobile phone receiving signals, and the antenna element 102 for receiving the mobile phone receiving signals, as with the portable wireless communication apparatus 100 of FIG. 1, and includes a first implemental example in which the antenna element 101 is used as the main antenna element (see FIG. 19), and a second implemental example in which the antenna element 102 is used as the main antenna element (see a modified preferred embodiment of FIG. 20).

In a preferred embodiment of FIG. 19, the antenna element 101 provided for transmitting and receiving the mobile phone transmitting signals and mobile phone receiving signals is used as the main antenna element for receiving the DTV signals. In this case, when received signal strength indicator (RSSI) of DTV becomes smaller than a predetermined threshold value RSSI0 due to, for example, the influence on the reception characteristics of DTV high-band frequency signals caused from the mobile phone transmitting signals to be transmitted, the antenna element to be used for receiving the DTV signals is changed to the antenna element 102. In the portable wireless communication apparatus 100N of FIG. 19, the antenna element 101 is connected to impedance matching circuits 111 and 112A of the wireless communication circuit 170, and the antenna element 102 is connected to impedance matching circuits 113 and 114 of the wireless communication circuit 170. The impedance matching circuits 111, 112A, 113, and 114 are provided for impedance matching between the antenna elements 101 and 102, and components at their subsequent stages. The impedance matching circuits 111 and 112A function as a matching circuit unit 110A for the antenna element 101, and the impedance matching circuits 113 and 114 function as a matching circuit unit 110B for the antenna element 102. The impedance matching circuit 111 is connected to at its subsequent stage to a filter 121, a circulator 131, a combiner 132, and a mobile phone signal processing circuit 151, as with the portable wireless communication apparatus 100 of FIG. 1. A filter 122A is connected to a subsequent stage of the impedance matching circuit 112A. The impedance matching circuit 112A matches impedances between the antenna element 101 and the filter 122A (or subsequent circuitry, including the filter 122A) to receive DTV low-band frequency signals and DTV high-band frequency signals. The filter 122A is a band-pass filter for the bands B2L and B2H, that pass received DTV low-band frequency signals and received DTV high-band frequency signals. The impedance matching circuit 113 is connected to at its subsequent stage to a filter 123, the combiner 132, and the mobile phone signal processing circuit 151, as with the portable wireless communication apparatus 100 of FIG. 1. A filter 124 is connected to a subsequent stage of the impedance matching circuit 114. The impedance matching circuit 114 matches impedances between the antenna element 102 and the filter 124 (or subsequent circuitry, including the filter 124) to receive DTV high-band frequency signals. The filter 124 is a band-pass filter for the band B2H, that passes received DTV high-band frequency signals. The impedance matching circuit 114 may further matches impedances between the antenna element 102 and the filter 124 (or subsequent circuitry, including the filter 124) to receive DTV low-band frequency signals, and the filter 124 may further pass received DTV low-band frequency signals.

The filters 122A and 124 are connected to a switch 141. The switch 141 passes one of output signals from the filters 122A and 124 to a DTV tuner 152, according to control of a tuner controller 160H. The tuner controller 160H operates the switch 141 to connect the filter 122A to the DTV tuner 152, as an initial state of the switch 141. The DTV receiving signals received by the antenna element 101 are passed to the DTV tuner 152 through the impedance matching circuit 112A, the filter 122A, and the switch 141. The DTV tuner 152 performs signal processing such as demodulation on the DTV receiving signals, and further obtains received signal strength indicator (RSSI) of DTV and passes the obtained RSSI to the tuner controller 160H. When receiving the DTV high-band frequency signals, the tuner controller 160H controls the switch 141 so as to increase the RSSI. Specifically, when the RSSI of the DTV signals obtained by the DTV tuner 152 becomes smaller than a predetermined threshold value RSSI0 corresponding to a limit for distorting DTV video images, the tuner controller 160H changes the connection of the switch 141. Hence, when the DTV signals received by the antenna element 101 are inputted to the DTV tuner 152, if RSSI becomes smaller than the threshold value RSSI0, then the tuner controller 160H changes the switch 141 to input the DTV signals received by the antenna element 102, to the DTV tuner 152. The DTV receiving signals received by the antenna element 102 are passed to the DTV tuner 152 through the impedance matching circuit 114, the filter 124, and the switch 141. The DTV tuner 152 performs signal processing such as demodulation on the DTV receiving signals, and further obtains received signal strength indicator (RSSI) of DTV and passes the obtained RSSI to the tuner controller 160H. Conversely, when the DTV signals received by the antenna element 102 are inputted to the DTV tuner 152, if RSSI becomes smaller than the threshold value RSSI0, then the tuner controller 160H changes the switch 141 to input the DTV signals received by the antenna element 101, to the DTV tuner 152.

Further, the tuner controller 160H may obtain a control signal including channel information from a controller 180, and change the connection of the switch 141 by referring to the channel information. In this case, when the DTV signals received by the antenna element 102 are inputted to the DTV tuner 152, if a channel within a DTV low-frequency band is selected, then the tuner controller 160H changes the switch 141 to input DTV signals of the channel received by the antenna element 101, to the DTV tuner 152. When the DTV signals received by the antenna element 101 are inputted to the DTV tuner 152, if a channel within a DTV high-frequency band is selected, then the tuner controller 160H changes the switch 141 to input DTV signals of the channel received by the antenna element 102, to the DTV tuner 152. Note that when the impedance matching circuit 114 and the filter 124 can be used to receive both the DTV low-band frequency signals and DTV high-band frequency signals, even though a channel within the DTV low-frequency band is selected, the tuner controller 160H does not need to change the switch 141 to input DTV signals received by the antenna element 101, to the DTV tuner 152.

Figure 20:
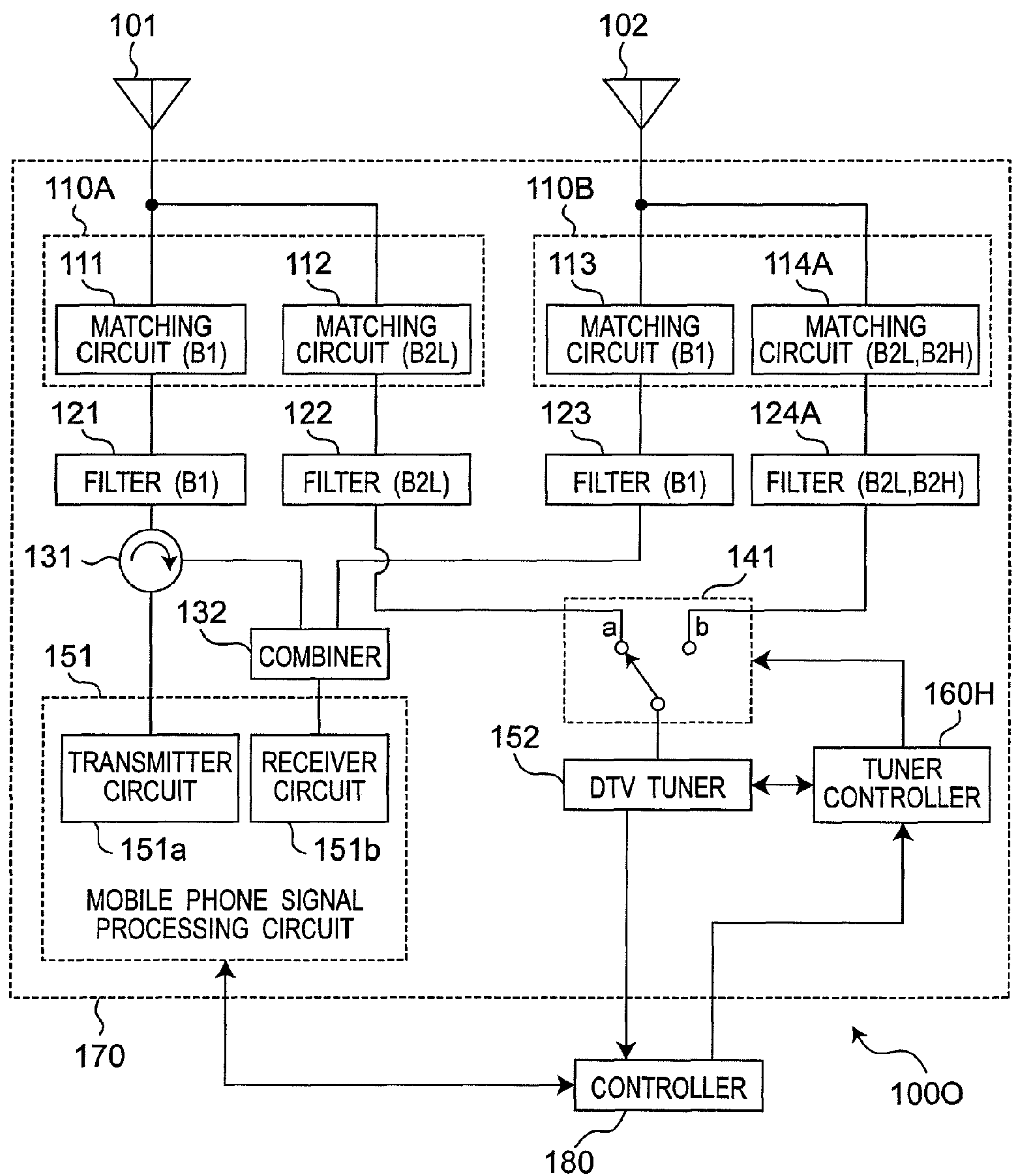
FIG. 20 is a block diagram showing a configuration of a wireless communication circuit 170 of a portable wireless communication apparatus 100O according to a first modified preferred embodiment of the fourth preferred embodiment of the present invention.

FIG. 20 is a block diagram showing a configuration of a wireless communication circuit 170 of a portable wireless communication apparatus 100O according to a first modified preferred embodiment of the fourth preferred embodiment of the present invention. In the modified preferred embodiment of FIG. 20, an antenna element 102 provided for receiving mobile phone receiving signals is used as the main antenna element for receiving DTV signals. In this case, when received signal strength indicator (RSSI) of DTV becomes smaller than a predetermined threshold value RSSI0, the antenna element to be used for receiving DTV signals is changed to an antenna element 101. In the portable wireless communication apparatus 100O of the modified preferred embodiment, an impedance matching circuit 112 matches impedances between the antenna element 101 and a filter 122 (or subsequent circuitry, including the filter 122) to receive DTV low-band frequency signals (or alternatively, to receive DTV low-band frequency signals and DTV high-band frequency signals). The filter 122 passes received DTV low-band frequency signals (or DTV low-band frequency signals and DTV high-band frequency signals). An impedance matching circuit 114A matches impedances between the antenna element 102 and a filter 124A (or subsequent circuitry, including the filter 124A) to receive the DTV low-band frequency signals and DTV high-band frequency signals. The filter 124A passes received DTV low-band frequency signals and received DTV high-band frequency signal.

The tuner controller 160H operates a switch 141 to connect the filter 124A to a DTV tuner 152, as an initial state of the switch 141. When receiving the DTV low-band frequency signals, the tuner controller 160H controls the switch 141 so as to increase RSSI. Specifically, when received signal strength indicator (RSSI) of DTV obtained by the DTV tuner 152 becomes smaller than the threshold value RSSI0, the tuner controller 160H changes the connection of the switch 141. Hence, when the DTV signals received by the antenna element 102 are inputted to the DTV tuner 152, if RSSI becomes smaller than the threshold value RSSI0, then the tuner controller 160H changes the switch 141 to input the DTV signals received by the antenna element 101, to the DTV tuner 152. Conversely, when DTV signals received by the antenna element 101 are inputted to the DTV tuner 152, if RSSI becomes smaller than the threshold value RSSI0, then the tuner controller 160H changes the switch 141 to input DTV signals received by the antenna element 102, to the DTV tuner 152.

Further, the tuner controller 160H may obtain a control signal including channel information from a controller 180, and change the connection of the switch 141 by referring to the channel information. In this case, when DTV signals received by the antenna element 102 are inputted to the DTV tuner 152, if a channel within a DTV low-frequency band is selected, then the tuner controller 160H changes the switch 141 to input DTV signals of the channel received by the antenna element 101, to the DTV tuner 152. If the portable wireless communication apparatus 100O is configured as shown in FIGS. 2 and 3, then it is possible to obtain better reception characteristics by thus using the larger antenna element 101 when receiving the low-band frequency signals. Further, in this case, it is preferable to design the impedance matching circuit 112 and the filter 122 for use in low frequencies. When DTV signals received by the antenna element 101 are inputted to the DTV tuner 152, if a channel within a DTV high-frequency band is selected, then the tuner controller 160H changes the switch 141 to input DTV signals of the channel received by the antenna element 102, to the DTV tuner 152.

According to the present preferred embodiment with the above-described configuration, when the received-signal level of DTV decreases, particularly, even when the reception characteristics of DTV is influenced from the mobile phone transmitting signals to be transmitted as described in the preferred embodiment of FIG. 19, the influence can be suppressed by changing between antenna elements.

Figure 21:
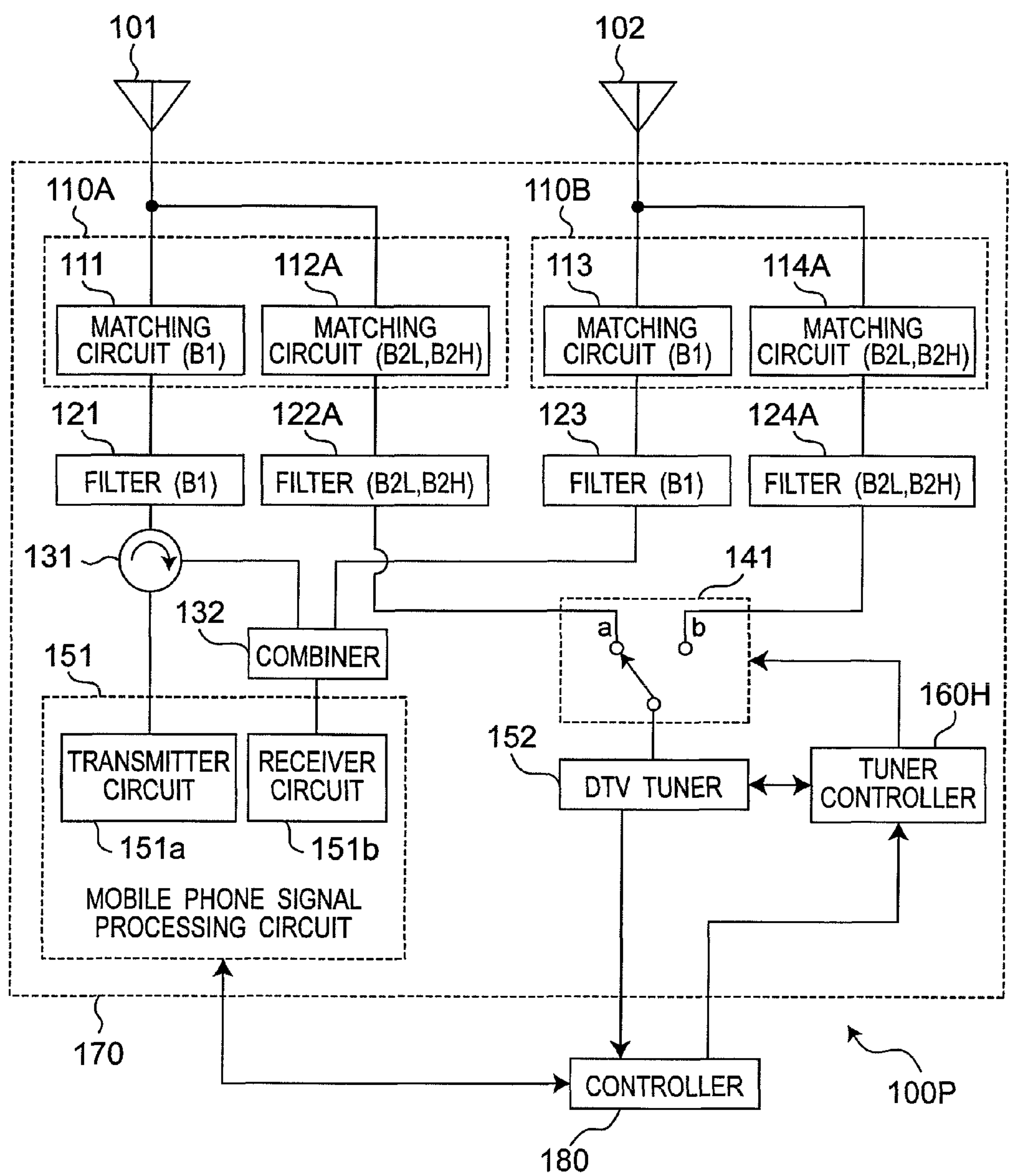
FIG. 21 is a block diagram showing a configuration of a wireless communication circuit 170 of a portable wireless communication apparatus 100P according to a second modified preferred embodiment of the fourth preferred embodiment of the present invention.

FIG. 21 is a block diagram showing a configuration of a wireless communication circuit 170 of a portable wireless communication apparatus 100P according to a second modified preferred embodiment of the fourth preferred embodiment of the present invention. A tuner controller 160H can further control a switch 141 as follows. Specifically, when the switch 141 connects a DTV tuner 152 to an antenna element 101 through a filter 122A and an impedance matching circuit 112A, if RSSI of DTV high-band frequency signals and DTV low-band frequency signals received by the DTV tuner 152 becomes smaller than a threshold value RSSI0, then the tuner controller 160H controls the switch 141 to connect the DTV tuner 152 to an antenna element 102 through a filter 124A and an impedance matching circuit 114A. On the other hand, when the switch 141 connects the DTV tuner 152 to the antenna element 102 through the filter 124A and the impedance matching circuit 114A, if RSSI of the DTV high-band frequency signals and DTV low-band frequency signals received by the DTV tuner 152 becomes smaller than the threshold value RSSI0, then the tuner controller 160H controls the switch 141 to connect the DTV tuner 152 to the antenna element 101 through the filter 122A and the impedance matching circuit 112A. Accordingly, when RSSI of the DTV high-band frequency signals or DTV low-band frequency signals becomes smaller than the threshold value RSSI0, the antenna element 102 is connected to the DTV tuner 152 instead of the antenna element 101, or the antenna element 101 is connected to the DTV tuner 152 instead of the antenna element 102. Thus, it is possible to use the antenna element 101 or 102 that receives at a higher signal level.

Furthermore, it is possible to watch DTV without increasing the number of antenna elements, by using a common antenna element as an antenna element for receiving the DTV signals, and an antenna element for transmitting and receiving the mobile phone transmitting signals and mobile phone receiving signals.

Furthermore, since the antenna elements 101 and 102 are always connected to a mobile phone signal processing circuit 151, and one of the antenna elements 101 and 102 is always connected to the DTV tuner 152, it is possible to operate the portable wireless communication apparatus 100P, etc. as a DTV tuner and at the same time to operate as a phone, that is, e.g., to record a DTV program when using as a phone for talking.

Moreover, since the selection diversity can be used when receiving DTV signals, it is possible to obtain good reception characteristics.

Although the present preferred embodiment uses RSSI as a reference for changing the switch 141, the reference is not limited thereto, and any indicator, e.g., C/N, BER, or PER, can be used as long as the indicator can detect the degradation in received-signal level or reception characteristics.

Modified Preferred Embodiment

Although in the first to fourth preferred embodiments the low-frequency band and high-frequency band of DTV are respectively configured to a range of 470 MHz to 557 MHz and a range of 557 MHz to 770 MHz, the frequency bands are not limited thereto, and other frequency ranges can be used so as to suppress the disturbance from mobile phone transmitting signals to be transmitted, and to obtain good reception characteristics for DTV.

Further, for performing a wireless communication that requires frequency characteristics capable of good reception over a wide band, such as DTV, it is possible to obtain advantageous effects of the present invention in the same manner by using separate antenna elements for receiving low-band frequency signals and for receiving high-band frequency signals as in the present preferred embodiments.

Although the first to fourth preferred embodiments describe portable wireless communication apparatuses that transmit and receive mobile phone transmitting signals and mobile phone receiving signals, and receive DTV signals, the configuration is not limited thereto. When a disturbance occurs because a transmission frequency of signals for a wireless communication "A" is close to a reception frequency of signals for another wireless communication "B" in a portable wireless communication apparatus having a function of performing multiple wireless communications that respectively use frequency bands close to each other, it is possible to obtain advantageous effects of the present invention in the same manner by substituting the signals of the communication "A" for mobile phone transmitting signals and mobile phone receiving signals of the present preferred embodiments, and substituting the signals of the communication "B" for DTV signals.

The following Table 1 shows examples of wireless communication schemes that can be used instead of DTV of the present preferred embodiments. A portable wireless communication apparatus transmits and receives mobile phone transmitting signals and mobile phone receiving signals using one or more of an 800 MHz band, a 1.7 GHz band, a 2.0 GHz band, and a 2.5 GHz band, and receives one or more of radio signals that comply with the wireless communication schemes shown in Table 1. In this case, the receiving frequency band of radio signals that comply with the wireless communication schemes shown in Table 1 may be divided into two or more frequency bands, as with the present preferred embodiments. Table 1 shows frequencies in MHz.

TABLE 1

| | Transmission frequency band | Reception frequency band |
|---|---|---|
| DTV (Japan) | | 190 to 770 |
| DTV (Europe) | | 470 to 830 |
| SPC (Specific small power) | 300 or 430 | 300 or 430 |
| GPS | | 1575 |
| WLAN | 2400 to 2485.3 | 2400 to 2485.3 |
| Bluetooth | 2400 to 2485.3 | 2400 to 2485.3 |
| RF-ID | 950 to 956 | 950 to 956 |

Further, it is possible to simultaneously perform three different wireless communications, for example, by using a common antenna element for transmitting and receiving mobile phone transmitting signals and mobile phone receiving signals and for receiving GPS signals, and using another common antenna element for receiving (or transmitting and receiving) mobile phone receiving signals and for receiving DTV signals.

For the overall configurations of the portable wireless communication apparatuses shown in FIGS. 6 to 23, it is possible to adopt the same configuration as that shown in FIGS. 2 and 3. However, the configuration is not limited thereto, and other configurations may be adopted. For example, the antenna elements 101 and 102 may be configured not in asymmetric shapes as shown in FIGS. 2 and 3, but in the same shape with each other, or in other different shapes.

Portable wireless communication apparatuses shown in drawings other than FIGS. 9, 12, and 15 may be configured to use the selection diversity for mobile phone receiving signals respectively received by antenna elements 101 and 102, as with the portable wireless communication apparatus 100D shown in FIG. 9.

The circuit configurations of the portable wireless communication apparatuses of the preferred embodiments are not limited to those shown in the block diagrams in the drawings. For example, circulators 131 and 134, a combiner 132, and/or duplexers 131A and 134A may be configured to be included in a mobile phone signal processing circuit 151.

Note that the portable wireless communication apparatuses respectively shown in the above-described first to fourth preferred embodiments are merely examples, and thus if structurally possible, components of the portable wireless communication apparatuses can also be used in combination with each other.

Effects of the Preferred Embodiments

As described in detail above, according to the preferred embodiments of the present invention, portable wireless communication apparatuses can be provided in which separate antenna elements are used for transmitting mobile phone transmitting signals, and for other wireless communications that receives at frequencies close to that of the mobile phone transmitting signals to be transmitted, such as digital television broadcasts (DTV) in a high-frequency band (UHF band), and thus, it is possible to suppress the influence on other wireless communications caused from the mobile phone transmitting signals to be transmitted, and to perform multiple wireless communications by only antenna elements for transmitting and receiving the mobile phone transmitting signals and mobile phone receiving signals. In this specification, it is possible to perform communications without degrading the reception characteristics of DTV high-band frequency signals caused by mobile phone transmitting signals to be transmitted from the portable wireless communication apparatus, by using separate antenna elements for receiving the DTV high-band frequency signals and for transmitting the mobile phone transmitting signals. According to the present invention, it is possible to achieve an appropriate impedance match by providing each antenna element with matching means for each different wireless communication.

Further, according to the present invention, it is possible to watch DTV without increasing the number of antenna elements of the portable wireless communication apparatus, by using a common antenna element as an antenna element for receiving DTV signals, and as an antenna element for transmitting and receiving mobile phone transmitting signals and mobile phone receiving signals and/or for receiving the mobile phone receiving signals. Furthermore, by providing only antenna elements for transmitting and receiving the mobile phone transmitting signals and mobile phone receiving signals, it is possible to operate the wireless communication apparatus as a phone, and at the same time to operate as an apparatus performing other wireless communications such as digital television broadcasts. Further, since two antenna elements are always connected to a radio signal processing means for transmitting and receiving mobile phone transmitting signals and mobile phone receiving signals, and at least one of the two antenna elements is always connected to a radio signal processing means for receiving DTV broadcast signals, it is possible to operate the portable wireless communication apparatus as a DTV tuner and at the same time to operate as a phone, that is, e.g., to record a DTV program when using as a phone for talking. Furthermore, by using separate tuners for DTV low-band frequency signals and for DTV high-band frequency signals, it is possible to record in a channel of the high-frequency band while watching in a channel of the low-frequency band, or alternatively, it is possible to simultaneously operate a radio signal processing means for mobile phone transmitting signals and mobile phone receiving signals, a radio signal processing means for DTV low-band frequency signals, and a radio signal processing means for DTV high-band frequency signals, so as to record in one channel from the DTV low-frequency band and record in one channel from the DTV high-frequency band while using the portable wireless communication apparatus for talking.

Furthermore, according to the present invention, by using separate antenna elements for receiving DTV low-band frequency signals and for receiving DTV high-band frequency signals, it is possible to improve DTV reception characteristics over a wide band, as compared with the case of using only one antenna element. Moreover, it is possible to obtain better reception characteristics, by selecting one of two antenna elements that is larger in size, as an antenna element for receiving DTV low-band frequency signals (i.e., DTV signals using a lower frequency) (see FIGS. 2 and 3).

Further, according to the present invention, it is possible to use the selection diversity even when receiving DTV signals, thus maintaining good reception characteristics.

Further, not limited to mobile phone transmitting signals and mobile phone receiving signals and DTV, when a disturbance occurs because a transmission frequency of signals for a wireless communication "A" is close to a reception frequency of signals for another wireless communication "B" in a portable wireless communication apparatus having a function of performing multiple wireless communications that respectively use frequency bands close to each other, it is possible to obtain advantageous effects of the present invention in the same manner by substituting the signals of the communication "A" for the mobile phone transmitting signals and mobile phone receiving signals of the present preferred embodiments, and substituting the signals of the communication "B" for the DTV signals.

Further, for performing a wireless communication that requires frequency characteristics capable of good reception over a wide band, such as DTV, it is possible to obtain advantageous effects of the present invention in the same manner by using separate antenna elements for receiving low-band frequency signals and for receiving high-band frequency signals.

INDUSTRIAL APPLICABILITY

According to the present invention, portable wireless communication apparatuses transmit radio signals (mobile phone transmitting signals and mobile phone receiving signals) for a first wireless communication in a predetermined frequency band and receive radio signals for another second wireless communication in another frequency band close to the predetermined frequency band, and the portable wireless communication apparatuses can eliminate the conditions where radio signals to be transmitted for the first wireless communication becomes a disturbance to radio signals for the second wireless communication, thus preventing degradation in the reception characteristics of the radio signals for the second wireless communication. Accordingly, the present invention can be applied to devices used in various wireless communications, such as mobile phones.

The invention claimed is:

1. A wireless communication apparatus, comprising:

a first antenna element (101) for transmitting a first radio signal in a first frequency band (B1) used for a first communication system, and receiving a second radio signal in the first frequency band (B1);

a second antenna element (102) for receiving the second radio signal;

a transmitter circuit (151*a*) for generating the first radio signal and transmitting the first radio signal from the first antenna element (101) through a first filter (121) and a first matching circuit (111);

a first receiver circuit (151*b*, 151*c*) for performing at least one of receiving processes including a first receiving process of receiving the second radio signal received by the first antenna element (101), through the first matching circuit (111) and the first filter (121), and a second receiving process of receiving the second radio signal received by the second antenna element (102), through a second matching circuit (113, 113A) and a second filter (123, 123A); and a second receiver circuit (152) for receiving a third radio signal in a second frequency band (B2H) used for a second communication system and close to the first frequency band (B1), and receiving a fourth radio signal in a third frequency band (B2L) used for the second communication system and far from the first frequency band (B1) and different from the second frequency band (B2H), wherein the first matching circuit (111) matches an impedance of the first antenna element (101) to an impedance of the first filter (121) in the first frequency band (B1), the first filter (121) passing a radio signal in the first frequency band (B1), wherein the second matching circuit (113, 113A) matches an impedance of the second antenna element (102) to an impedance of the second filter (123, 123A) in the first frequency band (B1), the second filter (123, 123A) passing a radio signal in the first frequency band (B1), and wherein the wireless communication apparatus further comprises:

a third matching circuit (112, 112A, 112B) for matching an impedance of the first antenna element (101) to an impedance of a third filter (122, 122A, 128) in the third frequency band (B2L), the third filter (122, 122A, 128) passing a radio signal in the third frequency band (B2L);

a fourth matching circuit (114, 114A, 114B) for matching an impedance of the second antenna element to an impedance of a fourth filter (124, 124A, 129) in the second frequency band (B2H), the fourth filter (124, 124A, 129) passing a radio signal in the second frequency band (B2H); and a controller (160, 160B, 160C, 160D, 160H) for controlling a first switch (141, 145) to connect the second receiver circuit (152) receiving the third radio signal, to the second antenna element (102) not transmitting the first radio signal, through the fourth filter (124, 124A, 129) and the fourth matching circuit (114, 114A, 114B), when the transmitter circuit (151*a*) transmits the first radio signal.

2. The wireless communication apparatus as claimed in claim 1, wherein when the transmitter circuit (151*a*) does not transmit the first radio signal, the controller (160, 160H) controls the first switch (141) to connect the second receiver circuit (152) to the first antenna element (101) through the third filter (122, 122A) and the third matching circuit (112, 112A), or to connect the second receiver circuit (152) to the second antenna element (102) through the fourth filter (124, 124A) and the fourth matching circuit (114, 114A).

3. The wireless communication apparatus as claimed in claim 2, wherein the third matching circuit (112A) further matches an impedance of the first antenna element (101) to an impedance of the third filter (122A) in the second frequency band (B2H), the third filter (122A) further passes a radio signal in the second frequency band (B2H), wherein the fourth matching circuit (114A) further matches an impedance of the second antenna element (102) to an impedance of the fourth filter (124A) in the third frequency band (B2L), the fourth filter (124A) further passing a radio signal in the third frequency band (B2L), and wherein in the case that the first switch (141) connects the second receiver circuit (152) to the first antenna element (101) through the third filter (122A) and the third matching circuit (112A), when a signal level of the third radio signal or the fourth radio signal received by the second receiver circuit (152) becomes lower than a predetermined threshold value, the controller (160H) controls the first switch (141) to connect the second receiver circuit (152) to the second antenna element (102) through the fourth filter (124A) and the fourth matching circuit (114A).

4. The wireless communication apparatus as claimed in claim 2, wherein the third matching circuit (112A) further matches an impedance of the first antenna element (101) to an impedance of the third filter (122A) in the second frequency band (B2H), the third filter (122A) further passes a radio signal in the second frequency band (B2H), wherein the fourth matching circuit (114A) further matches an impedance of the second antenna element (102) to an impedance of the fourth filter (124A) in the third frequency band (B2L), the fourth filter (124A) further passing a radio signal in the third frequency band (B2L), and wherein in the case that the first switch (141) connects the second receiver circuit (152) to the second antenna element (102) through the fourth filter (124A) and the fourth matching circuit (114A), when a signal level of the third radio signal or the fourth radio signal received by the second receiver circuit (152) becomes lower than a predetermined threshold value, the controller (160H) controls the first switch (141) to connect the second receiver circuit (152) to the first antenna element (101) through the third filter (122A) and the third matching circuit (112A).

5. The wireless communication apparatus as claimed in claim 1, further comprising:

a second switch (144) inserted between the transmitter circuit (151*a*) and the first filter (121) and between the transmitter circuit (151*a*) and the second filter (123A), and for selectively changing between a first case in which the first radio signal from the transmitter circuit (151*a*) is outputted to the first antenna element (101) through the first filter (121) and the first matching circuit (111), and a second case in which the first radio signal from the transmitter circuit (151*a*) is outputted to the second antenna element (102) through the second filter (123A) and the second matching circuit (113A), wherein the third matching circuit (112A) further matches an impedance of the first antenna element (101) to an impedance of the third filter (122A) in the second frequency band (B2H), the third filter (122A) further passes a radio signal in the second frequency band (B2H), wherein the fourth matching circuit (114A) further matches an impedance of the second antenna element (102) to an impedance of the fourth filter (124A) in the third frequency band (B2L), the fourth filter (124A) further passing a radio signal in the third frequency band (B2L), and wherein the controller (160B, 160C) controls the first switch (141) in the first case to connect the second receiver circuit (152) receiving the third radio signal to the second antenna element (102) through the fourth filter (124A) and the fourth matching circuit (114A), and controls the first switch (141) in the second case to connect the second receiver circuit (152) receiving the third radio signal to the first antenna element (101) through the third filter (122A) and the third matching circuit (112A).

6. The wireless communication apparatus as claimed in claim 1, further comprising:

a second switch (144) inserted between the transmitter circuit (151*a*) and the first filter (121) and between the transmitter circuit (151*a*) and the second filter (123A), and for selectively changing between a first case in which the first radio signal from the transmitter circuit (151*a*) is outputted to the first antenna element (101) through the first filter (121) and the first matching circuit (111), and a second case in which the first radio signal from the transmitter circuit (151*a*) is outputted to the second antenna element (102) through the second filter (123A) and the second matching circuit (113A), wherein the third matching circuit (112B) further matches an impedance of the first antenna element (101) to an impedance of the fourth filter (129) in the second frequency band (B2H), wherein the fourth matching circuit (114B) further matches an impedance of the second antenna element (102) to an impedance of the third filter (128) in the third frequency band (B2L), and wherein the second receiver circuit includes a first receiving unit (152B) for receiving the third radio signal in the second frequency band (B2H), and a second receiving unit (152A) for receiving the fourth radio signal in the third frequency band (B2L), and wherein the controller (160D) controls the first switch (145) in the first case to connect the first receiving unit (152B) to the second antenna element (102) through the third filter (129) and the fourth matching circuit (114B), and controls the first switch (145) in the second case to connect the first receiving unit (152B) to the first antenna element (101) through the third filter (129) and the third matching circuit (112B).

7. A wireless communication apparatus, comprising:

first and second antenna elements (101 and 102) for transmitting a first radio signal in a first frequency band (B1) used for a first communication system and receiving a second radio signal in the first frequency band (B1), receiving a third radio signal in a second frequency band (B2H) used for a second communication system and close to the first frequency band (B1), and receiving a fourth radio signal in a third frequency band (B2L) used for the second communication system and far from the first frequency band (B1) and different from the second frequency band (B2H);

a first switch (146) for connecting one of the first antenna element (101) and the second antenna element (102);

a second switch (144);

a transmitter circuit (151*a*) for generating the first radio signal, and when the second switch (144) is in a first case, transmitting the first radio signal from the first antenna element (101) through the second switch (144), a first filter (321), and a first matching circuit (311), and when the second switch (144) is in a second case, transmitting the first radio signal from the second antenna element (102) through the second switch (144), a second filter (323), and a second matching circuit (313);

a first receiver circuit (151*b*) for performing at least one of receiving processes including a first receiving process of receiving the second radio signal received by the first antenna element (101), through the first matching circuit (311) and the first filter (321), and a second receiving process of receiving the second radio signal received by the second antenna element (102), through the second matching circuit (313) and the second filter (323); and a second receiver circuit (152) for receiving the third radio signal in the second frequency band (B2H), and the fourth radio signal in the third frequency band (B2L), wherein the first matching circuit (311) matches an impedance of the first antenna element (101) to an impedance of the first filter (321) in the first frequency band (B1), the first filter (321) passing a radio signal in the first frequency band (B1), wherein the second matching circuit (313) matches an impedance of the second antenna element (102) to an impedance of the second filter (323) in the first frequency band (B1), the second filter (323) passing a radio signal in the first frequency band (B1), and wherein the wireless communication apparatus further comprises:

a third matching circuit (312) for matching an impedance of the first or second antenna element (101 or 102) to an impedance of a third filter (322) in the second and third frequency bands (B2L and B2H), the third filter (322) passing radio signals in the second and third frequency bands (B2L and B2H); and a controller (160E, 160F) for controlling the first switch (146) such that the third radio signal received by the second antenna element (102) is received by the second receiver circuit (152) through the first switch (146), the third matching circuit (312), and the third filter (322), when the second switch (144) connects the transmitter circuit (151*a*) to the first antenna element (101) through the first filter (321) and the first matching circuit (311) and the transmitter circuit (151*a*) transmits the first radio signal using the first antenna element (101), and controlling the first switch (146) such that the third radio signal received by the first antenna element (101) is received by the second receiver circuit (152) through the first switch (146), the third matching circuit (312), and the third filter (322), when the second switch (144) connects the transmitter circuit (151*a*) to the second antenna element (102) through the second filter (323) and the second matching circuit (313) and the transmitter circuit (151*a*) transmits the first radio signal using the second antenna element (102).

* * * * *